(12) United States Patent
Nagaoka et al.

(10) Patent No.: US 8,243,183 B2
(45) Date of Patent: Aug. 14, 2012

(54) IMAGE PICKUP APPARATUS

(75) Inventors: Hideyuki Nagaoka, Hino (JP); Kenji Ono, Hachioji (JP); Tomoyuki Satori, Yokohama (JP)

(73) Assignee: Olympus Imaging Corp., Tokyo (JP)

( * ) Notice: Subject to any disclaimer, the term of this patent is extended or adjusted under 35 U.S.C. 154(b) by 392 days.

(21) Appl. No.: 12/589,566

(22) Filed: Oct. 23, 2009

(65) Prior Publication Data
US 2010/0157104 A1    Jun. 24, 2010

(30) Foreign Application Priority Data
Oct. 28, 2008    (JP) .................................. 2008-276828

(51) Int. Cl.
*G02B 13/16*    (2006.01)

(52) U.S. Cl. ........ 348/335; 348/337; 348/345; 359/678; 359/687; 359/733

(58) Field of Classification Search .................. None
See application file for complete search history.

(56) References Cited

U.S. PATENT DOCUMENTS

| | | | |
|---|---|---|---|
| 6,754,446 B2 * | 6/2004 | Hagimori et al. ............... 396/72 |
| 6,771,432 B2 * | 8/2004 | Mihara .......................... 359/687 |
| 7,068,440 B1 * | 6/2006 | Nakatani et al. .............. 359/676 |
| 7,113,346 B1 * | 9/2006 | Souma et al. .................. 359/687 |
| 7,248,293 B2 | 7/2007 | Iwasawa |
| 7,372,635 B2 | 5/2008 | Morooka et al. |
| 7,382,548 B2 | 6/2008 | Kohno et al. |
| 7,433,584 B2 | 10/2008 | Masui et al. |
| 7,489,450 B2 | 2/2009 | Matsumoto et al. |
| 7,602,558 B2 * | 10/2009 | Sato .............................. 359/687 |
| 2004/0105020 A1 | 6/2004 | Iwasawa |
| 2005/0002115 A1 * | 1/2005 | Mihara ......................... 359/686 |
| 2006/0044423 A1 | 3/2006 | Hagimori et al. |
| 2006/0066955 A1 * | 3/2006 | Satori et al. .................. 359/687 |
| 2006/0262420 A1 | 11/2006 | Matsumoto et al. |
| 2006/0279853 A1 | 12/2006 | Morooka et al. |
| 2006/0285841 A1 | 12/2006 | Masui et al. |
| 2007/0014031 A1 | 1/2007 | Kohno et al. |
| 2008/0080063 A1 * | 4/2008 | Katakura et al. ............. 359/687 |
| 2008/0137218 A1 * | 6/2008 | Omichi ........................ 359/764 |
| 2008/0198474 A1 | 8/2008 | Morooka et al. |
| 2008/0278824 A1 * | 11/2008 | Shirota ......................... 359/684 |
| 2008/0291545 A1 * | 11/2008 | Ishii ............................. 359/684 |
| 2009/0040623 A1 * | 2/2009 | Morooka et al. ............. 359/687 |
| 2011/0128416 A1 * | 6/2011 | Satori et al. ................ 348/240.3 |

FOREIGN PATENT DOCUMENTS

JP    2004-184627    7/2004
(Continued)

*Primary Examiner* — Chieh M Fan
*Assistant Examiner* — Angel L Garces-Rivera
(74) *Attorney, Agent, or Firm* — Kenyon & Kenyon LLP

(57) ABSTRACT

An apparatus includes a zoom lens and an image pickup element. The zoom lens includes an optical path reflecting lens group including a reflecting member and having a positive refracting power, a movable negative lens group that is disposed in the optical path on the image side of the optical path reflecting lens group, has a negative refracting power, and moves during zooming, a movable positive lens group that is disposed in the optical path on the image side of the movable negative lens group, has a positive refracting power, and moves during zooming, and an aperture stop disposed in the optical path between the movable negative lens group and the movable positive lens group. The optical path reflecting lens group is a lens group located closest to the object side in the zoom lens.

35 Claims, 29 Drawing Sheets

FOREIGN PATENT DOCUMENTS

| JP | 2006-323219 | 11/2006 |
| JP | 2006-343622 | 12/2006 |
| JP | 2006-350050 | 12/2006 |
| JP | 2007-025123 | 2/2007 |
| JP | 2007-086594 | 4/2007 |

* cited by examiner

IMAGE PICKUP APPARATUS

CROSS-REFERENCE TO RELATED APPLICATION

The present application is based upon and claims the benefit of priority from the prior Japanese Patent Application No. 2008-276828 filed on Oct. 28, 2008; the entire contents of which are incorporated herein by reference.

BACKGROUND OF THE INVENTION

1. Field of the Invention

The present invention relates to an image pickup apparatus equipped with a zoom lens having a reflecting member.

2. Description of the Related Art

With development of image pickup elements such as CCD and C-MOS sensors in recent years, image pickup apparatuses such as digital cameras and video cameras equipped with the same are widely used. Among others, image pickup apparatuses using, as the taking zoom lens, a zoom lens having a reflecting member to slim the apparatus are widely used. For example, the zoom lens disclosed in Japanese Patent Application Laid-Open No. 2006-343622 is known as a zoom lens having a zoom ratio of approximately 3 (three) for use in an image pickup apparatus, with which the thickness (i.e. the dimension along the direction from the object to the photographer) of the image pickup apparatus can be made small.

This zoom lens includes a first lens group having a positive refracting power, a second lens group having a negative refracting power, a third lens group having a positive refracting power, and a fourth lens group having a positive refracting power, and a rectangular prism that reflects the optical path is provided in the first lens group to achieve slimming of the zoom lens.

SUMMARY OF THE INVENTION

An image pickup apparatus according to a first aspect of the present invention comprises:

a zoom lens including a reflecting member having a reflecting surface that bends an optical path; and an image pick element that is disposed on the image side of the zoom lens, has an image pickup surface, and converts an image formed on the image pickup surface by the zoom lens into an electrical signal, wherein the zoom lens comprises an optical path reflecting lens group that includes the reflecting member and has a positive refracting power, a movable negative lens group that is disposed in the optical path on the image side of the optical path reflecting lens group, has a negative refracting power, and moves during zooming, a movable positive lens group that is disposed in the optical path on the image side of the movable negative lens group, has a positive refracting power, and moves during zooming, and an aperture stop that is disposed in the optical path between the movable negative lens group and the movable positive lens group, the optical path reflecting lens group is a lens group that is disposed closest to the object side in the zoom lens;

during zooming from the wide angle end to the telephoto end, the distance between the optical path reflecting lens group and the image pickup surface is constant, the movable negative lens group moves in such a way that it is located farther from the optical path reflecting lens group and closer to the image pickup surface at the telephoto end than at the wide angle end, and the movable positive lens group moves in such a way that it is located closer to the optical path reflecting lens group and farther from the image pickup surface at the telephoto end than at the wide angle end, and the movable positive lens group comprises at least five lenses including a plurality of positive lenses and a plurality of negative lenses.

BRIEF DESCRIPTION OF THE DRAWINGS

FIGS. 1, 1A, 1B, and 1C are cross sectional views of the zoom lens according to a first embodiment of the present invention in the state in which the zoom lens is focused on an object point at infinity, where FIG. 1A is a cross sectional view of the zoom lens at the wide angle end, FIG. 1B is a cross sectional view of the zoom lens in an intermediate focal length state, and FIG. 1C is a cross sectional view of the zoom lens at the telephoto end;

DETAILED DESCRIPTION OF THE INVENTION

Figure 1A:
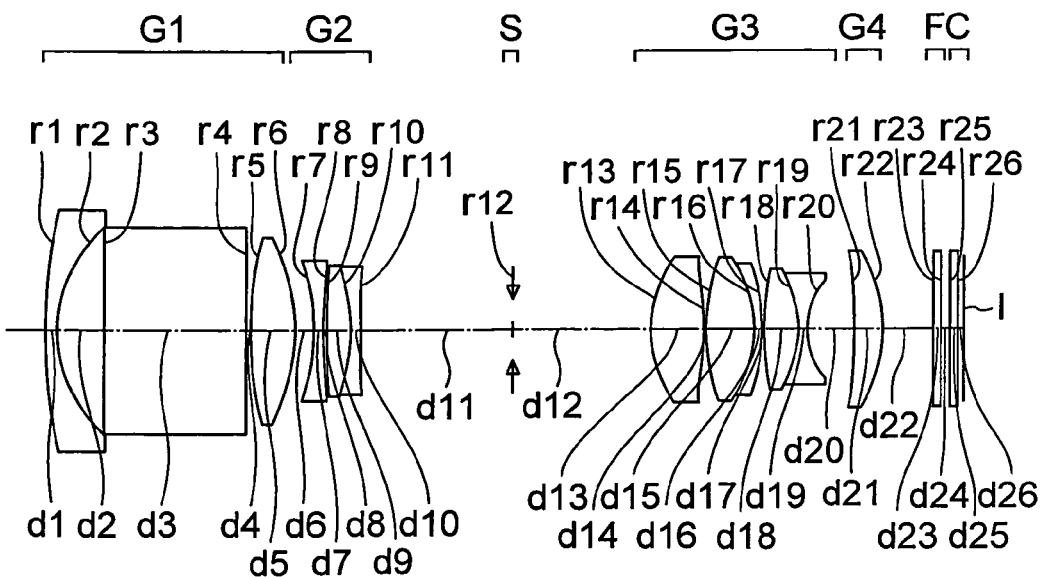

The image pickup apparatus according to the present invention comprises a zoom lens having a reflecting member that has a reflecting surface that bends an optical path, and an image pickup element disposed on the image side of the zoom lens having an image pickup surface, and converting an image formed on the image pickup surface by the zoom lens into an electrical signal.

The zoom lens having the reflecting member includes, an optical path reflecting lens group including the reflecting member and having a positive refracting power, a movable negative lens group disposed in the optical path on the image side of the optical path reflecting lens group, having a negative refracting power, and moving during zooming from the wide angle end to the telephoto end, and a movable positive lens group disposed in the optical path on the image side of the negative lens group, having a positive refracting power, and moving during zooming from the wide angle end to the telephoto end, and the zoom lens further includes an aperture stop provided in the optical path between the negative lens group and the positive lens group. The optical path reflecting lens group is the lens group disposed closest to the object side in the zoom lens.

During zooming from the wide angle end to the telephoto end, the distance between the optical path reflecting lens group and the image pickup surface is constant, the movable negative lens group moves in such a way that it is located farther from the optical path reflecting lens group and closer to the image pickup surface at the telephoto end than at the wide angle end, and the movable positive lens group moves in such a way that it is located closer to the optical path reflecting lens group and farther from the image pickup surface at the telephoto end than at the wide angle end, and the movable positive lens group includes at least five lenses including a plurality of positive lenses and a plurality of negative lenses.

As the distance between the optical path reflecting lens group and the image pickup surface is constant as described above, the optical path reflecting lens group, which tends to be large, can be fixed, and the mechanism can be made simple accordingly.

In addition, as the optical path reflecting lens group is the lens group located closest to the object side and the optical path is bent by it, lens groups that move during zooming can be adapted to move along a direction that does not affects the thickness of the image pickup apparatus. This is advantageous in slimming the image pickup apparatus with respect to the thickness direction. As the movable negative lens group and the movable positive lens group move, the movable negative lens group and the movable positive lens group both can adequately contribute to the magnification changing. This is advantageous in achieving an adequate zoom ratio and in reducing the entire length of the zoom lens.

As the aperture stop is provided at the position as described above, the effective diameter in the zoom lens is restricted. This is advantageous in achieving slimming, aberration correction, and telecentricity (i.e. in making the position of the exit pupil distant from the image pickup surface).

When such a zoom lens is designed to have an adequate angle of view and an adequate zoom ratio, increasing the contribution of the movable negative lens group to the magnification change by increasing the movement amount thereof necessitates an increase in the size of the optical path reflecting lens at the wide angle end. Then, it will be difficult to achieve an adequate angle of view and slimming.

In view of this, in order for the movable positive lens group disposed on the image side of the aperture stop to provide an adequate contribution to the magnification change, it is preferred that the movable positive lens group be configured to be able to have an adequate positive refracting power.

Simply increasing the positive refracting power of the movable positive lens group tends to lead to generation of axial aberrations mainly at the telephoto end. Therefore, in the present invention, the movable positive lens group that moves during zooming is configured to include at least five lenses including a plurality of positive lenses and a plurality of negative lenses, whereby cancellation of aberrations generated by the plurality of positive lenses by the plurality of negative lenses can be facilitated, while the movable positive lens group has an adequate refracting power. This is advantageous in achieving a wide angle of view and a high zoom ratio.

By using such a zoom lens as an image pickup optical system, the image pickup apparatus has a wide angle of field or a high zoom ratio, though being slim.

In the case where the zoom lens has a focusing mechanism, the above features should be construed to describe the zoom lens in the state in which it is focused on the farthest distance. The features discussed in the following will also describe the zoom lens in the state in which it is focused on the farthest distance, in the case where the zoom lens has a focusing mechanism.

In addition to the above invention, it is more preferred that one or a plurality of the features at the same time.

It is preferred that the total number of reflecting surfaces in the zoom lens be one. This makes a space for providing a second reflecting surface unnecessary, and the space occupied by the zoom lens can be made small.

It is also preferred that the reflecting member in the optical path reflecting lens group be a prism having an internal reflecting surface. The refracting effect of the prism is advantageous in reducing the size of the optical path reflecting lens group.

It is preferred that the distance between the aperture stop and the optical path reflecting lens group and the distance between the aperture stop and the image pickup surface be constant during zooming from the wide angle end to the telephoto end. If this is the case, the position of the aperture stop can be fixed during zooming, which simplifies the mechanical design and facilitates slimming of the image pickup apparatus.

It is also preferred that the movable negative lens group be a lens group located immediately in front of and on the object side of the aperture stop, and the movable positive lens group be a lens group located immediately in rear of and on the image side of the aperture stop. In this configuration, there is no lens group between the movable negative lens group and the movable positive lens group that contribute to the magnification change, which is advantageous in providing a space for movement of the lens groups for magnification change.

Furthermore, the zoom lens may be configured in such a way that a second positive lens group composed of one lens component having a positive refracting power is provided between the aforementioned movable negative lens group and the aforementioned movable positive lens group, and the distance between the second positive lens group and the aperture stop is kept constant during zooming from the wide angle end to the telephoto end. By the effect of the second positive lens group, the beam diameter in the movable positive lens group that moves during zooming can be reduced, which facilitates a reduction in the size of the movable positive lens group. This is advantageous in reducing the size of the image pickup apparatus with respect to the thickness direction. Since the second positive lens group need not have a strong positive refracting power, the second positive lens group may be composed of one lens component, and the distance between it and the aperture stop may be kept constant. This is advantageous in providing a space for movement of the movable negative lens group and the movable positive lens group that move during zooming and in simplifying the mechanism.

It is also preferred that the zoom lens include a lens group closest to the image that is disposed between the movable positive lens group and the image pickup surface and located closest to the image pickup surface among the lens groups in the zoom lens. Having this lens group is advantageous in improving the performance. If this lens group has a positive refracting power, the achievement of telecentricity is facilitated. If this lens group has a negative refracting power, a reduction in the size of the zoom lens is facilitated. If this lens group is moved during zooming, correction of aberrations and an increase in the zoom ratio are facilitated. This lens group may be moved for focusing.

It is also preferred that the lens group closest to the image side be a lens group having a positive refracting power, and the zoom lens be a four-group zoom lens. Then, the magnification changing function is shared among the movable negative lens group and the movable positive lens group, whereby each one of these lens groups is prevented from having an unduly high refracting power, and aberrations can be made smaller. This is also advantageous in achieving telecentricity. Therefore, the zoom lens can be composed of a small number of lens groups.

Furthermore, the zoom lens may be a five-group zoom lens, in which a second positive lens group having a positive refracting power may be provided in the optical path between the movable negative lens group and the movable positive lens group, and the aforementioned lens group closest to the image side may be a lens group having a positive refracting power. If this is the case, the magnification changing function can be shared among the movable negative lens group and the movable positive lens group, whereby aberrations can be reduced. The second positive lens group can decrease the beam diameter in the movable positive lens group. This is advantageous in slimming the entire zoom lens. This is also advantageous in achieving telecentricity. Therefore, a small size, high performance zoom lens with a small number of lens groups can be provided.

It is also preferred that the aforementioned lens group closest to the image side be composed of, one positive lens component having a positive refracting power. Here, it is preferred that the lens group closest to the image side, which is located close to the image pickup surface, be composed of one positive lens component to facilitate size reduction, because this lens group need not have a high refracting power. Here, the lens component is defined as a lens member whose surfaces that are in contact with air on an optical axis include only two surfaces or an object side surface and an image side surface. The lens component refers to a single lens or a cemented lens.

It is preferred that the movable positive lens group includes at least three positive lenses and at least two negative lenses. If the movable positive lens group includes three or more positive lenses, the positive refracting power can be shared among the positive lenses, and aberrations generated by the positive lenses can be cancelled by the plurality of negative lenses. This is advantageous in providing an adequate positive refracting power and in reducing aberrations.

It is also preferred that the movable positive lens group includes a plurality of cemented lenses each produced by cementing a positive lens and a negative lens. If this is the case, influences of decentering of the positive lens and the negative lens can be reduced, and including a plurality of cemented lenses is advantageous in reducing chromatic aberrations.

Furthermore, it is preferred that the movable positive lens group be composed of three lens components, or a first lens component, a second lens component, and a third lens component arranged in order in the optical path from the object side to the image side, the first lens component have a positive refracting power, the second lens component have a positive refracting power, the third lens component be a meniscus lens component having an object side surface convex toward the object side and an image side surface concave toward the image side, and a plurality of lens components including the meniscus lens component among the first, second, and third lens components be cemented lens components each of which includes a positive lens and a negative lens.

If this is the case, the principal point of the movable positive lens group can be made closer to the object side, which is advantageous in achieving an adequate zoom ratio relative to the movement amount of the movable lens groups. As the two positive lens components are disposed on the aperture stop side, light beams incident on the movable positive lens group is made convergent. This is advantageous for size reduction. As off-axis beams are refracted by the image side surface of the third lens component in directions away from the optical axis, the size of the third lens group relative to the size of the image pickup surface can be decreased. This is advantageous for size reduction. In addition, a plurality of lens components including the meniscus lens component are cemented lenses each made up of a positive lens and a negative lens. This is advantageous in reducing aberrations such as chromatic aberrations and in achieving high performance.

It is also preferred that the first lens component in the movable positive lens group have an object side surface convex toward the object side, and the second lens component have an object side surface convex toward the object side.

Then, the divergence of beams incident on the convex object side surface of the movable positive lens is first decreased. In addition, as the object side surface of the second lens component is a convex surface, the image side surface of the second lens component can be prevented from having a strong positive refracting power. This is advantageous from the viewpoint of aberration correction.

It is also preferred that the second lens component in the movable positive lens group have a shape that satisfies the following conditional expression (1A):

$$-30<(R_{2F}+R_{2B})/(R_{2F}-R_{2B})<0.9 \quad (1A),$$

where $R_{2F}$ is the paraxial radius of curvature of the object side surface of the second lens component in the movable positive lens group, and $R_{2B}$ is the paraxial radius of curvature of the image side surface of the second lens component in the movable positive lens group.

If the lower limit of conditional expression (1A) is not exceeded so that the image side surface of the second lens component does not become strongly concave, the second lens component can have an adequate positive refracting power advantageously.

If the upper limit of conditional expression (1A) is not exceeded so that the image side surface of the second lens component does not become strongly convex, a reduction in aberrations generated by this surface is facilitated.

It is also preferred that the second lens component in the movable positive lens group have an image side surface concave toward the image side.

This facilitates shifting the principal point of the second lens component closer to the object side. This is advantageous in achieving an adequate zoom ratio.

Furthermore, it is preferred that the first lens component in the movable positive lens group have an object side surface convex toward the object side, and the second lens component have an object side surface convex toward the object side and an image side surface convex toward the image side. If this is the case, the divergence of beams incident on the convex object side surface of the movable positive lens is first decreased. In addition, as the second lens component disposed at the center of the movable positive lens group has a biconvex shape, the positive refracting power can be shared. This is advantageous in achieving a size reduction and a reduction in spherical aberration.

It is also preferred that the second lens component be a cemented lens component made up of a biconvex lens and a negative meniscus lens and satisfy the following conditional expression (1):

$$-0.9<(R_{2F}+R_{2B})/(R_{2F}-R_{2B})<0.9 \quad (1),$$

where $R_{2F}$ is the paraxial radius of curvature of the object side surface of the second lens component in the movable positive lens group, and $R_{2B}$ is the paraxial radius of curvature of the image side surface of the second lens component in the movable positive lens group.

If this is the case, aberrations can easily be reduced even if the positive refracting power is concentrated to the second lens component. If neither the lower limit nor the upper limit of conditional expression (1) is exceeded, the positive refracting power of the second lens component can be appropriately shared among its object side surface and image side surface. This is advantageous in reducing axial aberrations etc. In addition, having a negative lens in the second component facilitates a reduction of chromatic aberrations.

It is also preferred in the movable positive lens group that the first lens component be a single aspheric lens having a biconvex shape, the second lens component be a cemented lens component including a positive lens and a negative lens, and the third lens component be a cemented lens component made up of a biconvex positive lens and a biconcave negative lens arranged in order from the object side to the image side in the optical path. If the movable positive lens has this configuration, good balance among the sharing of the positive refracting power in the movable positive lens group, correction of spherical aberration and coma by the aspheric surface, cancellation of aberrations by the provision of the negative lenses, adjustment of the principal point, and size can be achieved. Thus, the movable positive lens group can easily be designed to have an adequate refracting power and provide an adequate contribution to the magnification change. Furthermore, if the first lens component is a single double-sided aspheric lens, better correction of spherical aberration etc. can be achieved.

It is preferred that the movable positive lens group include a biconcave lens disposed closest to the image side and a biconvex lens disposed second closest to the image side and satisfy the following conditional expression (2):

$$0.1<N_{n1}-N_{p1}<0.7 \quad (2),$$

where $N_{n1}$ is the refractive index of the biconcave lens located closest to the image side in the movable positive lens group for the d-line, and $N_{p1}$ is the refractive index of the biconvex lens located second closest to the image side in the movable positive lens group for the d-line.

If the surface located closest to the image side in the movable positive lens group is a concave surface as above, spherical aberration etc. generated by the positive lenses in the movable positive lens group can be cancelled, and refraction of off-axis beams toward directions away from the optical axis can be facilitated. This is advantageous in reducing the diametrical size of the movable positive lens group.

On the other hand, if the refracting power of this concave surface is too high, it becomes difficult to correct higher order off-axis aberrations. Therefore, it is preferred that the two lenses located closest to the image side in the movable positive lens group be composed of a biconvex lens and a biconcave lens. If this is the case, the principal point can easily made closer to the object side. In addition, the negative refracting power can be shared among the object side surface and the image side surface of the biconcave negative lens. This is advantageous in reducing higher order off-axis aberrations.

If the lower limit of conditional expression (2) is not exceeded, an advantage is obtained in that a reduction of off-axis aberrations is facilitated. If the upper limit of conditional expression (2) is not exceeded so that the biconvex lens has an adequate refractive index while the refractive index of the biconcave lens is restricted, an advantage is obtained in that the positive lens group can have an adequate positive refracting power.

Furthermore, it is preferred that the biconcave lens in the movable positive lens group satisfy the following conditional expressions (3) and (4):

$$15<\nu_{n1}<35 \quad (3)$$

$$1.8<N_{n1}<2.5 \quad (4),$$

where $\nu_{n1}$ is the Abbe number of the biconcave lens located closest to the image side in the movable positive lens group, and $N_{n1}$ is the refractive index of the biconcave lens located closest to the image side in the movable positive lens group for the d-line.

Conditional expressions (3) and (4) are conditions for achieving adequate aberration correction by the biconcave lens. Optical materials having an Abbe number exceeding the lower limit of the conditional expression limiting the Abbe number are not generally found. If the upper limits of conditional expressions (3) and (4) are not exceeded, cancellation of chromatic aberrations attributed to the dispersion of the biconcave lens is facilitated. In addition, if the biconcave lens has an adequate refractive index, an advantage is obtained in that a reduction in higher order spherical aberration is facilitated. If the lower limits of conditional expressions (3) and (4) are not exceeded so that the biconcave lens has an adequate refractive index, the curvature of the biconcave surface can be made small. This is advantageous in reducing higher order aberrations. In view of the availability of the material, it is preferred that the refractive index of the biconcave lens be not higher than 2.5. The biconcave lens may generate moderate aberrations, with which cancellation of aberrations generated by the positive lenses in the movable positive lens group is facilitated.

It is also preferred that the biconcave lens and the biconvex lens in the movable positive lens group be cemented together. This facilitates a reduction of relative decentering of these lenses, whereby aberrations are less affected by manufacturing errors.

It is preferred that the movable positive lens group includes a biconvex lens and a negative meniscus lens arranged adjacent to each other on the object side of the lens located second closest to the image side in the movable positive lens group, and the negative meniscus lens have a concave surface facing the adjacent biconvex lens. The composite system of the biconvex lens and the negative meniscus lens provides a further advantage in achieving both an adequate positive refracting power of the movable positive lens group and correction of aberrations.

In addition, it is preferred that the biconvex lens and the negative meniscus lens arranged adjacent to each other on the object side of the lens located second closest to the image side in the movable positive lens group satisfy the following conditional expression (5):

$$25 < \nu_{p2} - \nu_{n2} < 70 \tag{5}$$

where $\nu_{p2}$ is the Abbe number of the biconvex lens in the movable positive lens group, and $\nu_{n2}$ is the Abbe number of the negative meniscus lens in the movable positive lens group.

If the lower limit of conditional expression (5) is not exceeded, an advantage is obtained in that correction of chromatic aberrations by the negative meniscus lens is facilitated. If the upper limit is not exceeded, a decrease in the ease of machining of the lens material used can easily be prevented.

It is also preferred that the negative meniscus lens in the movable positive lens group be disposed on the image side of the adjacent biconvex lens, and the negative meniscus lens have a shape that satisfy the following conditional expression (6):

$$-8.0 < (R_{nmF} + R_{nmB})/(R_{nmF} - R_{nmB}) < -1.0 \tag{6}$$

where $R_{nmF}$ is the paraxial radius of curvature of the object side surface of the negative meniscus lens in the movable positive lens group, and $R_{nmB}$ is the paraxial radius of curvature of the image side surface of the negative meniscus lens in the movable positive lens group.

If the lower limit of conditional expression (6) is not exceeded, the negative meniscus lens can have an adequate negative refracting power, and correction of aberrations is facilitated. If the upper limit of conditional expression (6) is not exceeded, the convex surface of the meniscus lens can be maintained, and a reduction of axial aberrations can be facilitated.

It is also preferred that the movable positive lens group be composed, in order from the object side to the image side, of a first lens having a positive refracting power, a second lens having a positive refracting power, a third lens having a negative refracting power, a fourth lens having a positive refracting power, and a fifth lens having a negative refracting power. If this is the case, even if the movable positive lens group is designed to have a sufficiently high refracting power for achieving the magnification change, the positive refracting power can be shared among the three positive lenses, and good correction of aberrations can be achieved by the two negative lenses.

Furthermore, the principal point of the movable positive lens group can be made closer to the object side by the two negative lenses, and an adequate magnification change can be achieved even if the distance between the movable negative lens group and the movable positive lens group is kept large, in particular at the telephoto end. Therefore, a space for the aperture stop and the second positive lens group can be provided. Still further, with this lens configuration, the height of off-axis rays can be made low in particular at the wide angle end, and therefore the size of the movable positive lens group can be made small with respect to the diametrical direction.

This enables a reduction in the thickness of the image pickup apparatus, because the diameter of the movable positive lens group affects the thickness of the image pickup apparatus. In addition, since the sharing of the positive refracting power can be achieved without difficulty, axial aberrations at the telephoto end and off-axis aberrations at the wide angle end can be corrected excellently.

Furthermore, it is preferred that the second lens and the third lens in the movable positive lens group be cemented to each other. The movable positive lens group affects the axial chromatic aberrations throughout the entire zoom range. If the second lens and the third lens are cemented, correction of axial chromatic aberrations is facilitated throughout the entire zoom range. By cementing the lenses, deterioration of performance due to manufacturing errors can be reduced.

It is also preferred that the third lens in the movable positive lens have a meniscus shape that satisfies the following conditional expression (7):

$$-8.0 < (R_{13} + R_{23})/(R_{13} + R_{23}) < -1.0 \tag{7}$$

where $R_{13}$ is the paraxial radius of curvature of the object side surface of the third lens, and $R_{23}$ is the paraxial radius of curvature of the image side surface of the third lens.

If the lower limit of conditional expression (7) is not exceeded, the third lens can have an adequate negative refracting power, and correction of aberrations is facilitated. If the upper limit of conditional expression (7) is not exceeded, the convex surface of the meniscus lens can be maintained, and a reduction of axial aberrations can be facilitated.

It is also preferred that the movable positive lens group include a positive plastic lens. Since the movable positive lens group includes five or more lenses, it is possible to correct axial chromatic aberrations while designing the lens group to have an adequate positive refracting power, the lens material of a positive lens may be a plastic, whereby the manufacturing cost can be reduced. The single aspheric lens may be made of a plastic. This advantageously facilitates machining of the aspheric surface.

It is preferred that during zooming from the wide angle end to the telephoto end, the movable positive lens group move in such a way that the following conditional expression (8) is satisfied:

$$1.3 < \beta_{GT}/\beta_{GW} < 3.5 \tag{8}$$

where $\beta_{GW}$ is the lateral magnification of the positive lens group at the wide angle end, and $\beta_{GT}$ is the lateral magnification of the positive lens group at the telephoto end.

Conditional expression (8) specifies preferred magnification changes provided by the movable positive lens group that are advantageous in achieving a wide angle of view and a high zoom ratio, and in slimming of the image pickup apparatus. If the lower limit of conditional expression (8) is not exceeded so that the movable positive lens group provides an adequate contribution to the magnification change, the contribution of the movable negative lens group to the magnification change can be made small, which leads to a reduction in the size of the optical path reflecting lens group. If the upper limit of conditional expression (8) is not exceeded so that the contribution of the movable positive lens group to the magnification change is made small, the refracting power of the third lens group can be made small. This is advantageous in reducing off-axis aberrations etc. at the telephoto end.

It is also preferred that the movable positive lens group satisfy the following conditional expression (9):

$$0.13 < D_g/D_{all} < 0.24 \quad (9),$$

where $D_g$ is the thickness of the movable positive lens group on the optical axis, and $D_{all}$ is the optical path length from the object side surface of the lens located closest to the object side in the zoom lens to the image pickup surface of the image pickup element along the optical axis.

Conditional expression (9) relates to preferred values of the thickness of the movable positive lens group. If the lower limit of conditional expression (9) is not exceeded so that the movable positive lens group has an adequate thickness on the optical axis, an advantage is obtained in that an adequate positive refracting power and correction of aberrations are both achieved in the case where five or more lenses are provided in the movable positive lens group. It is preferred that the upper limit be not exceeded so that the thickness of the movable positive lens group is restricted and a space for movement of the lens group during zooming can easily be provided.

It is also preferred that the zoom lens satisfy the following conditional expression (10):

$$3.0 < f_t/f_W < 10 \quad (10),$$

where $f_W$ is the focal length of the entire zoom lens system at the wide angle end, and $f_t$ is the focal length of the entire zoom lens system at the telephoto end.

Conditional expression (10) specifies preferred values of the zoom ratio of the zoom lens. It is preferred that the lower limit thereof is not exceeded so that a zoom ratio that enables shooting of various scenes is realized. If the upper limit thereof is not exceeded so that the zoom ratio is restricted, the size of the reflecting member can easily made small. This is advantageous in slimming the image pickup apparatus.

It is also preferred that the image pickup apparatus have a processing circuit that transforms a signal representing an image formed on the image pickup surface and containing distortion attributed to the zoom lens into a signal that has been corrected in terms of distortion. There tends to be a trade off between distortion and astigmatism. If the apparatus has the above-described processing circuit, the zoom lens is allowed to have distortion. Therefore, a reduction of astigmatism of the zoom lens and a size reduction are facilitated.

Furthermore, it is preferred that the image pickup apparatus have a processing circuit that transforms a signal representing an image formed on the image pickup surface and containing chromatic aberration of magnification attributed to the zoom lens into a signal that has been corrected in terms of chromatic aberration. If this is the case, the zoom lens is allowed to have chromatic aberration of magnification. This is advantageous in reducing the cost and achieving high performance.

It is also preferred that the movable positive lens group comprise a cemented doublet lens component, and the cemented doublet lens component comprise, in order from the object side to the image side, a negative meniscus lens that is convex toward the object side and a positive meniscus lens that is concave toward the image side.

Having a cemented doublet lens component in the movable positive lens group is advantageous in correcting chromatic aberrations.

In this case, the cemented doublet lens component may be made up of a biconvex lens and a biconcave lens arranged in order from the object side. This is advantageous in correcting chromatic aberrations, because off-axis beams can be incident on the cemented surface at appropriate angles if this is the case.

On the other hand, in order to reduce deterioration of performance due to a manufacturing error in the air gap immediately before and on the object side of the cemented lens, the cemented lens component may be composed of a negative meniscus lens and a positive meniscus lens arranged in order as described above. In addition, it is preferred that the angles of incidence of beams on the surfaces of the cemented lens component be made small so that aberration be less affected by a manufacturing error.

It is preferred that two or more of the above-described features and the conditional expressions be adopted or satisfied at the same time.

In conditional expression (1), it is more preferred that the lower limit value be −0.7, more preferably −0.5, still more preferably −0.3, and the upper limit value be 0.7, more preferably 0.5.

In conditional expression (2), it is more preferred that the lower limit value be 0.2, more preferably 0.3, still more preferably 0.4, and the upper limit value be 0.6, more preferably 0.55.

In conditional expression (3), it is more preferred that the lower limit value be 20, more preferably 23, and the upper limit value be 32, more preferably 30, still more preferably 29, still more preferably 26.

In conditional expression (4), it is more preferred that the lower limit value be 1.9, more preferably 2.0, and the upper limit value be 2.4, more preferably 2.3.

In conditional expression (5), it is more preferred that the lower limit value be 30, more preferably 35, and the upper limit value be 60, more preferably 50.

In conditional expression (6), it is more preferred that the lower limit value be −6.0, more preferably −5.0, and the upper limit value be −1.5, more preferably −2.0.

In conditional expression (7), it is more preferred that the lower limit value be −6.0, more preferably −5.0, and the upper limit value be −1.5, more preferably −2.0.

In conditional expression (8), it is more preferred that the lower limit value be 1.6, more preferably 1.9, and the upper limit value be 3.0, more preferably 2.8.

In conditional expression (9), it is more preferred that the lower limit value be 0.14, more preferably 0.15, and the upper limit value be 0.21, more preferably 0.19.

In conditional expression (10), it is more preferred that the lower limit value be 4.0, more preferably 4.6, still more preferably 4.9, and the upper limit value be 8, more preferably 7.

In the following, embodiments of the image pickup apparatus according to the present invention will be described in detail with reference to the drawings. The present invention is not limited to the embodiments.

(Embodiments)

In the following, a first to tenth embodiments of the zoom lens and the image pickup apparatus according to the present invention will be described. FIGS. 1A to 10C, 26A to 26C, and 28A to 28C are cross sectional views showing the lenses according to the first to twelfth embodiments respectively at the wide angle end (FIGS. 1A, 2A, 3A, 4A, 5A, 6A, 7A, 8A, 9A, 10A, 26A, and 28A), in an intermediate focal length state (FIGS. 1B, 2B, 3B, 4B, 5B, 6B, 7B, 8B, 9B, 10B, 26B, and 28B), and at the telephoto end (FIGS. 10, 2C, 3C, 4C, 5C, 6C, 7C, 8C, 9C, 10C, 26C, and 28C) in the state in which the zoom lenses are focused on an object point at infinity. In the drawings, a first lens group is denoted by G1, a second lens group is denoted by G2, an aperture stop is denoted by S, a third lens group is denoted by G3, a fourth lens group is denoted by G4, a fifth lens group is denoted by G5, a plane parallel plate having wavelength range restriction coating applied thereon that reduces infrared light, constituting a low pass filter is denoted by F, a plane parallel plate constituting a cover glass for an electronic image pickup element is denoted by C, and the image plane is denoted by I. The cover glass C may have multi-layer film for wavelength range restriction applied on its surface. The cover glass C may be designed to have the function of a low pass filter.

In the embodiments, the aperture stop S is not moved but fixed. All the numerical data are for the state in which the zoom lens is focused on an object at infinity. Dimensions are in mm (millimeters) and angles are in degrees. In all the embodiments, the image height $I_m$ is 3.84 mm. Zoom data will be presented for the wide angle end (WE), the intermediate focal length state (ST) defined in connection with the present invention, and the telephoto end (TE).

Figure 1B:
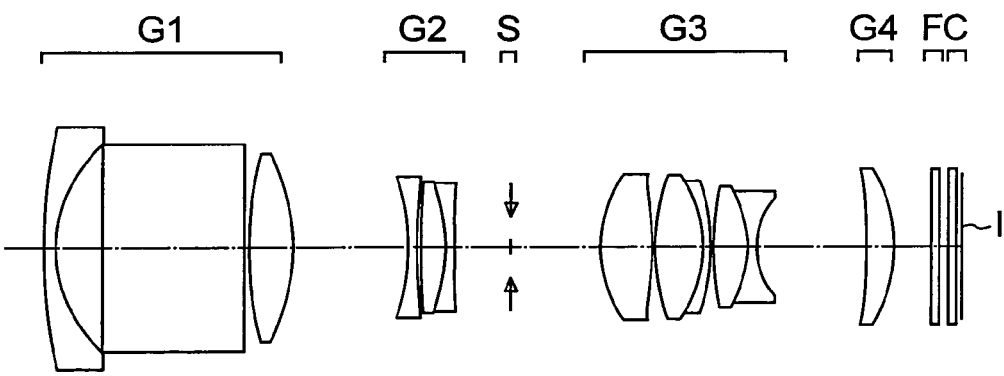
Figure 1C:
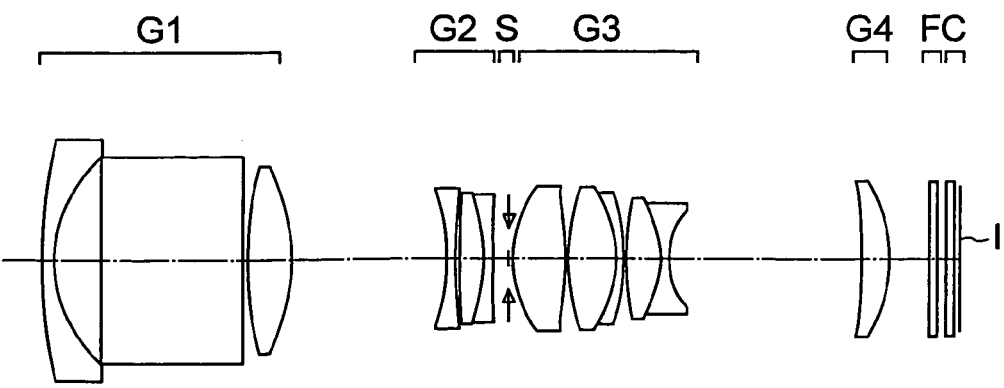

As shown in FIGS. 1A, 1B, and 1C, the zoom lens according to the first embodiment includes, in order from the object side thereof, a first lens group G1 having a positive refracting power (which is the optical path reflecting lens group), a second lens group G2 having a negative refracting power (which is the movable negative lens group), an aperture stop S, a third lens group G3 having a positive refracting power (which is the movable positive lens group), and a fourth lens group G4 having a positive refracting power (which is the lens group closest to the image side).

During zooming from the wide angle end to the telephoto end, the first lens group G1 is kept stationary, the second lens group G2 moves toward the image side, the third lens group G3 moves toward the object side, and the fourth lens group G4 moves toward the image side and thereafter toward the object side.

Focusing is performed by moving the fourth lens group G4, and the focusing operation from a long distance object point to a short distance object point is performed by moving the fourth lens group G4 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a biconvex positive lens and a biconcave negative lens. The third lens group G3 is composed of a biconvex positive lens, a cemented lens made up of a biconvex positive lens and a negative meniscus lens having a convex surface directed toward the image side, and a cemented lens made up of a biconvex positive lens and a biconcave negative lens. The fourth lens group G4 is composed of a positive meniscus lens having a convex surface directed toward the image side.

The following six surfaces are aspheric surfaces: both surfaces of the biconvex positive lens in the first lens group G1, both surfaces of the object side biconcave negative lens in the second lens group G2, and both surfaces of the biconvex positive lens located closest to the object side in the third lens group G3.

Figure 2A:
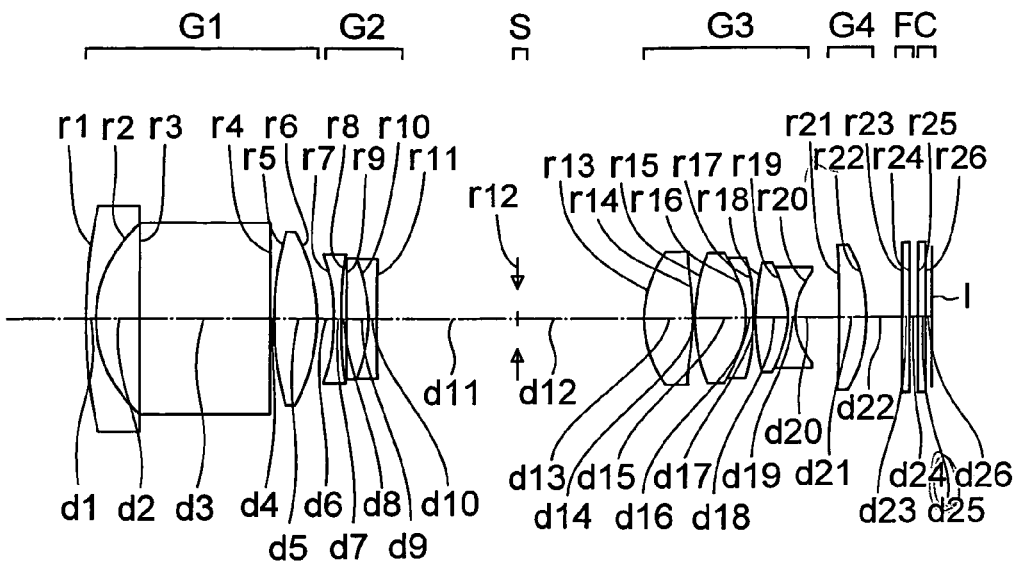
FIGS. 2A, 2B, and 2C are cross sectional views similar to FIGS. 1A, 1B, and 1C, showing a zoom lens according to a second embodiment of the present invention.
Figure 2B:
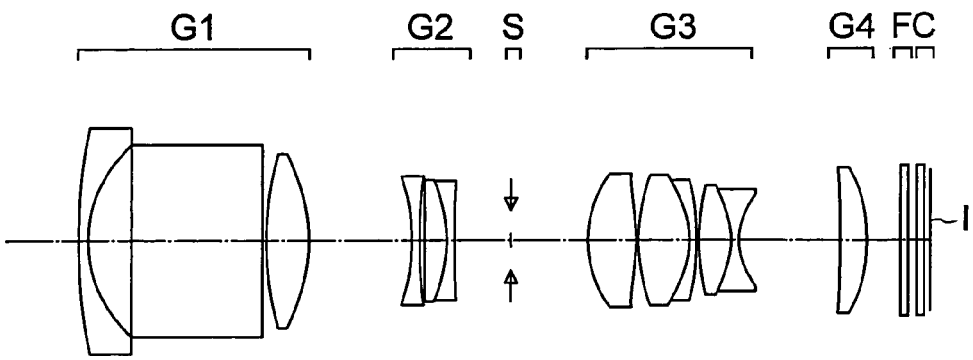
Figure 2C:
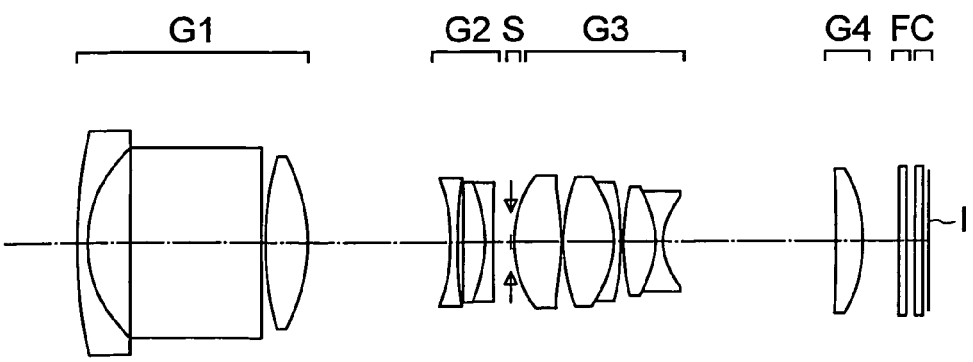

As shown in FIGS. 2A, 2B, and 2C, the zoom lens according to the second embodiment includes, in order from the object side thereof, a first lens group G1 having a positive refracting power (which is the optical path reflecting lens group), a second lens group G2 having a negative refracting power (which is the movable negative lens group), an aperture stop S, a third lens group G3 having a positive refracting power (which is the movable positive lens group), and a fourth lens group G4 having a positive refracting power (which is the lens group closest to the image side).

During zooming from the wide angle end to the telephoto end, the first lens group G1 is kept stationary, the second lens group G2 moves toward the image side, the third lens group G3 moves toward the object side, and the fourth lens group G4 moves toward the image side and thereafter toward the object side.

Focusing is performed by moving the fourth lens group G4, and the focusing operation from a long distance object point to a short distance object point is performed by moving the fourth lens group G4 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a positive meniscus lens having a convex surface directed toward the image side and biconcave negative lens. The third lens group G3 is composed of a biconvex positive lens, a cemented lens made up of a biconvex positive lens and a negative meniscus lens having a convex surface directed toward the image side, and a cemented lens made up of a biconvex positive lens and a biconcave negative lens. The fourth lens group G4 is composed of a positive meniscus lens having a convex surface directed toward the image side.

The following six surfaces are aspheric surfaces: both surfaces of the biconvex positive lens in the first lens group G1, both surfaces of the object side biconcave negative lens in the second lens group G2, and both surfaces of the biconvex positive lens located closest to the object side in the third lens group G3.

Figure 3A:
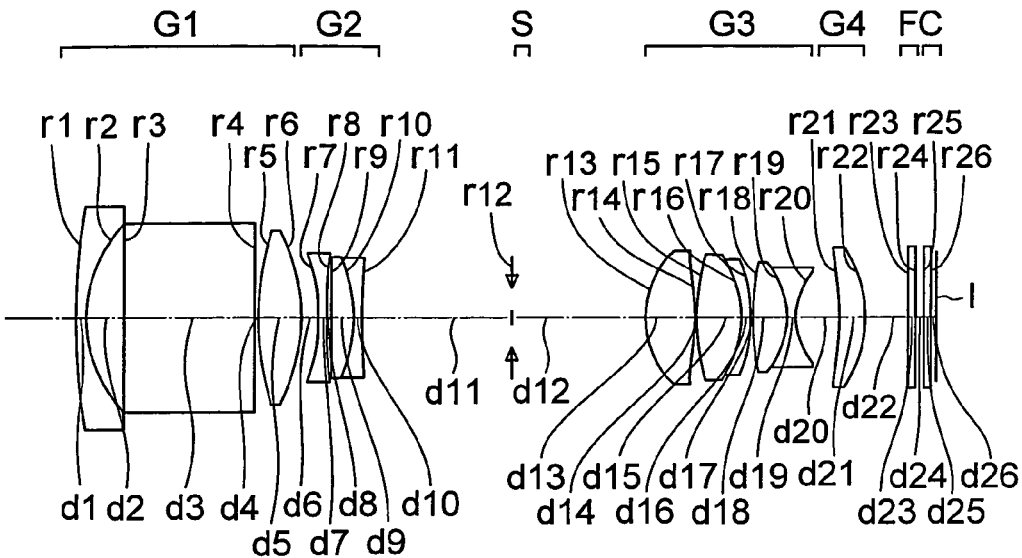
FIGS. 3A, 3B, and 3C are cross sectional views similar to FIGS. 1A, 1B, and 10, showing a zoom lens according to a third embodiment of the present invention.
Figure 3B:
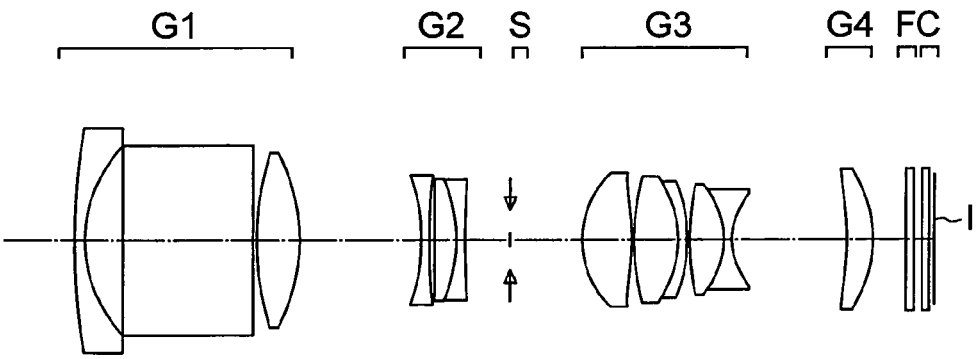
Figure 3C:
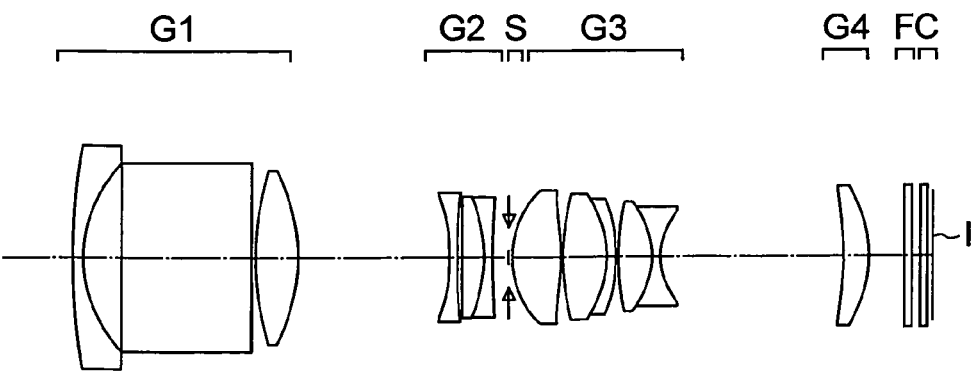

As shown in FIGS. 3A, 3B, and 3C, the zoom lens according to the third embodiment includes, in order from the object side thereof, a first lens group G1 having a positive refracting power (which is the optical path reflecting lens group), a second lens group G2 having a negative refracting power (which is the movable negative lens group), an aperture stop S, a third lens group G3 having a positive refracting power (which is the movable positive lens group), and a fourth lens group G4 having a positive refracting power (which is the lens group closest to the image side).

During zooming from the wide angle end to the telephoto end, the first lens group G1 is kept stationary, the second lens group G2 moves toward the image side, the third lens group G3 moves toward the object side, and the fourth lens group G4 moves toward the image side and thereafter toward the object side.

Focusing is performed by moving the fourth lens group G4, and the focusing operation from a long distance object point to a short distance object point is performed by moving the fourth lens group G4 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a positive meniscus lens having a convex surface directed toward the image side and biconcave negative lens. The third lens group G3 is composed of a biconvex positive lens, a cemented lens made up of a biconvex positive lens and a negative meniscus lens having a convex surface directed toward the image side, and a cemented lens made up of a biconvex positive lens and a biconcave negative lens. The fourth lens group G4 is composed of a positive meniscus lens having a convex surface directed toward the image side.

The following six surfaces are aspheric surfaces: both surfaces of the biconvex positive lens in the first lens group G1, both surfaces of the object side biconcave negative lens in the second lens group G2, and both surfaces of the biconvex positive lens located closest to the object side in the third lens group G3.

Figure 4A:
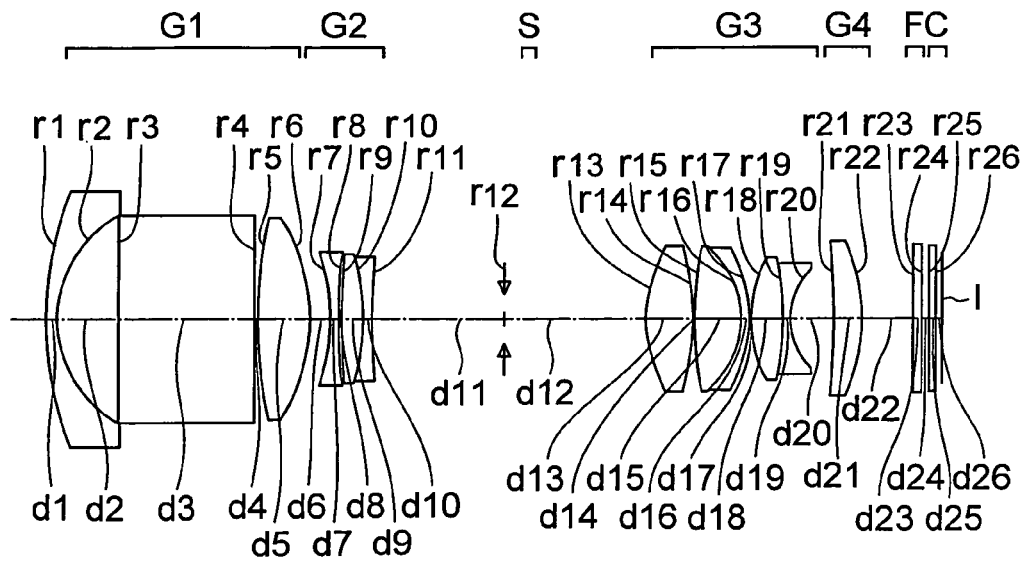
FIGS. 4A, 4B, and 4C are cross sectional views similar to FIGS. 1A, 1B, and 10, showing a zoom lens according to a fourth embodiment of the present invention.
Figure 4B:
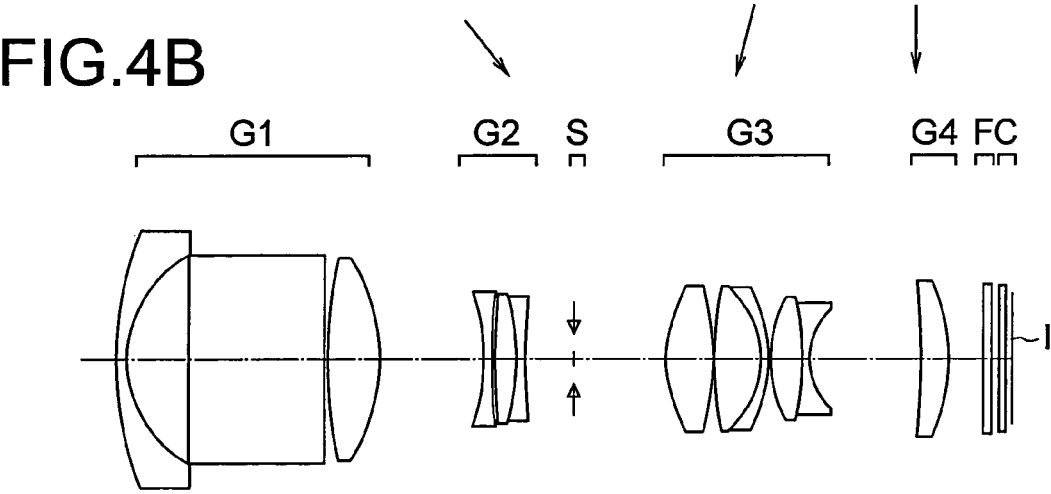
Figure 4C:
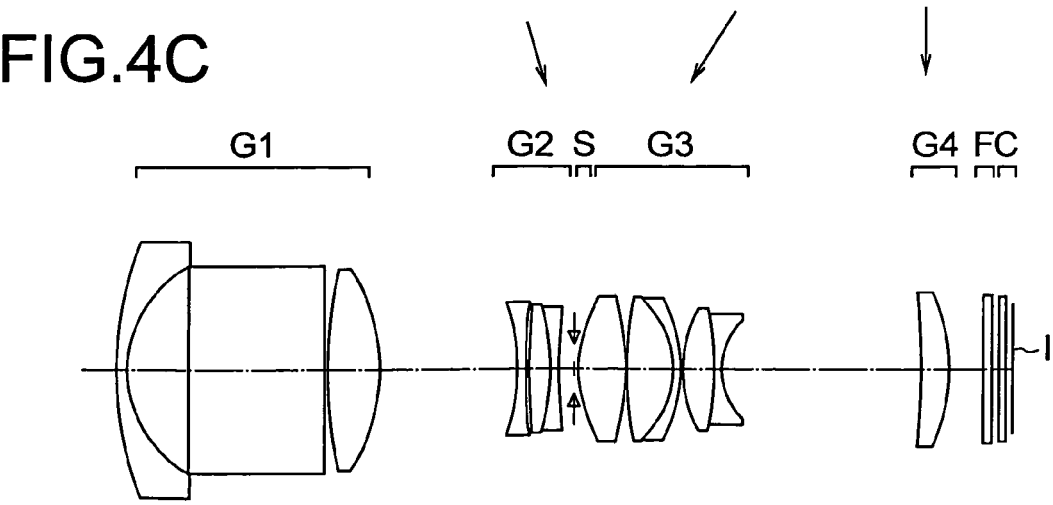

As shown in FIGS. 4A, 4B, and 4C, the zoom lens according to the fourth embodiment includes, in order from the object side thereof, a first lens group G1 having a positive refracting power (which is the optical path reflecting lens group), a second lens group G2 having a negative refracting power (which is the movable negative lens group), an aperture stop S, a third lens group G3 having a positive refracting power (which is the movable positive lens group), and a fourth lens group G4 having a positive refracting power (which is the lens group closest to the image side).

During zooming from the wide angle end to the telephoto end, the first lens group G1 is kept stationary, the second lens group G2 moves toward the image side, the third lens group G3 moves toward the object side, and the fourth lens group G4 moves toward the image side and thereafter toward the object side.

Focusing is performed by moving the fourth lens group G4, and the focusing operation from a long distance object point to a short distance object point is performed by moving the fourth lens group G4 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a biconvex positive lens and a biconcave negative lens. The third lens group G3 is composed of a biconvex positive lens, a cemented lens made up of a biconvex positive lens and a negative meniscus lens having a convex surface directed toward the image side, and a cemented lens made up of a biconvex positive lens and a biconcave negative lens. The fourth lens group G4 is composed of a positive meniscus lens having a convex surface directed toward the image side.

The following six surfaces are aspheric surfaces: both surfaces of the biconvex positive lens in the first lens group G1, both surfaces of the object side biconcave negative lens in the second lens group G2, and both surfaces of the biconvex positive lens located closest to the object side in the third lens group G3.

Figure 5A:
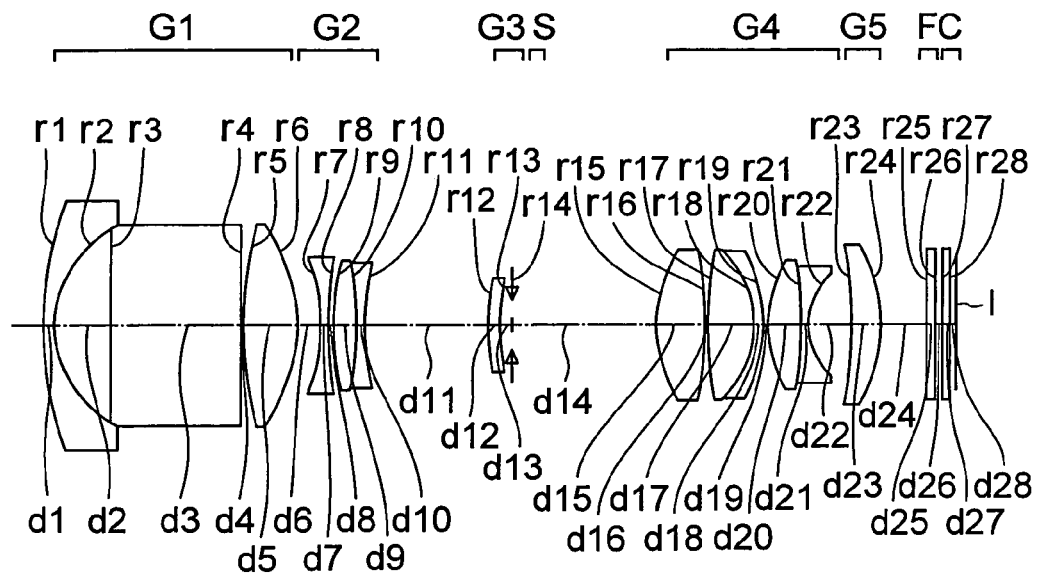
FIGS. 5A, 5B, and 5C are cross sectional views similar to FIGS. 1A, 1B, and 10, showing a zoom lens according to a fifth embodiment of the present invention.
Figure 5B:
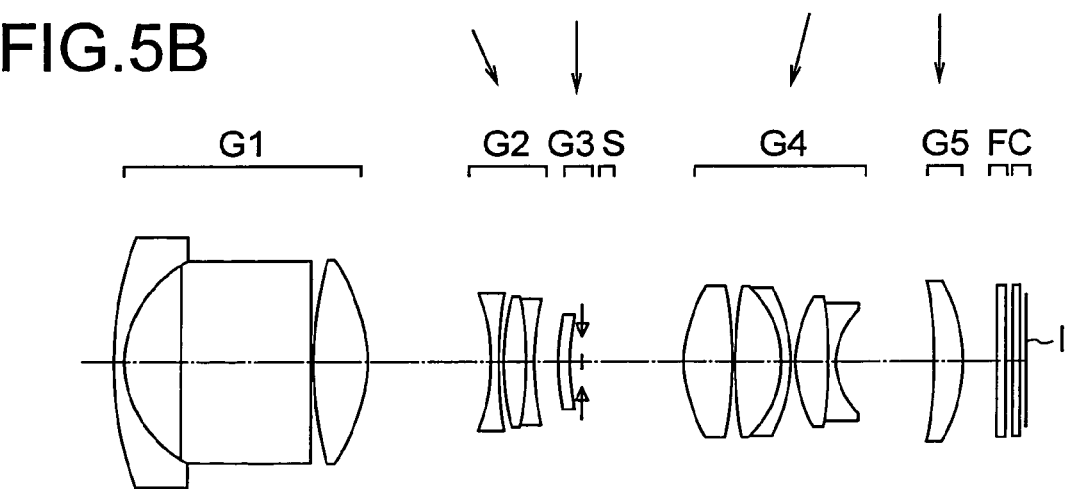
Figure 5C:
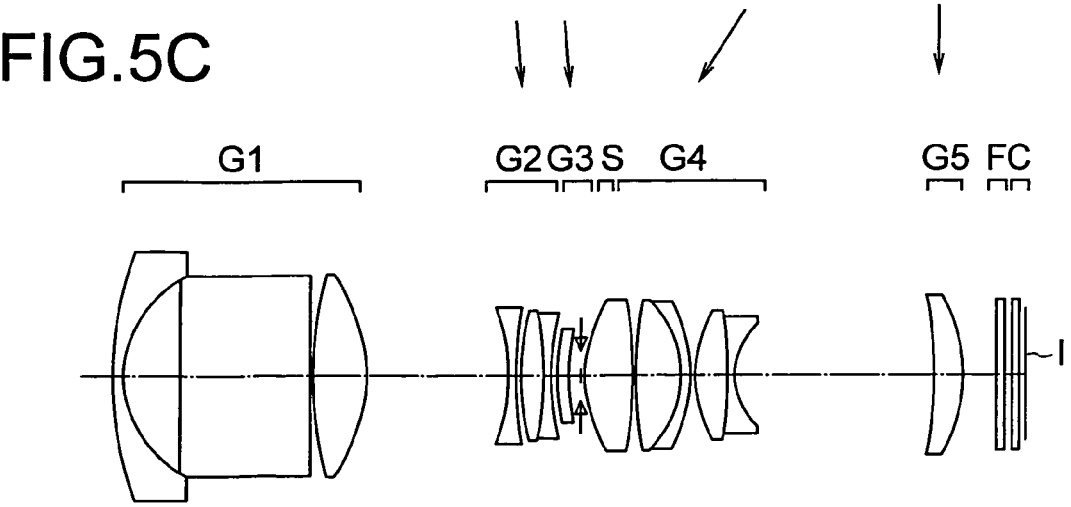

As shown in FIGS. 5A, 5B, and 5C, the zoom lens according to the fifth embodiment includes, in order from the object side thereof, a first lens group G1 having a positive refracting power (which is the optical path reflecting lens group), a second lens group G2 having a negative refracting power (which is the movable negative lens group), a third lens group G3 having a positive refracting power (which is the second positive lens group), an aperture stop S, a fourth lens group G4 having a positive refracting power (which is the movable positive lens group), and a fifth lens group G5 having a positive refracting power (which is the lens group closest to the image side).

During zooming from the wide angle end to the telephoto end, the first lens group G1 is kept stationary, the second lens group G2 moves toward the image side, the third lens group G3 is kept stationary, the fourth lens group G4 moves toward the object side, and the fifth lens group G5 moves toward the image side and thereafter toward the object side.

Focusing is performed by moving the fifth lens group G5, and the focusing operation from a long distance object point to a short distance object point is performed by moving the fifth lens group G5 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a biconvex positive lens and a biconcave negative lens. The third lens group G3 is composed of a positive meniscus lens having a convex surface directed toward the object side. The fourth lens group G4 is composed of a biconvex positive lens (which is a plastic lens), a cemented lens made up of a biconvex positive lens and a negative meniscus lens having a convex surface directed toward the image side, and a cemented lens made up of a biconvex positive lens and a biconcave negative lens. The fifth lens group G5 is composed of a positive meniscus lens having a convex surface directed toward the image side.

The following six surfaces are aspheric surfaces: both surfaces of the biconvex positive lens in the first lens group G1, both surfaces of the object side biconcave negative lens in the second lens group G2, and both surfaces of the biconvex positive lens located closest to the object side in the fourth lens group G4.

Figure 6A:
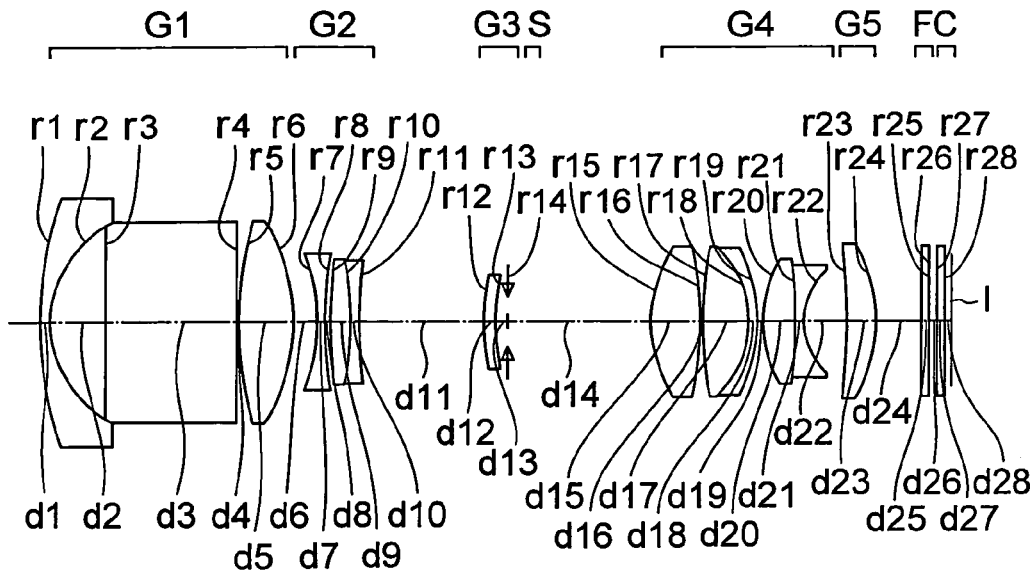
FIGS. 6A, 6B, and 6C are cross sectional views similar to FIGS. 1A, 1B, and 10, showing a zoom lens according to a sixth embodiment of the present invention.
Figure 6B:
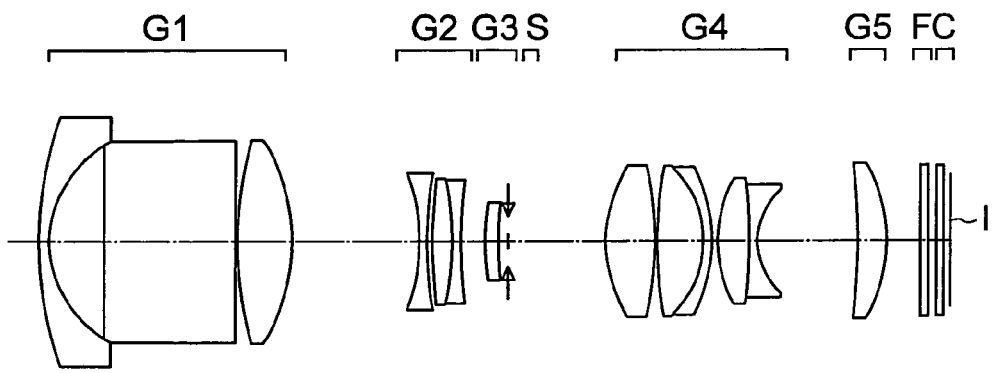
Figure 6C:
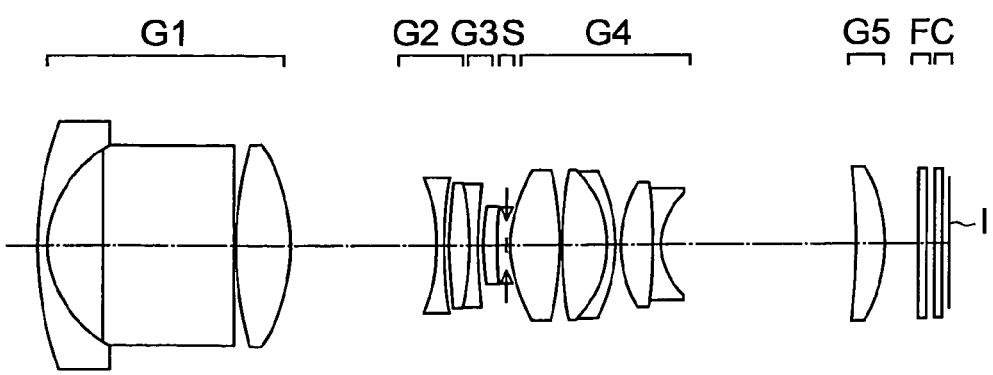

As shown in FIGS. 6A, 6B, and 6C, the zoom lens according to the sixth embodiment includes, in order from the object side thereof, a first lens group G1 having a positive refracting power (which is the optical path reflecting lens group), a second lens group G2 having a negative refracting power (which is the movable negative lens group), a third lens group G3 having a positive refracting power (which is the second positive lens group), an aperture stop S, a fourth lens group G4 having a positive refracting power (which is the movable positive lens group), and a fifth lens group G5 having a positive refracting power (which is the lens group closest to the image side).

During zooming from the wide angle end to the telephoto end, the first lens group G1 is kept stationary, the second lens group G2 moves toward the image side, the third lens group G3 is kept stationary, the fourth lens group G4 moves toward the object side, and the fifth lens group G5 moves toward the image side and thereafter toward the object side.

Focusing is performed by moving the fifth lens group G5, and the focusing operation from a long distance object point to a short distance object point is performed by moving the fifth lens group G5 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a biconvex positive lens and a biconcave negative lens. The third lens group G3 is composed of a positive meniscus lens having a convex surface directed toward the object side. The fourth lens group G4 is composed of a biconvex positive lens (which is a plastic lens), a cemented lens made up of a biconvex positive lens and a negative meniscus lens having a convex surface directed toward the image side, and a cemented lens made up of a biconvex positive lens and a biconcave negative lens. The fifth lens group G5 is composed of a positive meniscus lens having a convex surface directed toward the image side.

The following six surfaces are aspheric surfaces: both surfaces of the biconvex positive lens in the first lens group G1, both surfaces of the object side biconcave negative lens in the second lens group G2, and both surfaces of the biconvex positive lens located closest to the object side in the fourth lens group G4.

Figure 7A:
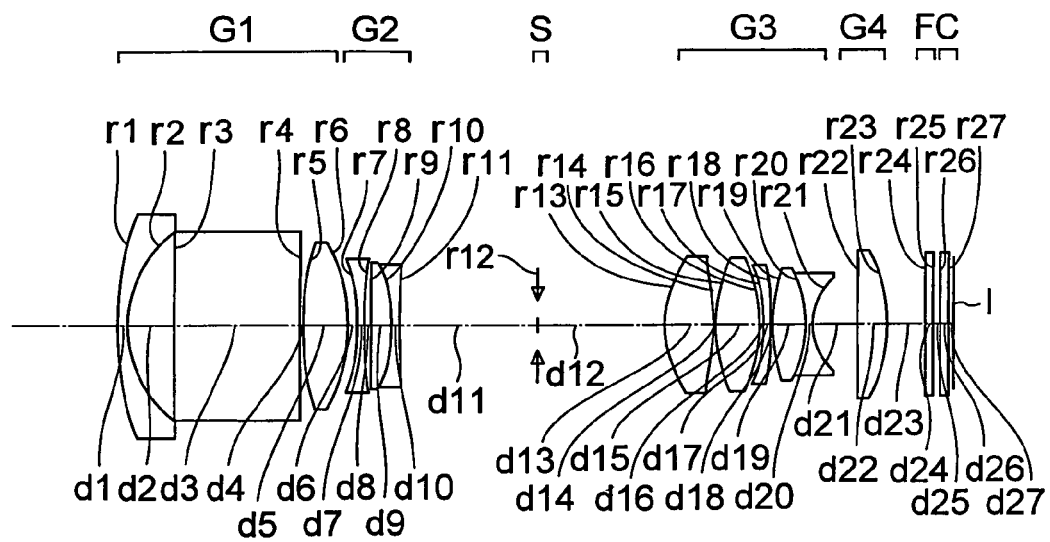
FIGS. 7A, 7B, and 7C are cross sectional views similar to FIGS. 1A, 1B, and 10, showing a zoom lens according to a seventh embodiment of the present invention.
Figure 7B:
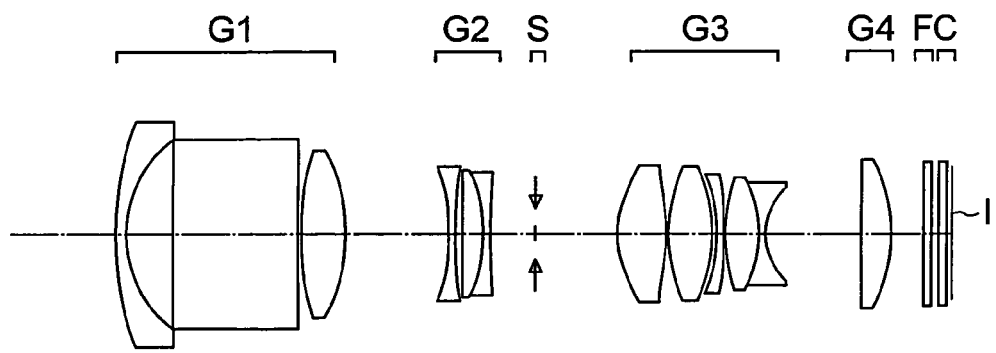
Figure 7C:
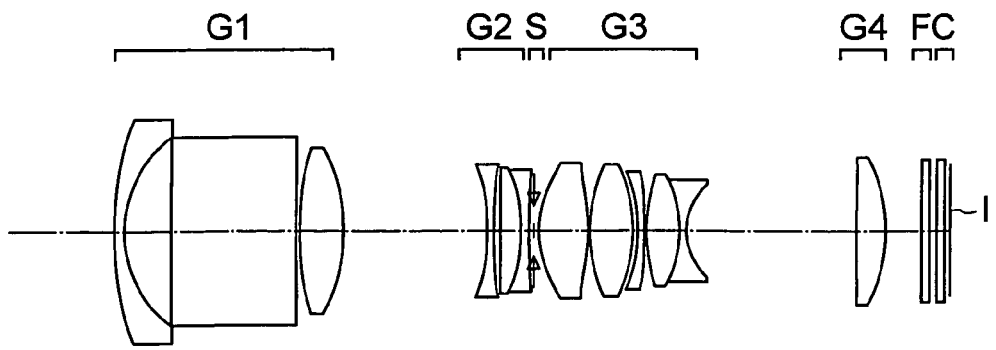

As shown in FIGS. 7A, 7B, and 7C, the zoom lens according to the seventh embodiment includes, in order from the object side thereof, a first lens group G1 having a positive refracting power (which is the optical path reflecting lens group), a second lens group G2 having a negative refracting power (which is the movable negative lens group), an aperture stop S, a third lens group G3 having a positive refracting power (which is the movable positive lens group), and a fourth lens group G4 having a positive refracting power (which is the lens group closest to the image side).

During zooming from the wide angle end to the telephoto end, the first lens group G1 is kept stationary, the second lens group G2 moves toward the image side, the third lens group G3 moves toward the object side, and the fourth lens group G4 moves toward the image side and thereafter toward the object side.

Focusing is performed by moving the fourth lens group G4, and the focusing operation from a long distance object point to a short distance object point is performed by moving the fourth lens group G4 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a positive meniscus lens having a convex surface directed toward the image side and a biconcave negative lens. The third lens group G3 is composed of a biconvex positive lens, a biconvex positive lens, a negative meniscus lens having a convex surface directed toward the image side, and a cemented lens made up of a biconvex positive lens and a biconcave negative lens. The fourth lens group G4 is composed of a positive meniscus lens having a convex surface directed toward the image side.

The following six surfaces are aspheric surfaces: both surfaces of the biconvex positive lens in the first lens group G1, both surfaces of the object side biconcave negative lens in the second lens group G2, and both surfaces of the biconvex positive lens located closest to the object side in the third lens group G3.

Figure 8A:
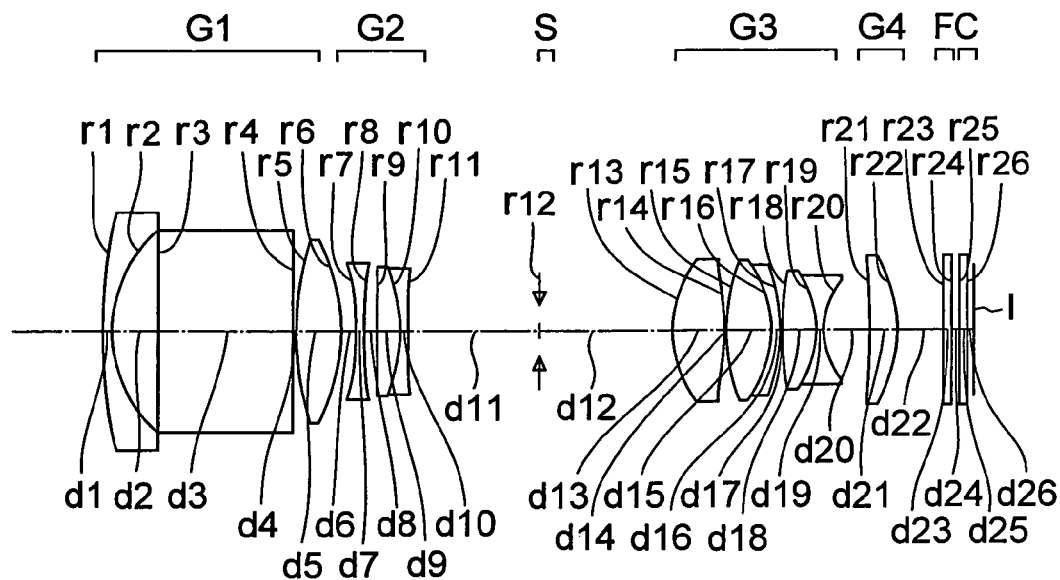
FIGS. 8A, 8B, and 8C are cross sectional views similar to FIGS. 1A, 1B, and 10, showing a zoom lens according to an eighth embodiment of the present invention.
Figure 8B:
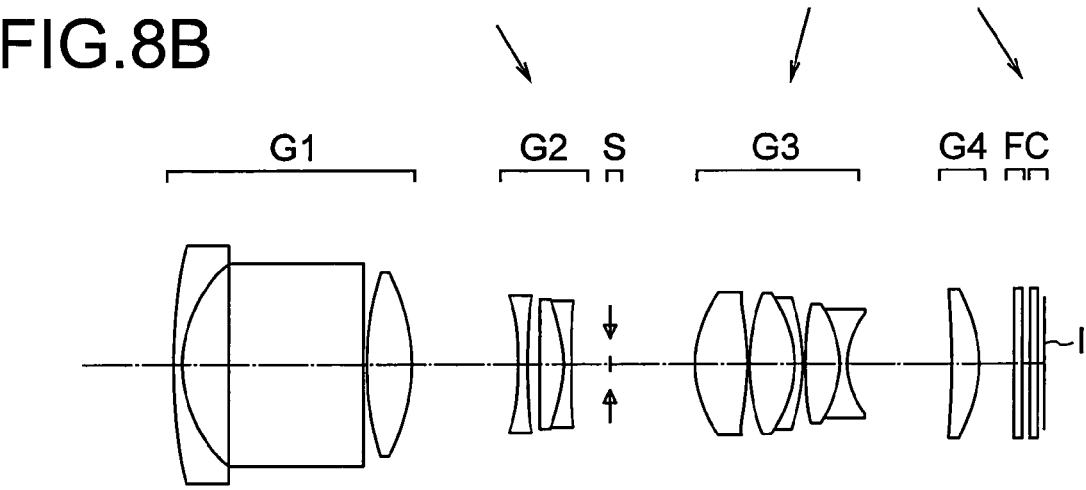
Figure 8C:
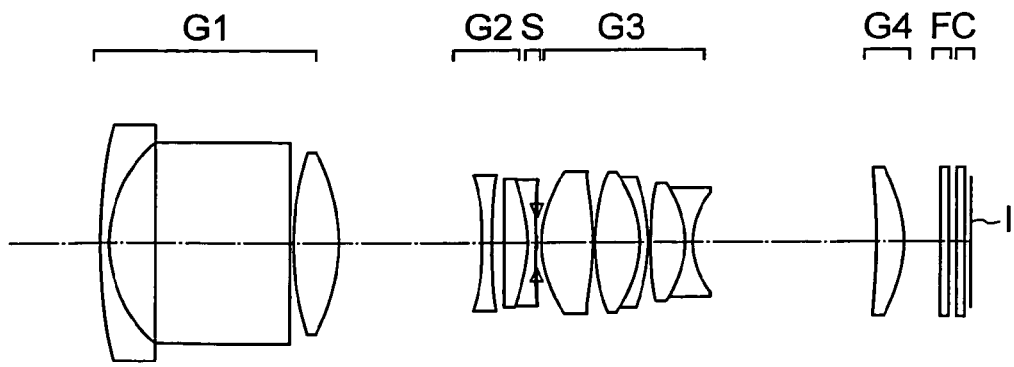

As shown in FIGS. 8A, 8B, and 8C, the zoom lens according to the eighth embodiment includes, in order from the object side thereof, a first lens group G1 having a positive refracting power (which is the optical path reflecting lens group), a second lens group G2 having a negative refracting power (which is the movable negative lens group), an aperture stop S, a third lens group G3 having a positive refracting power (which is the movable positive lens group), and a fourth lens group G4 having a positive refracting power (which is the lens group closest to the image side).

During zooming from the wide angle end to the telephoto end, the first lens group G1 is kept stationary, the second lens group G2 moves toward the image side, the third lens group G3 moves toward the object side, and the fourth lens group G4 moves toward the image side and thereafter toward the object side.

Focusing is performed by moving the fourth lens group G4, and the focusing operation from a long distance object point to a short distance object point is performed by moving the fourth lens group G4 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a biconvex positive lens and a biconcave negative lens. The third lens group G3 is composed of a biconvex positive lens, a cemented lens made up of a biconvex positive lens and a negative meniscus lens having a convex surface directed toward the image side, and a cemented lens made up of a biconvex positive lens and a biconcave negative lens. The fourth lens group G4 is composed of a positive meniscus lens having a convex surface directed toward the image side.

The following six surfaces are aspheric surfaces: both surfaces of the biconvex positive lens in the first lens group G1, both surfaces of the object side biconcave negative lens in the second lens group G2, and both surfaces of the biconvex positive lens located closest to the object side in the third lens group G3.

Figure 9A:
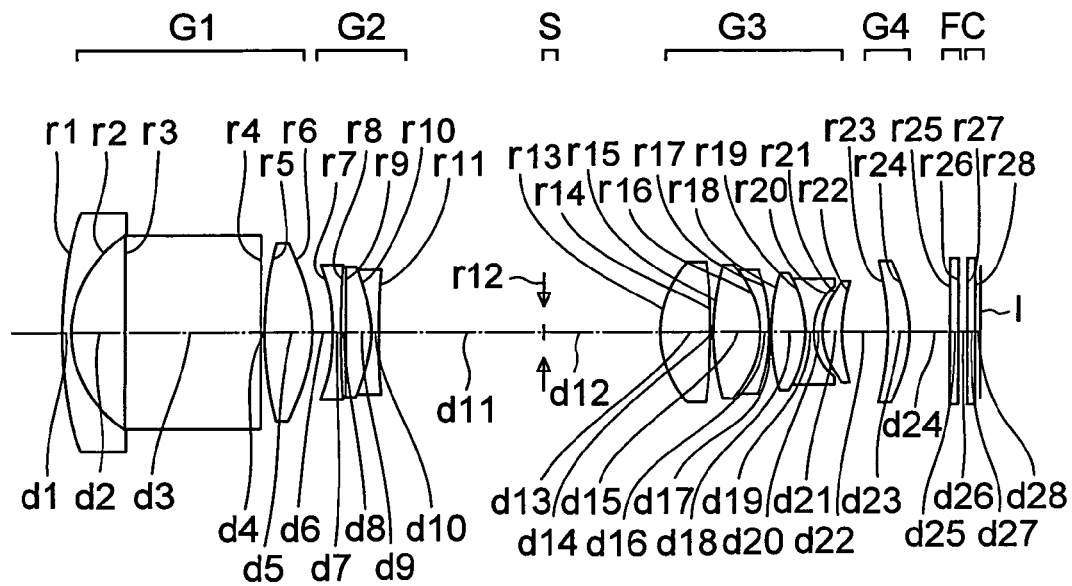
FIGS. 9A, 9B, and 9C are cross sectional views similar to FIGS. 1A, 1B, and 10, showing a zoom lens according to a ninth embodiment of the present invention.
Figure 9B:
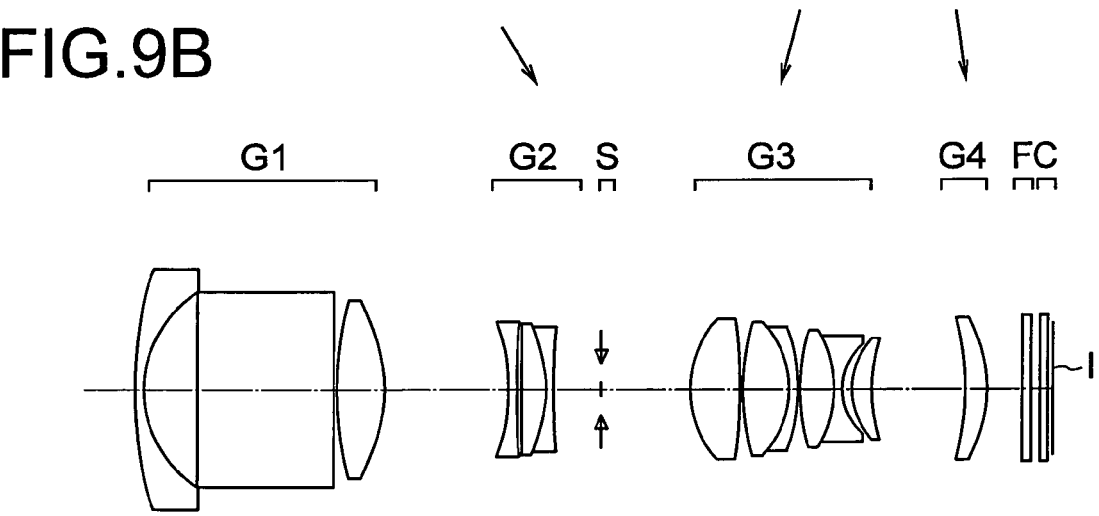
Figure 9C:
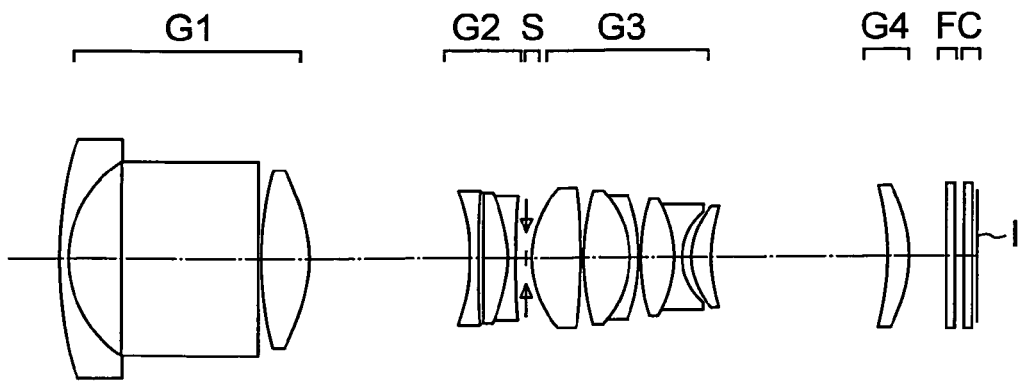

As shown in FIGS. 9A, 9B, and 9C, the zoom lens according to the ninth embodiment includes, in order from the object side thereof, a first lens group G1 having a positive refracting power (which is the optical path reflecting lens group), a second lens group G2 having a negative refracting power (which is the movable negative lens group), an aperture stop S, a third lens group G3 having a positive refracting power (which is the movable positive lens group), and a fourth lens group G4 having a positive refracting power (which is the lens group closest to the image side).

During zooming from the wide angle end to the telephoto end, the first lens group G1 is kept stationary, the second lens group G2 moves toward the image side, the third lens group G3 moves toward the object side, and the fourth lens group G4 moves toward the image side and thereafter toward the object side.

Focusing is performed by moving the fourth lens group G4, and the focusing operation from a long distance object point to a short distance object point is performed by moving the fourth lens group G4 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of biconcave negative lens, and a cemented lens made up of a positive meniscus lens having a convex surface directed toward the image side and a biconcave negative lens. The third lens group G3 is composed of a biconvex positive lens, a cemented lens made up of a biconvex positive lens and a negative meniscus lens having a convex surface directed toward the image side, a cemented lens made up of a biconvex positive lens and a biconcave negative lens, and a positive meniscus lens having a convex surface directed toward the object side. The fourth lens group G4 is composed of a positive meniscus lens having a convex surface directed toward the image side.

The following six surfaces are aspheric surfaces: both surfaces of the biconvex positive lens in the first lens group G1, both surfaces of the object side biconcave negative lens in the second lens group G2, and both surfaces of the biconvex positive lens located closest to the object side in the third lens group G3.

Figure 10A:
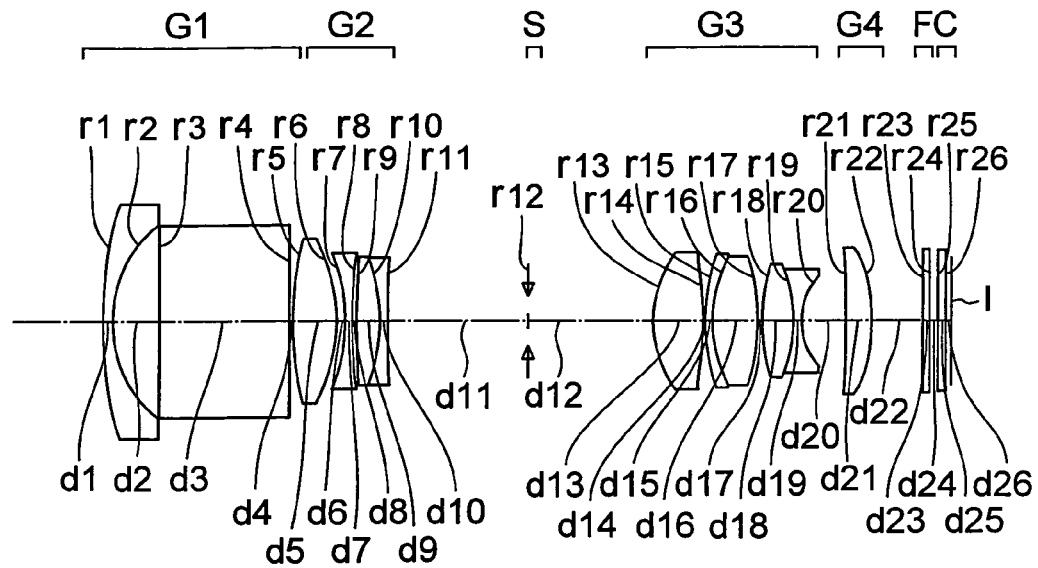
FIGS. 10A, 10B, and 10C are cross sectional views similar to FIGS. 1A, 1B, and 10, showing a zoom lens according to a tenth embodiment of the present invention.
Figure 10B:
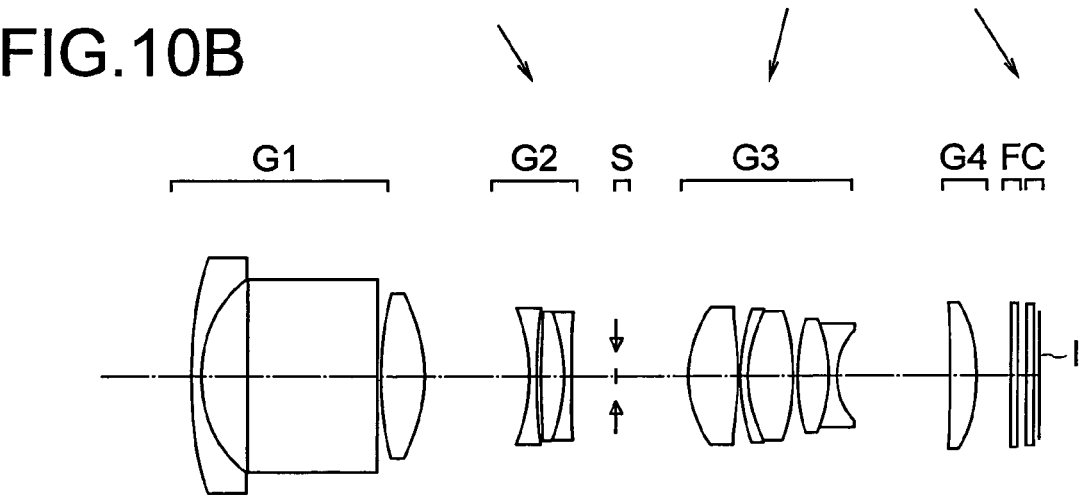
Figure 10C:
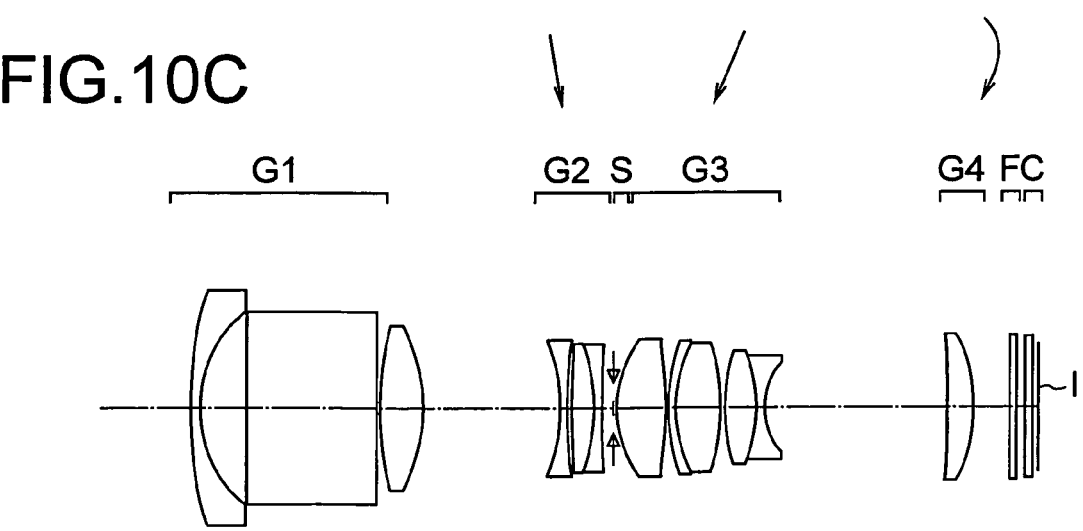
Figure 11A:
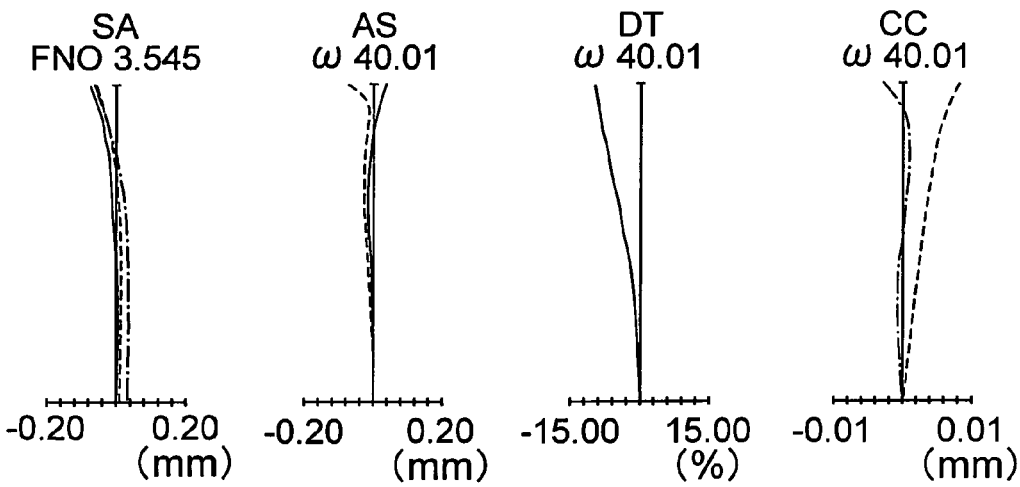
FIGS. 11A, 11b, and 11C are aberration diagrams of the first embodiment in the state in which the zoom lens is focused on an object point at infinity.
Figure 11B:
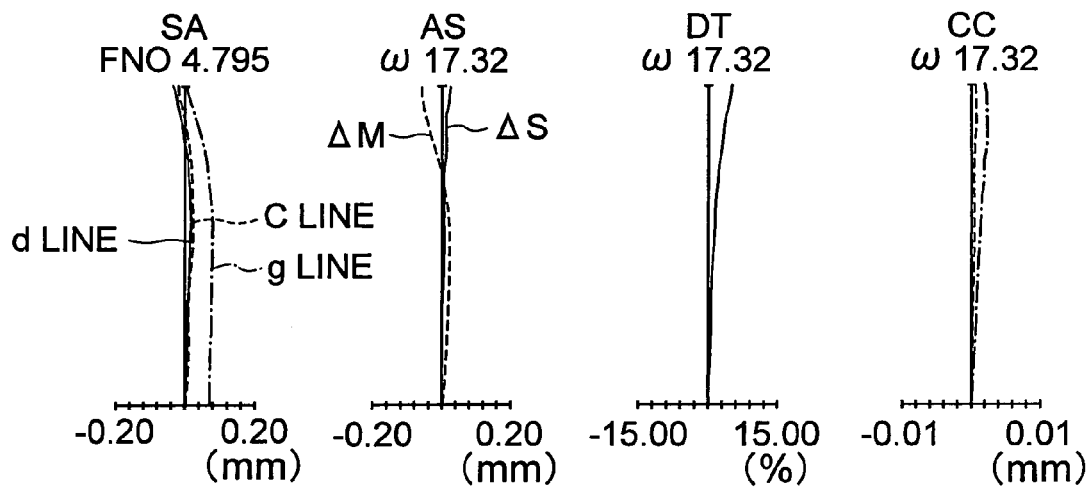
Figure 11C:
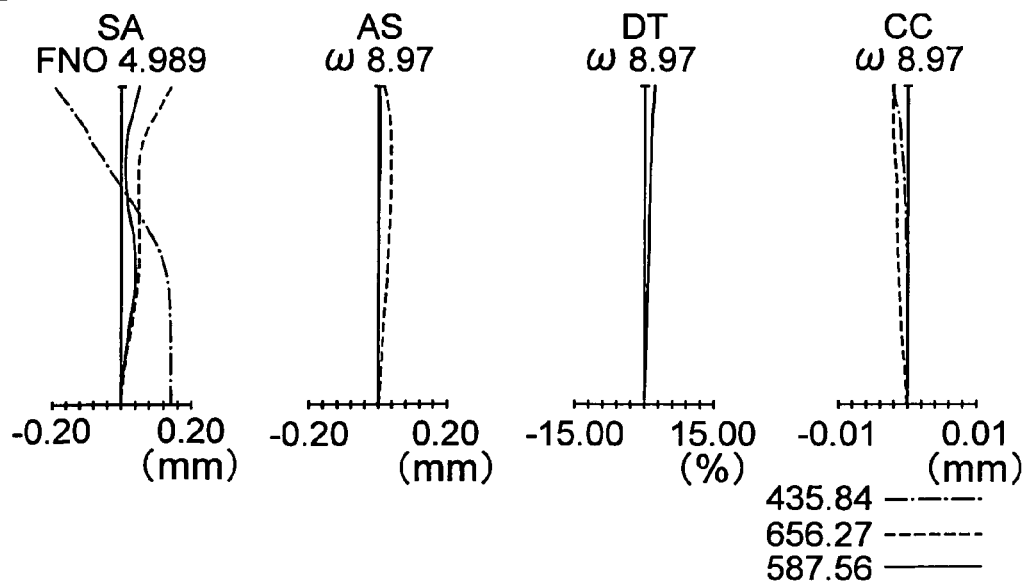
Figure 12A:
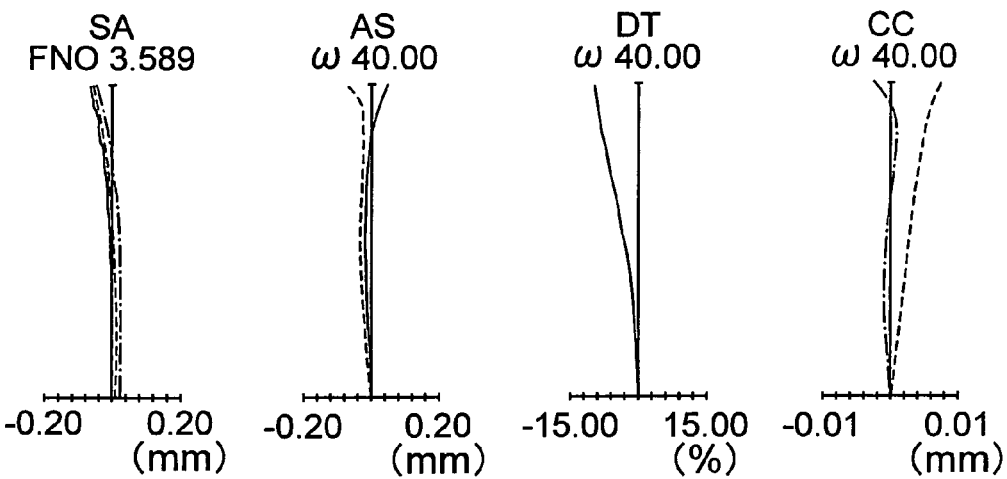
FIGS. 12A, 12b, and 12C are aberration diagrams of the second embodiment in the state in which the zoom lens is focused on an object point at infinity.
Figure 12B:
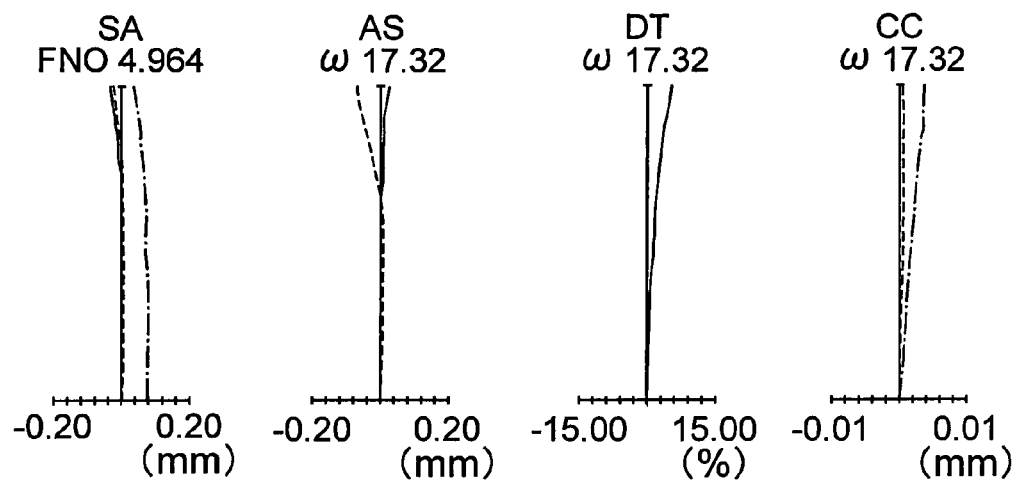
Figure 12C:
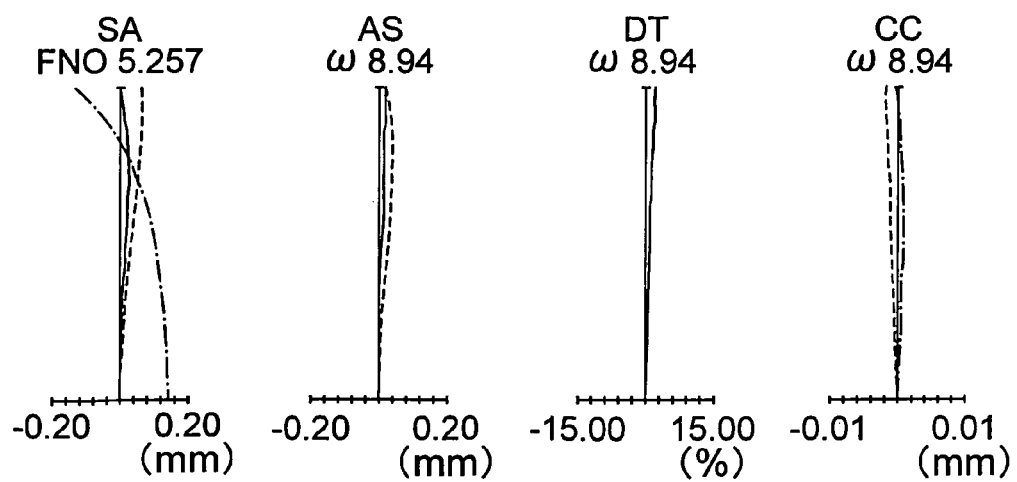
Figure 13A:
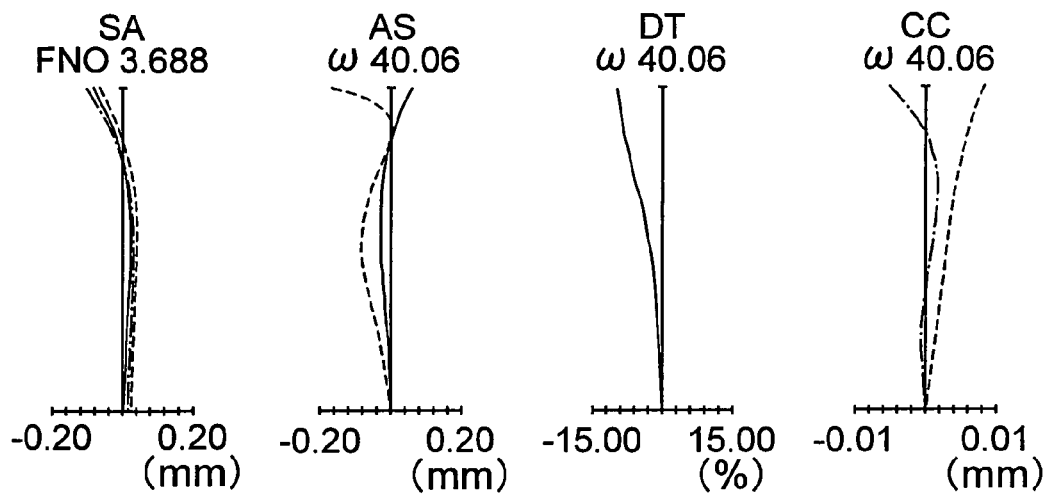
FIGS. 13A, 13b, and 13C are aberration diagrams of the third embodiment in the state in which the zoom lens is focused on an object point at infinity.
Figure 13B:
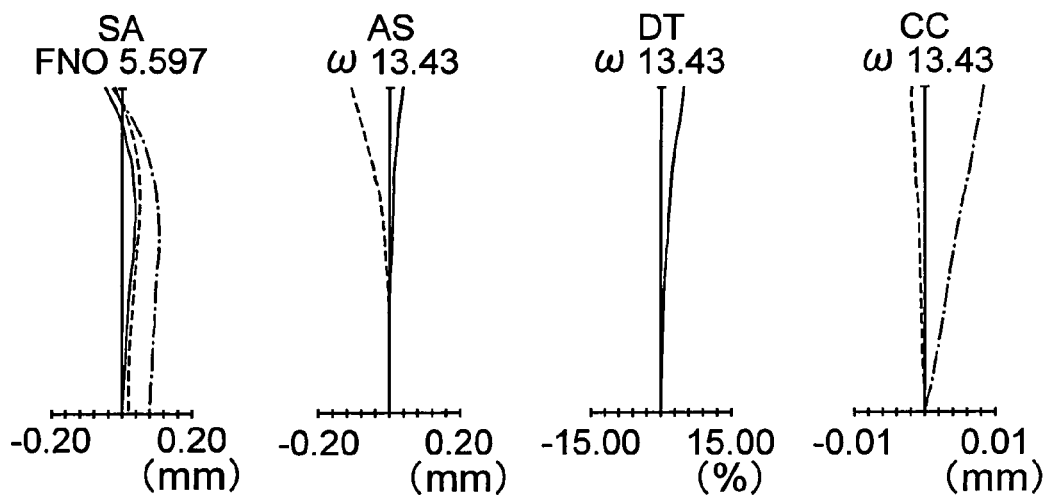
Figure 13C:
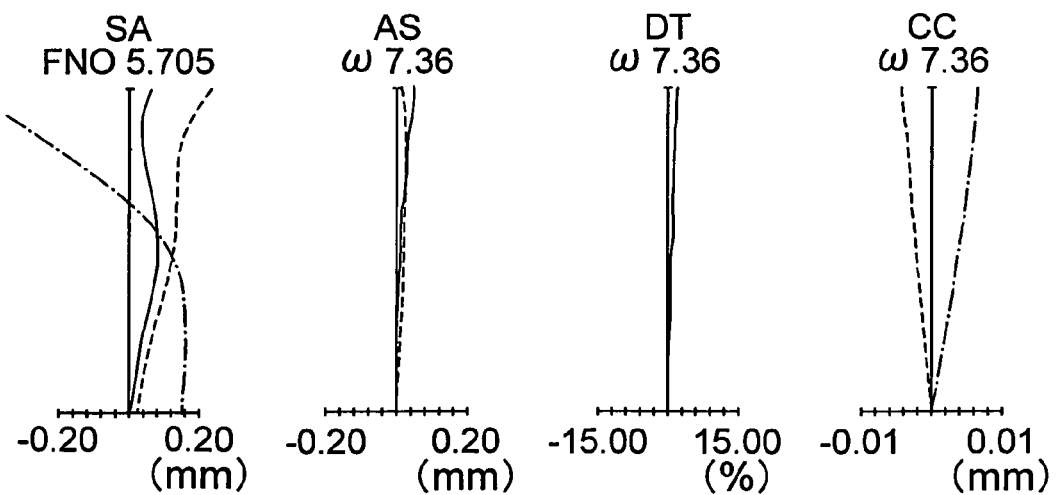
Figure 14A:
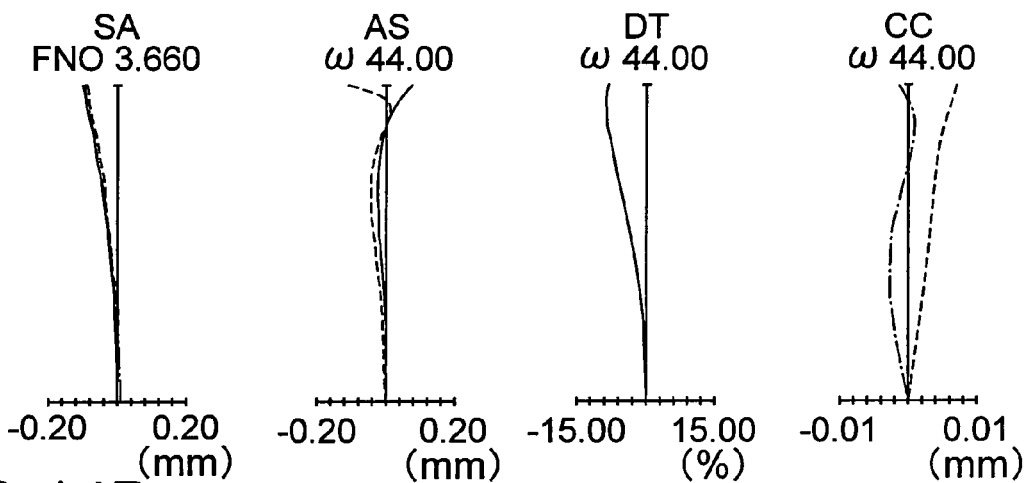
FIGS. 14A, 14b, and 14C are aberration diagrams of the fourth embodiment in the state in which the zoom lens is focused on an object point at infinity.
Figure 14B:
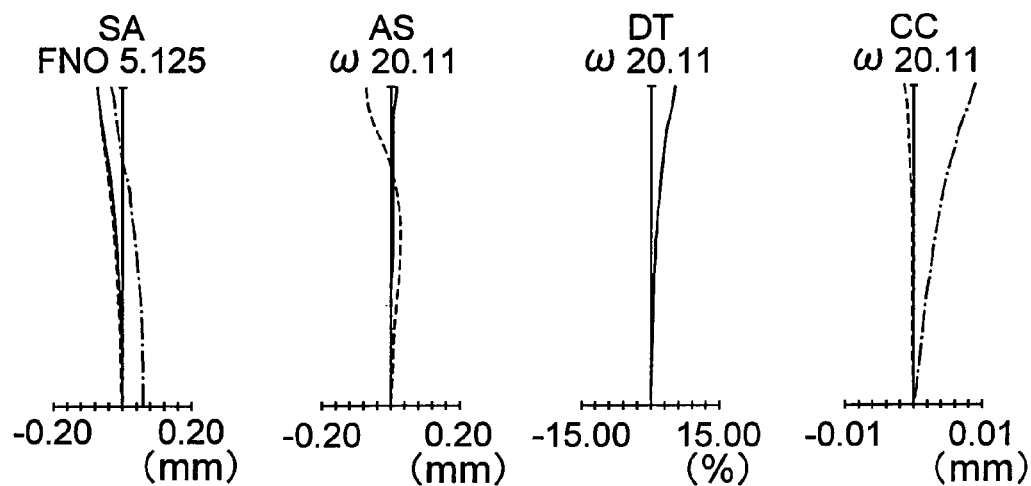
Figure 14C:
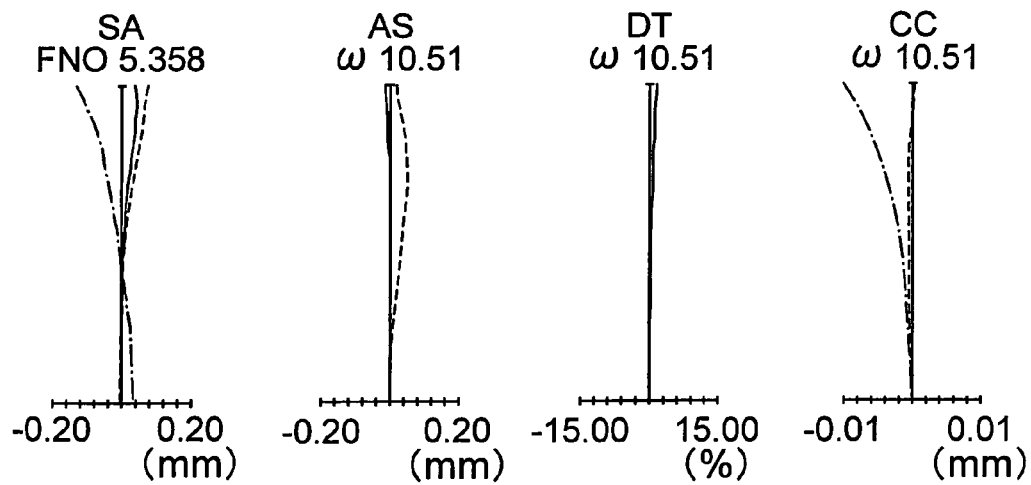
Figure 15A:
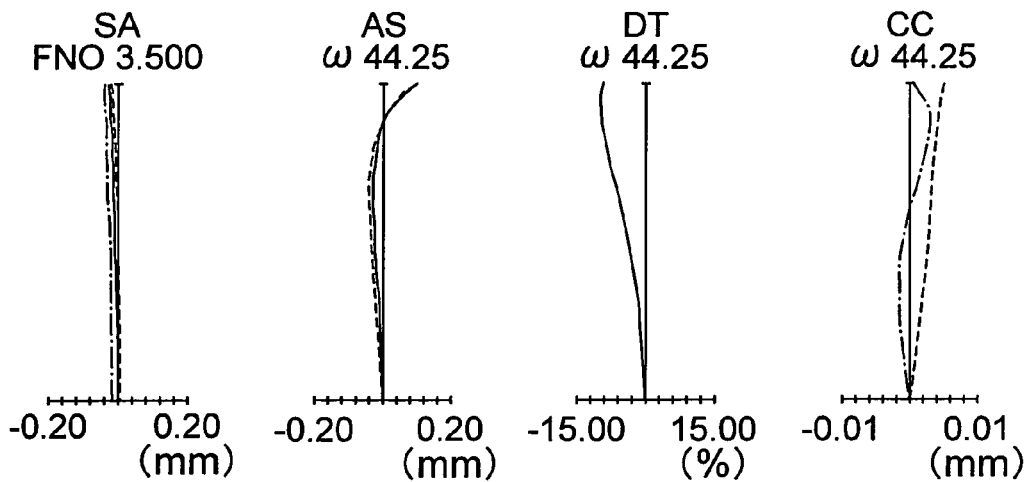
FIGS. 15A, 15b, and 15C are aberration diagrams of the fifth embodiment in the state in which the zoom lens is focused on an object point at infinity.
Figure 15B:
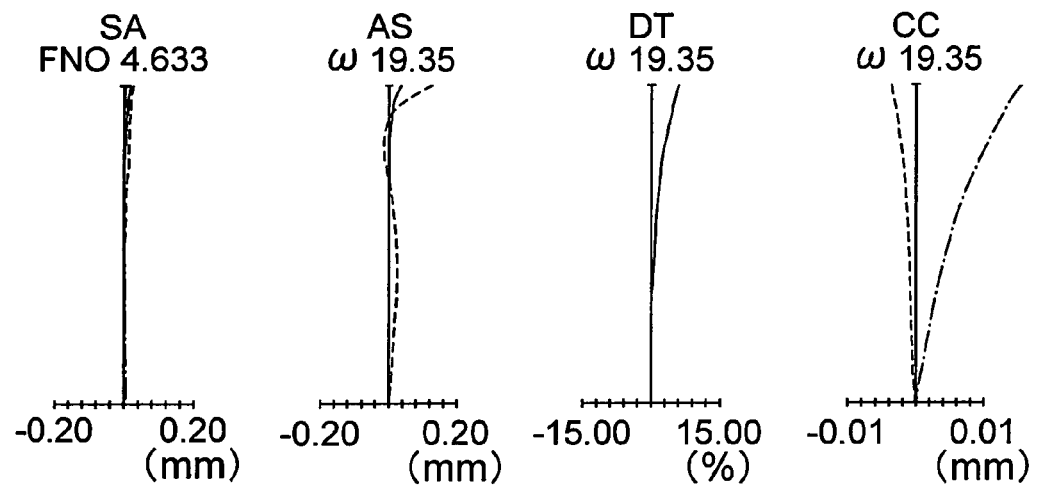
Figure 15C:
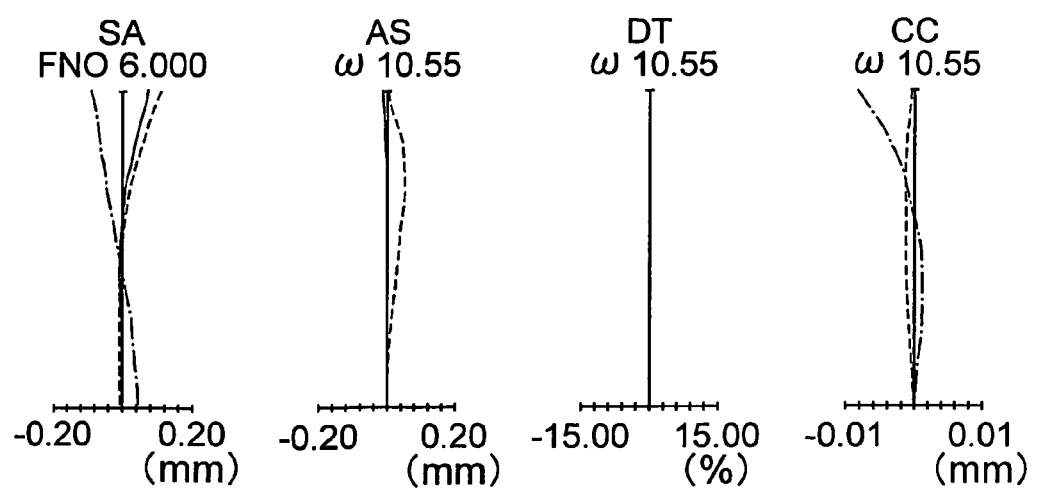
Figure 16A:
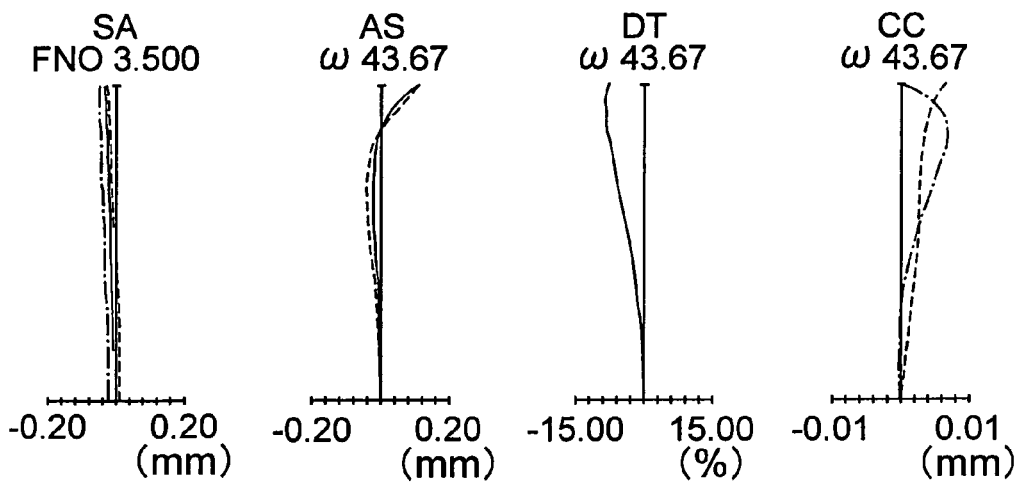
FIGS. 16A, 16b, and 16C are aberration diagrams of the sixth embodiment in the state in which the zoom lens is focused on an object point at infinity.
Figure 16B:
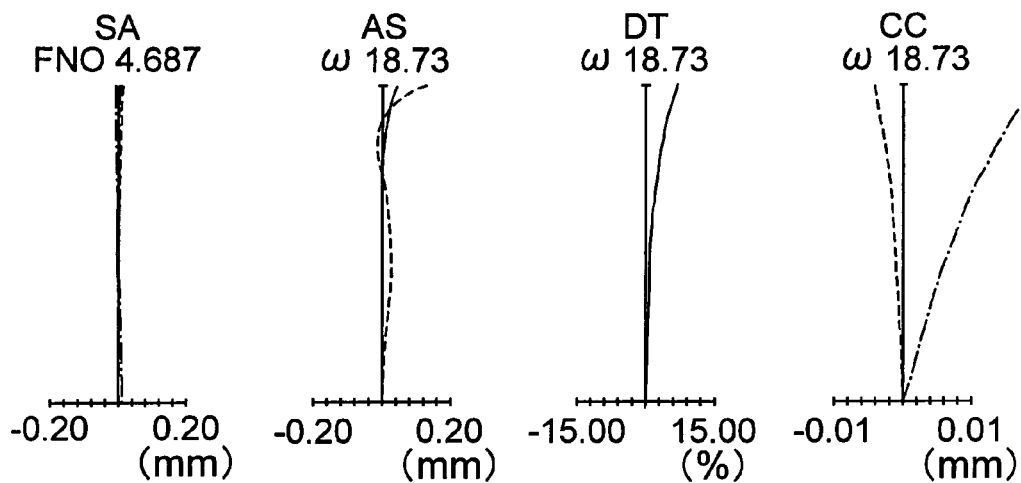
Figure 16C:
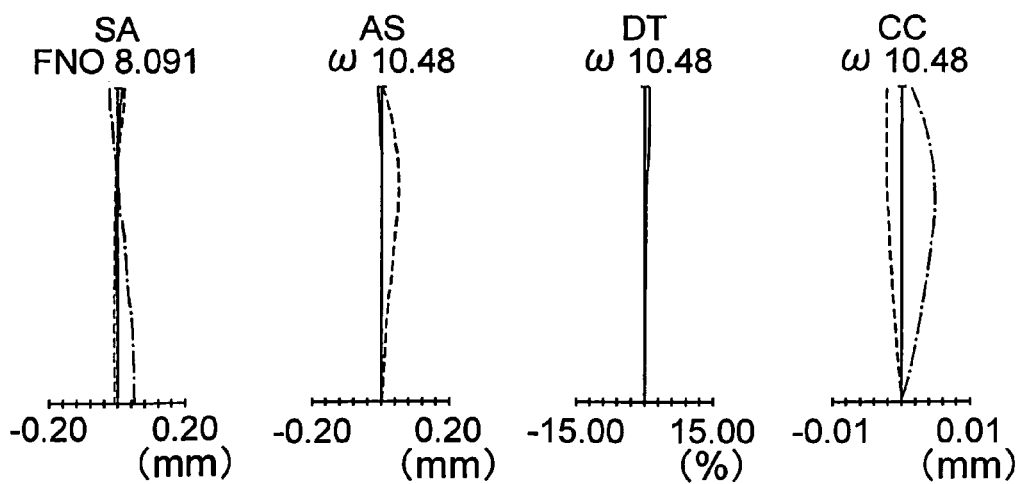
Figure 17A:
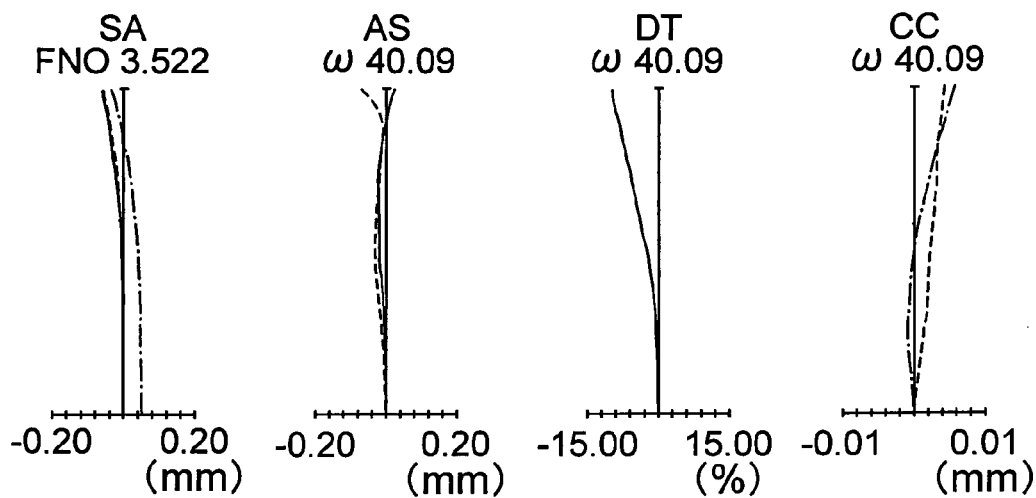
FIGS. 17A, 17b, and 17C are aberration diagrams of the seventh embodiment in the state in which the zoom lens is focused on an object point at infinity.
Figure 17B:
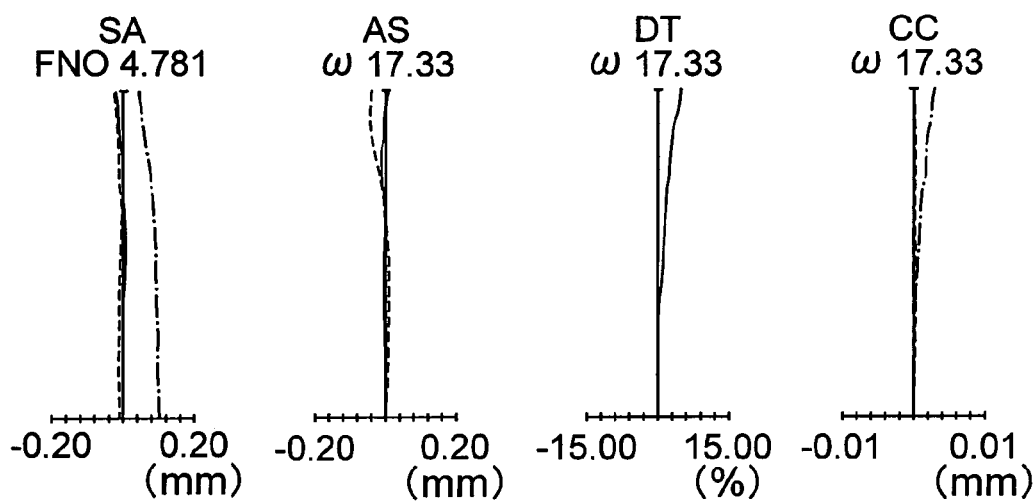
Figure 17C:
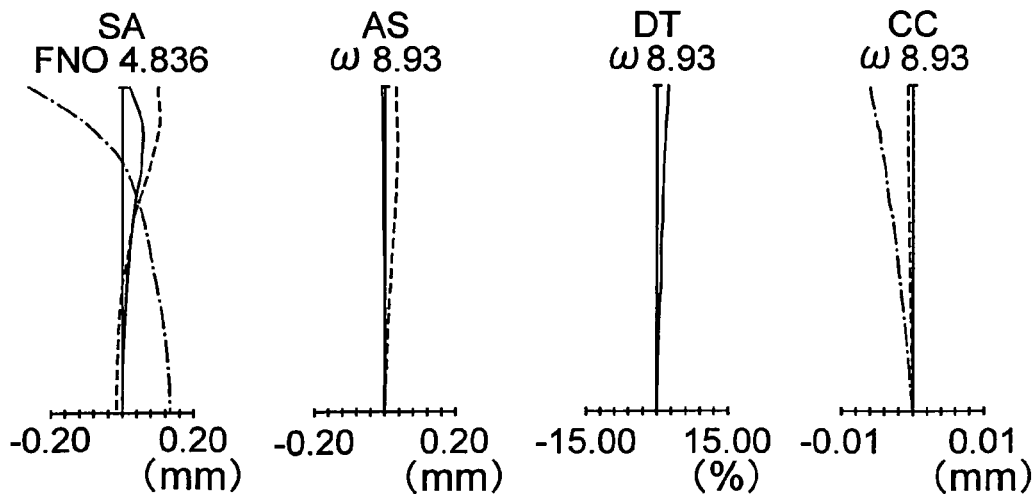
Figure 18A:
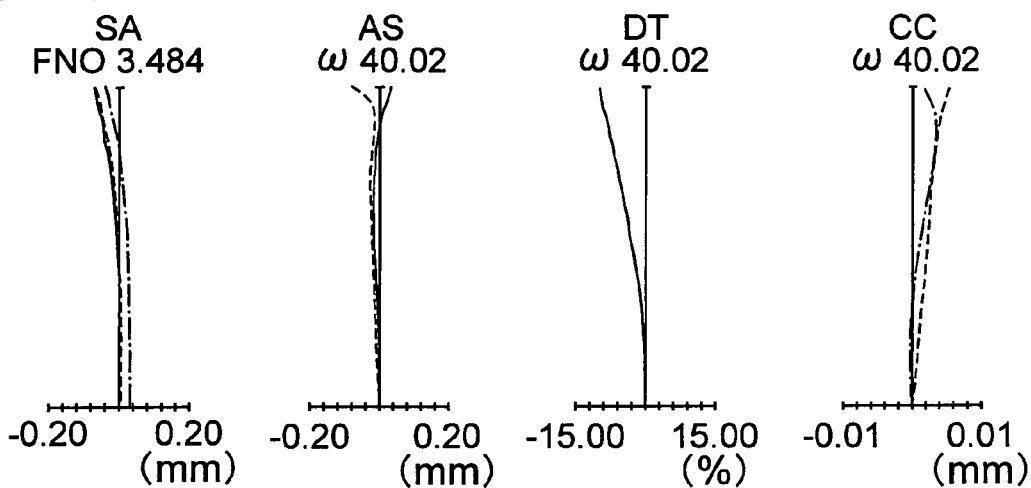
FIGS. 18A, 18b, and 18C are aberration diagrams of the eighth embodiment in the state in which the zoom lens is focused on an object point at infinity.
Figure 18B:
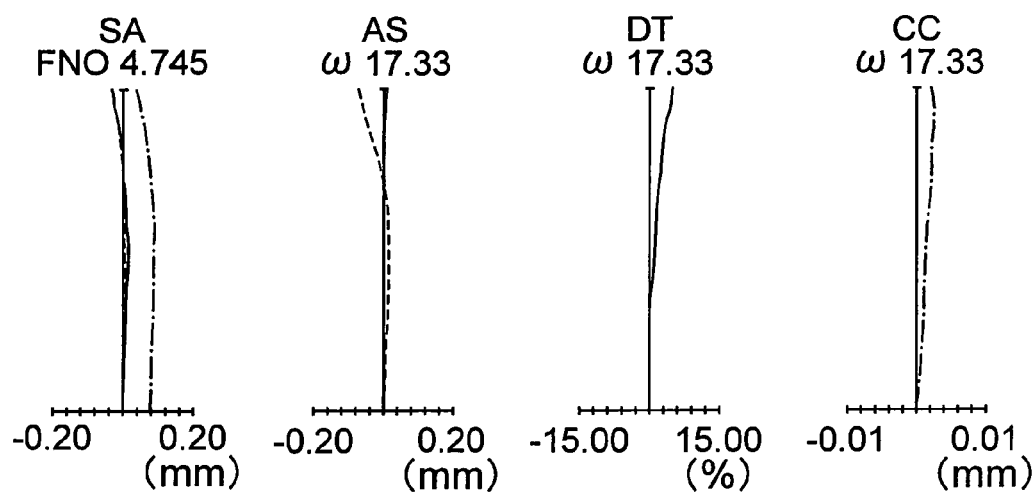
Figure 18C:
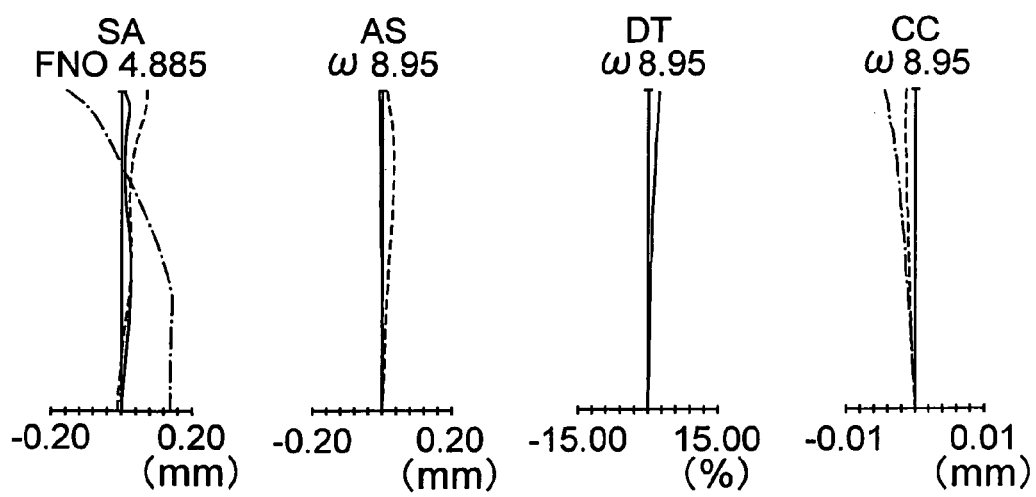
Figure 19A:
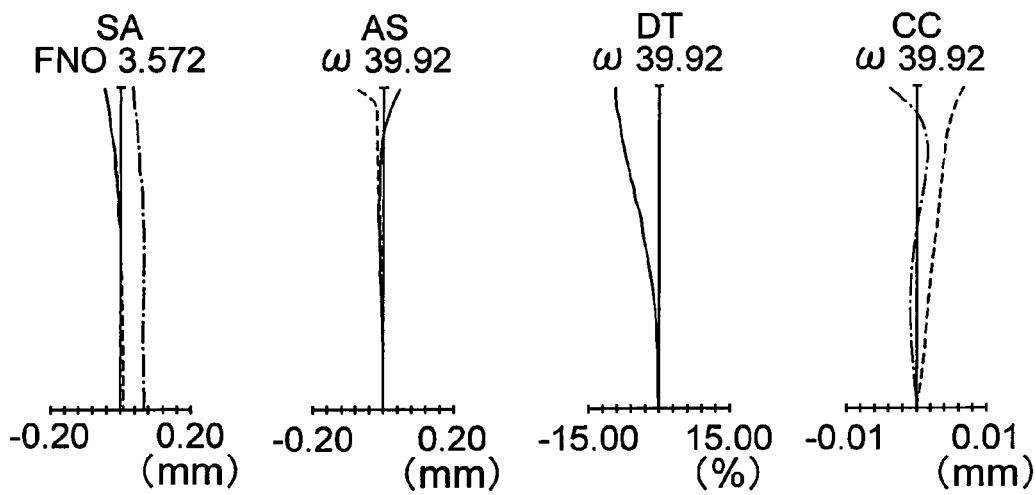
FIGS. 19A, 19b, and 19C are aberration diagrams of the ninth embodiment in the state in which the zoom lens is focused on an object point at infinity.
Figure 19B:
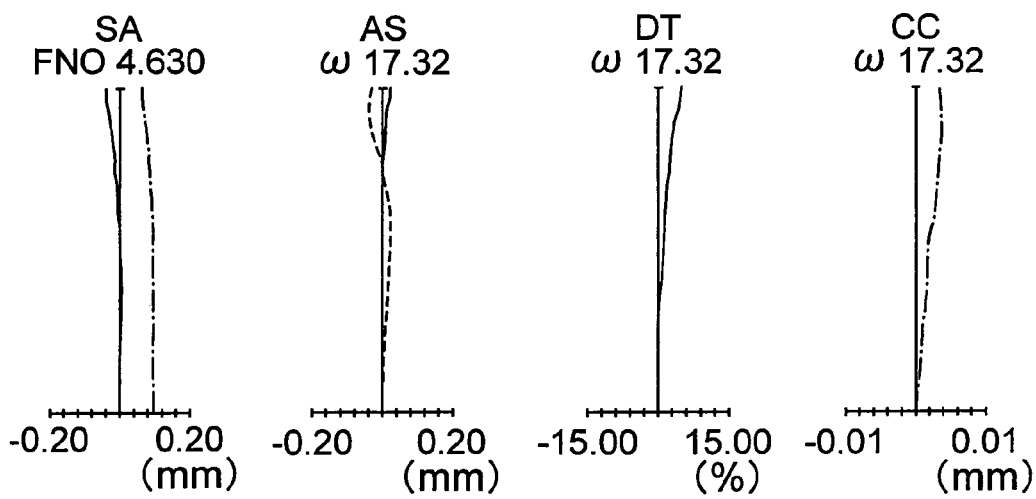
Figure 19C:
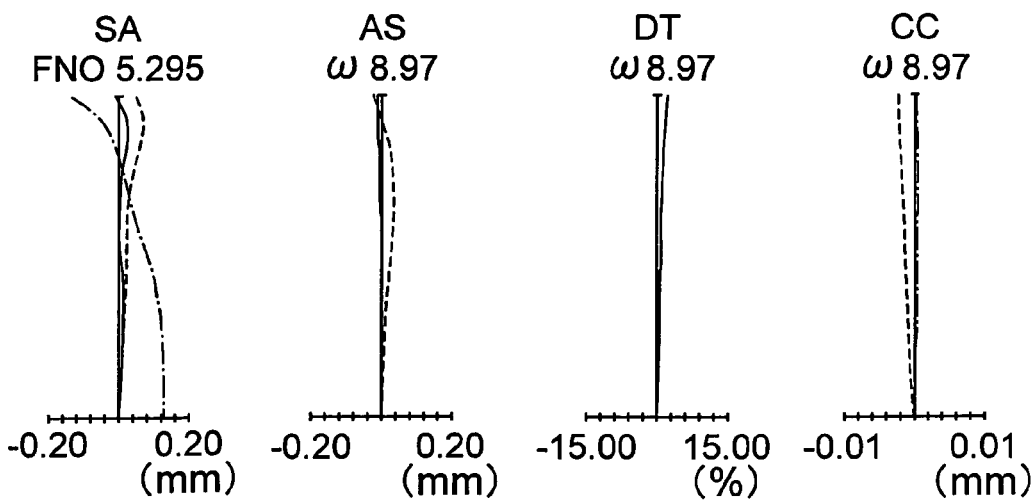
Figure 20A:
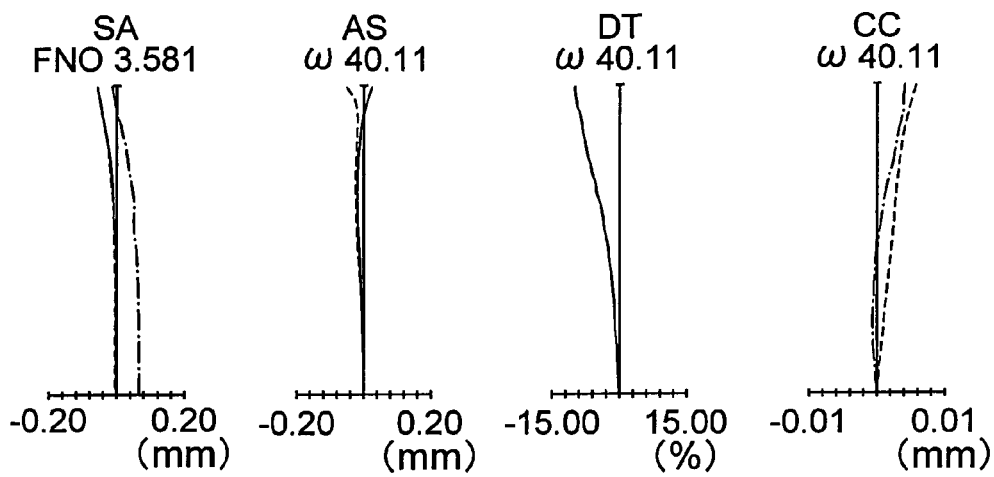
FIGS. 20A, 20b, and 20C are aberration diagrams of the tenth embodiment in the state in which the zoom lens is focused on an object point at infinity.
Figure 20B:
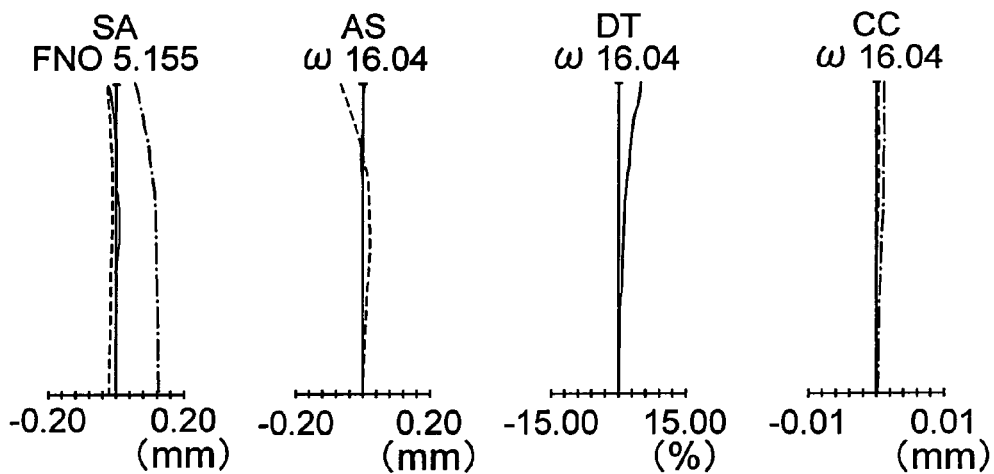
Figure 20C:
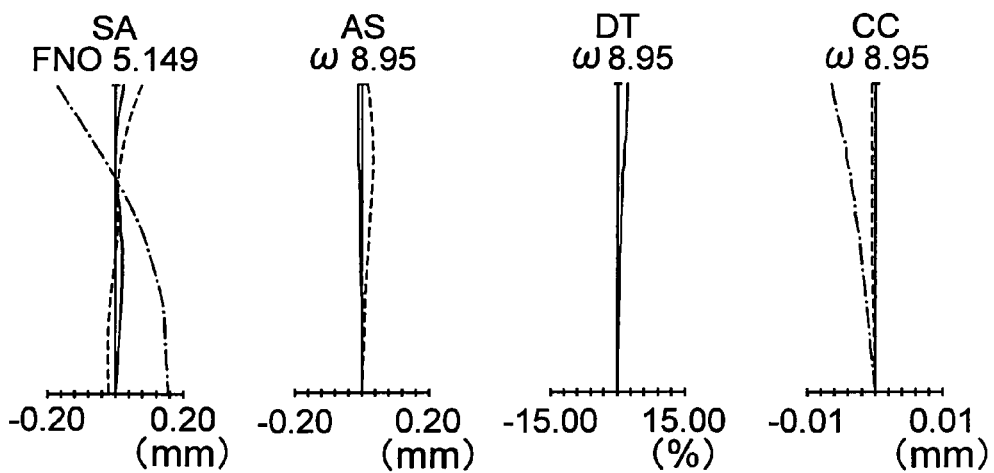

As shown in FIGS. 10A, 10B, and 10C, the zoom lens according to the tenth embodiment includes, in order from the object side thereof, a first lens group G1 having a positive refracting power (which is the optical path reflecting lens group), a second lens group G2 having a negative refracting power (which is the movable negative lens group), an aperture stop S, a third lens group G3 having a positive refracting power (which is the movable positive lens group), and a fourth lens group G4 having a positive refracting power (which is the lens group closest to the image side).

During zooming from the wide angle end to the telephoto end, the first lens group G1 is kept stationary, the second lens group G2 moves toward the image side, the third lens group G3 moves toward the object side, and the fourth lens group G4 moves toward the image side and thereafter toward the object side.

Focusing is performed by moving the fourth lens group G4, and the focusing operation from a long distance object point to a short distance object point is performed by moving the fourth lens group G4 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a biconvex positive lens and a biconcave negative lens. The third lens group G3 is composed of a biconvex positive lens, a cemented lens made up of a negative meniscus lens having a convex surface directed toward the object side and a biconvex positive lens, and a cemented lens made up of a biconvex positive lens and a biconcave negative lens. The fourth lens group G4 is composed of a positive meniscus lens having a convex surface directed toward the image side.

The following six surfaces are aspheric surfaces: both surfaces of the biconvex positive lens in the first lens group G1, both surfaces of the object side biconcave negative lens in the second lens group G2, and both surfaces of the biconvex positive lens located closest to the object side in the third lens group G3.

Figure 26A:
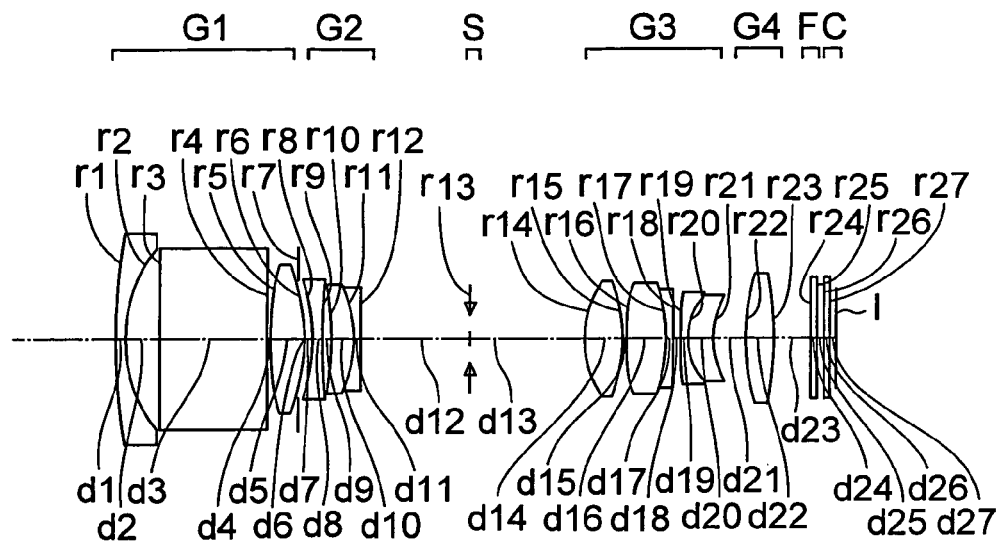
FIGS. 26A, 26B, and 26C are cross sectional views similar to FIGS. 1A, 1B, and 10, showing a zoom lens according to a eleventh embodiment of the present invention.
Figure 26B:
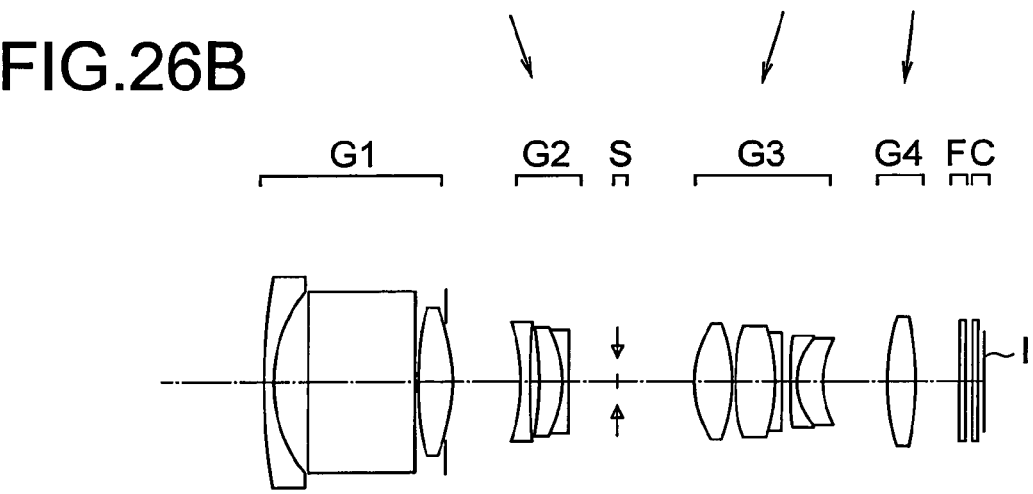
Figure 26C:
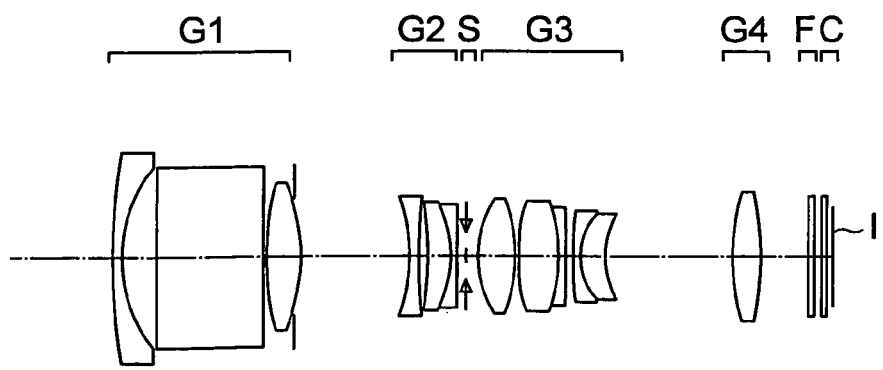
Figure 27A:
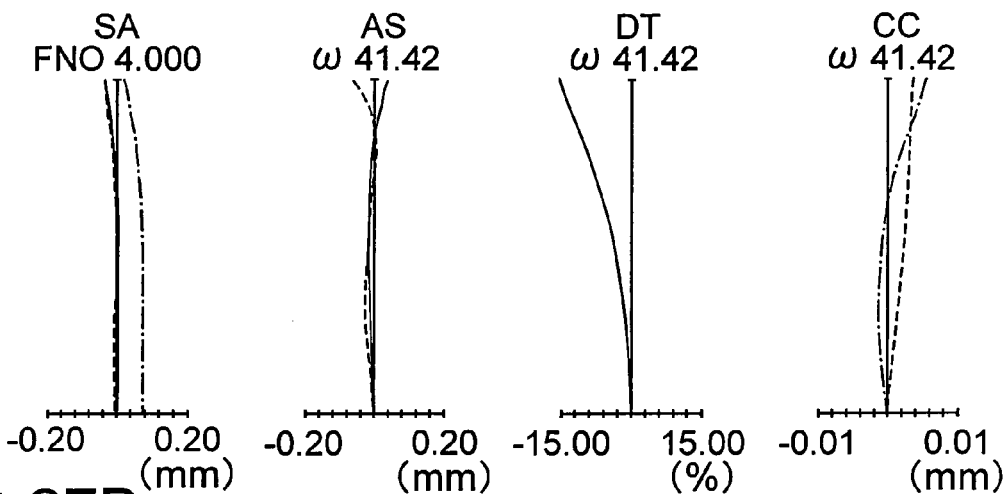
FIGS. 27A, 27b, and 27C are aberration diagrams of the eleventh embodiment in the state in which the zoom lens is focused on an object point at infinity.
Figure 27B:
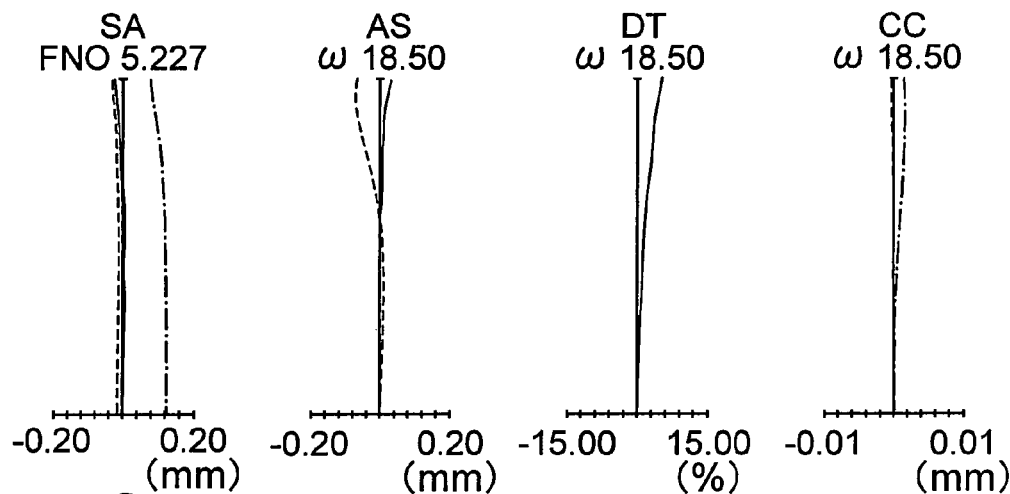
Figure 27C:
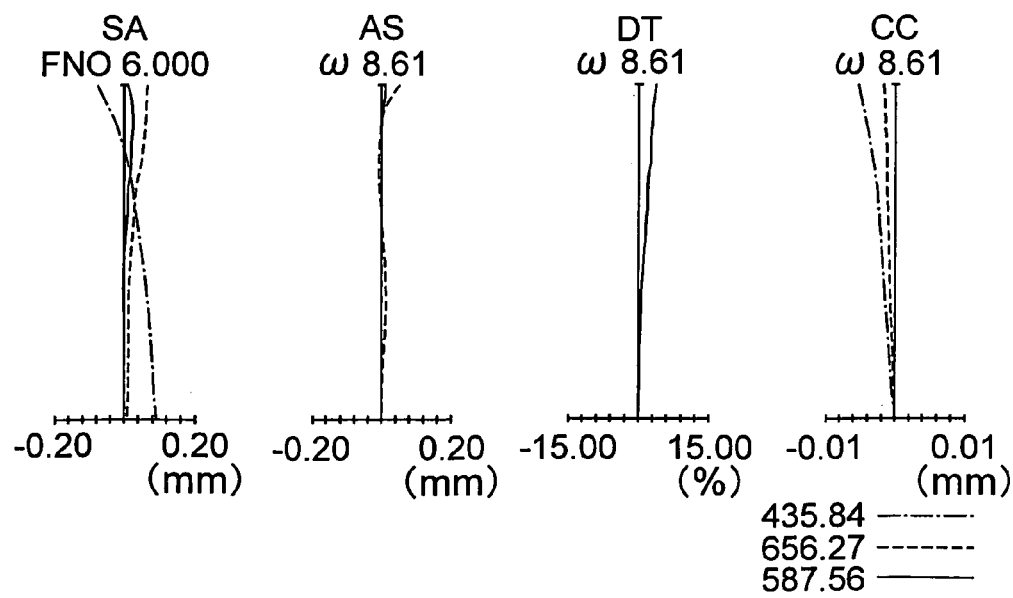

As shown in FIGS. 26A, 26B, and 26C, the zoom lens according to the eleventh embodiment includes, in order from the object side thereof, a first lens group G1 having a positive refracting power (which is the optical path reflecting lens group), a second lens group G2 having a negative refracting power (which is the movable negative lens group), an aperture stop S, a third lens group G3 having a positive refracting power (which is the movable positive lens group), and a fourth lens group G4 having a positive refracting power (which is the lens group closest to the image side).

During zooming from the wide angle end to the telephoto end, the first lens group G1 is kept stationary, the second lens group G2 moves toward the image side, the third lens group G3 moves toward the object side, and the fourth lens group G4 moves toward the object side.

Focusing is performed by moving the fourth lens group G4, and the focusing operation from a long distance object point to a short distance object point is performed by moving the fourth lens group G4 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a positive meniscus lens having a convex surface directed toward the image side and a biconcave negative lens. The third lens group G3 is composed of a biconvex positive lens, a cemented lens made up of a biconvex positive lens and a biconcave negative lens, and a cemented lens made up of a negative meniscus lens having a convex surface directed toward the object side and a positive meniscus lens having a convex surface directed toward the object side. The fourth lens group G4 is composed of a biconvex positive lens.

The following eight surfaces are aspheric surfaces: both surfaces of the biconvex positive lens in the first lens group G1, both surfaces of the object side biconcave negative lens in the second lens group G2, both surfaces of the biconvex positive lens located closest to the object side in the third lens group G3, and both surfaces of the biconvex positive lens in the fourth lens group G4.

Figure 28A:
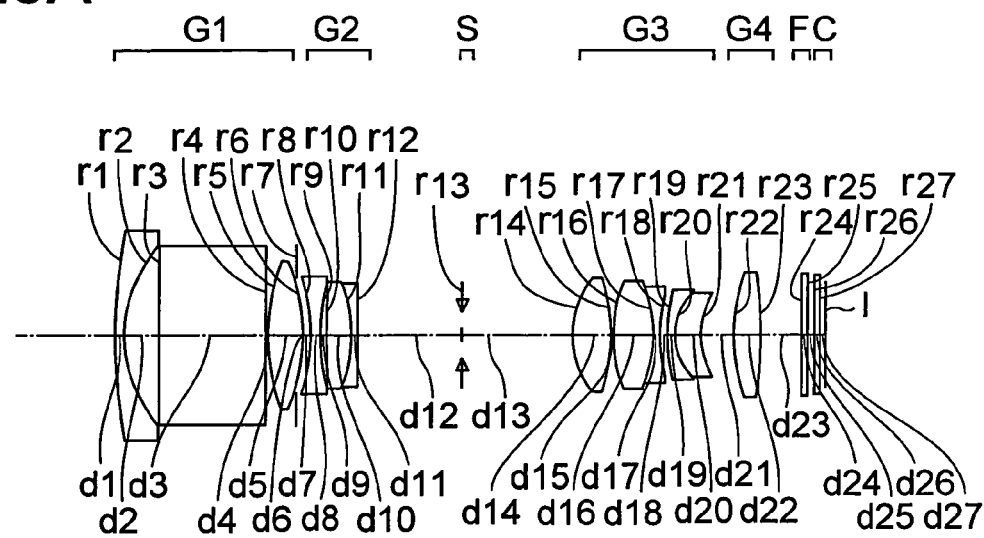
FIGS. 28A, 28B, and 28C are cross sectional views similar to FIGS. 1A, 1B, and 1C, showing a zoom lens according to a twelfth embodiment of the present invention.
Figure 28B:
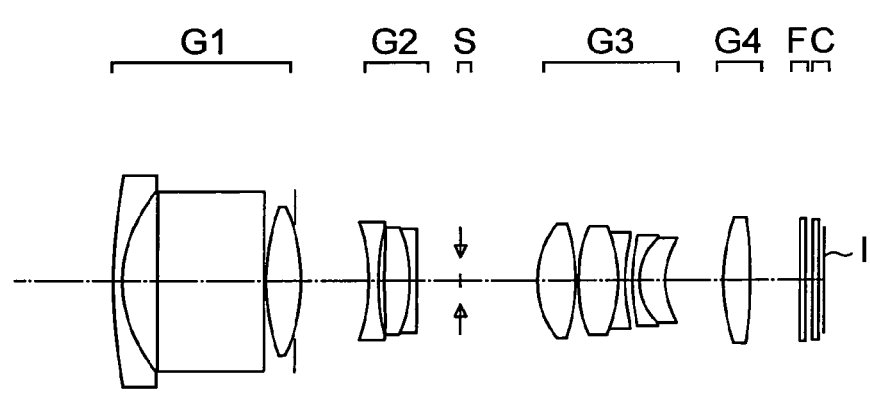
Figure 28C:
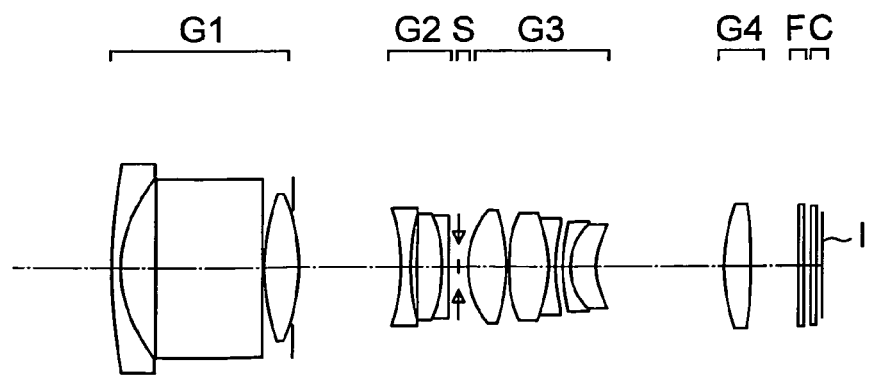
Figure 29A:
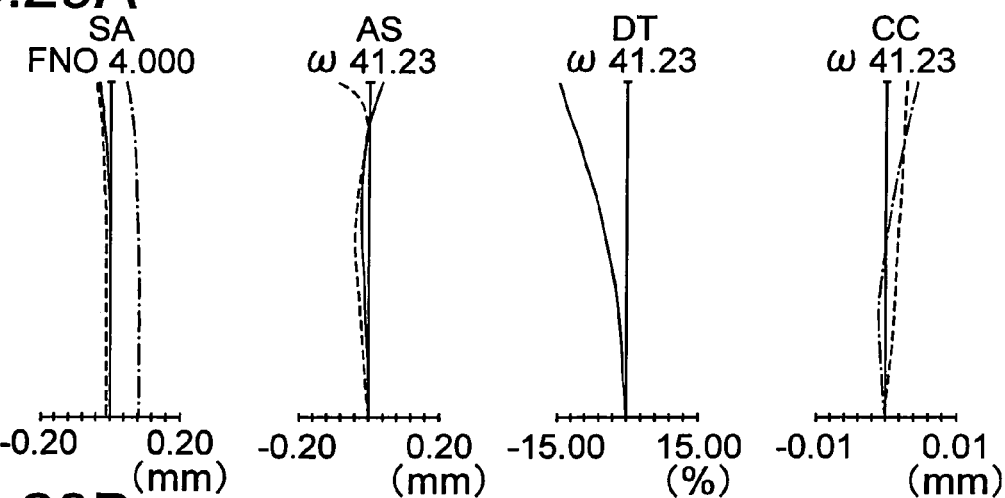
FIGS. 29A, 29b, and 29C are aberration diagrams of the twelfth embodiment in the state in which the zoom lens is focused on an object point at infinity.
Figure 29B:
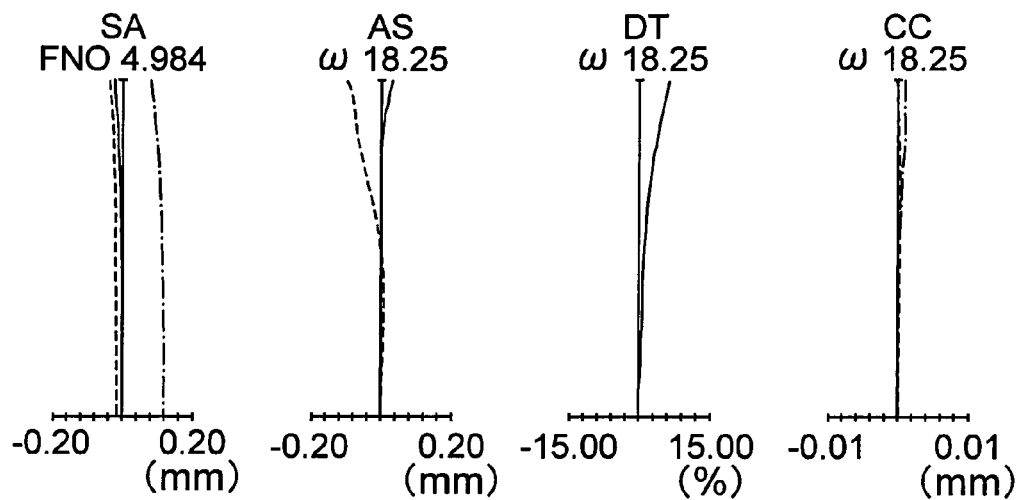
Figure 29C:
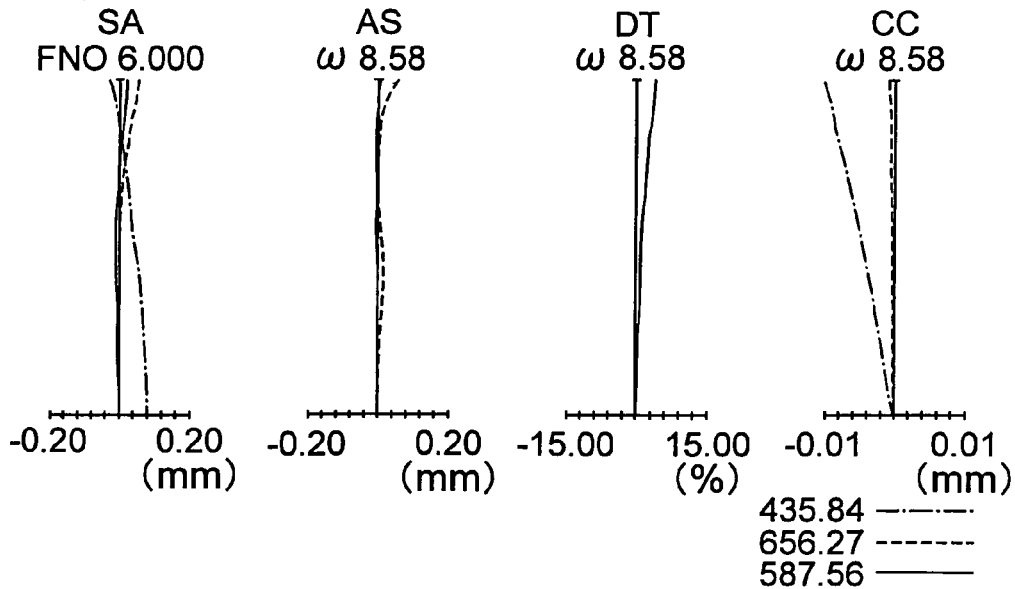

As shown in FIGS. 28A, 28B, and 28C, the zoom lens according to the twelfth embodiment includes, in order from the object side thereof, a first lens group G1 having a positive refracting power (which is the optical path reflecting lens group), a second lens group G2 having a negative refracting power (which is the movable negative lens group), an aperture stop S, a third lens group G3 having a positive refracting power (which is the movable positive lens group), and a fourth lens group G4 having a positive refracting power (which is the lens group closest to the image side).

During zooming from the wide angle end to the telephoto end, the first lens group G1 is kept stationary, the second lens group G2 moves toward the image side, the third lens group G3 moves toward the object side, and the fourth lens group G4 moves toward the object side and thereafter toward the image side.

Focusing is performed by moving the fourth lens group G4, and the focusing operation from a long distance object point to a short distance object point is performed by moving the fourth lens group G4 toward the object side (i.e. toward the aperture stop).

The first lens group G1 is composed of a negative meniscus lens having a convex surface directed toward the object side, a prism, and a biconvex positive lens arranged in order from the object side. The second lens group G2 is composed of a biconcave negative lens, and a cemented lens made up of a positive meniscus lens having a convex surface directed toward the image side and a biconcave negative lens. The third lens group G3 is composed of a biconvex positive lens, a cemented lens made up of a biconvex positive lens and a biconcave negative lens, and a cemented lens made up of a negative meniscus lens having a convex surface directed toward the object side and a positive meniscus lens having a convex surface directed toward the object side. The fourth lens group G4 is composed of a biconvex positive lens.

The following seven surfaces are aspheric surfaces: both surfaces of the biconvex positive lens in the first lens group, both surfaces of the object side biconcave negative lens in the second lens group G2, both surfaces of the biconvex positive lens located closest to the object side in the third lens group G3, and the object side surface of the biconvex positive lens in the fourth lens group G4.

Numerical data of each embodiment described above is shown below. Apart from symbols described above, R denotes radius of curvature of each lens surface, D denotes a distance between two lenses, Nd denotes a refractive index of each lens for a d-line, and νd denotes an Abbe's number for each lens, K denotes a conical coefficient.

When Z is let to be an optical axis with a direction of traveling of light as a positive (direction), and Y is let to be in a direction orthogonal to the optical axis, a shape of the aspheric surface is described by the following expression.

$$Z=(Y^2/r)/[1+\{1-(K+1)(Y/r)^2\}^{1/2}]+A_4Y^4+A_6Y^6+A_8Y^8+A_{10}Y^{10}+A_{12}Y^{12}$$

where, r denotes a paraxial radius of curvature, K denotes a conical coefficient, $A_4$, $A_6$, $A_8$, $A_{10}$, and $A_{12}$ denote aspherical surface coefficients of a fourth order, a sixth order, an eight order, a tenth order, and a twelfth order respectively.

Moreover, in the aspherical surface coefficients, 'e-n' (where, n is an integral number) indicates '$10^{-n}$'.

EXAMPLE 1

Unit mm

Surface data

| Surface no. | r | d | nd | νd |
|---|---|---|---|---|
| Object plane | ∞ | ∞ | | |
| 1 | 34.036 | 0.60 | 2.00069 | 25.46 |
| 2 | 8.285 | 2.80 | | |
| 3 | ∞ | 8.20 | 1.84666 | 23.78 |
| 4 | ∞ | 0.20 | | |
| 5* | 19.721 | 2.67 | 1.67790 | 55.34 |
| 6* | −11.961 | Variable | | |
| 7* | −13.348 | 0.48 | 1.83481 | 42.71 |
| 8* | 30.127 | 0.26 | | |
| 9 | 236.009 | 1.43 | 1.92286 | 20.88 |
| 10 | −10.916 | 0.49 | 1.88300 | 40.76 |
| 11 | 55.545 | Variable | | |
| 12 (Stop) | ∞ | Variable | | |
| 13* | 6.859 | 3.10 | 1.51633 | 64.14 |
| 14* | −15.973 | 0.10 | | |
| 15 | 12.088 | 2.80 | 1.49700 | 81.54 |
| 16 | −7.603 | 0.50 | 1.78590 | 44.20 |
| 17 | −12.027 | 0.10 | | |
| 18 | 15.613 | 2.00 | 1.76182 | 26.52 |
| 19 | −7.144 | 0.48 | 2.00069 | 25.46 |
| 20 | 4.400 | Variable | | |
| 21 | −34.162 | 1.64 | 1.51633 | 64.14 |
| 22 | −9.256 | Variable | | |
| 23 | ∞ | 0.50 | 1.51633 | 64.14 |
| 24 | ∞ | 0.50 | | |
| 25 | ∞ | 0.50 | 1.51633 | 64.14 |
| 26 | ∞ | 0.37 | | |
| Image plane | ∞ | | | |

Aspherical surface data

5th surface

K = 1.767
A4 = −7.62972e−05, A6 = −1.45912e−07, A8 = 1.36771e−08, A10 = −7.10334e−10

6th surface

K = −0.001
A4 = 6.47167e−05, A6 = −3.27416e−07, A8 = 3.39234e−08, A10 = −9.15762e−10

7th surface

K = 1.685
A4 = −1.86967e−04, A6 = 1.47855e−05, A8 = 5.35537e−07, A10 = −4.72659e−08

Unit mm

8th surface

K = −26.417
A4 = −3.24933e−04, A6 = 1.05786e−05, A8 = 1.45228e−06, A10 = −9.89021e−08

13th surface

K = −0.124
A4 = −2.47143e−04, A6 = 3.89617e−06, A8 = 6.27059e−07

14th surface

K = −2.241
A4 = 5.25271e−04, A6 = −3.92304e−07, A8 = 1.13130e−06

Zoom data

| | Wide angle | Inter mediate | Telephoto |
|---|---|---|---|
| Image height | 3.84 | 3.84 | 3.84 |
| Focal length | 5.07 | 11.70 | 23.87 |
| Fno. | 3.55 | 4.79 | 4.99 |
| Angle of field 2ω | 80.01 | 34.65 | 17.94 |
| BF | 4.42 | 3.63 | 3.73 |
| Lens total length | 53.06 | 53.06 | 53.06 |
| d6 | 1.05 | 6.71 | 8.94 |
| d11 | 8.89 | 3.23 | 1.00 |
| d12 | 8.07 | 5.24 | 0.20 |
| d20 | 2.79 | 6.41 | 11.35 |
| d22 | 2.89 | 2.10 | 2.20 |

Group focal length

| f1 = 15.61 | f2 = −9.95 | f3 = 10.08 | f4 = 24.05 |

EXAMPLE 2

Unit mm

Surface data

| Surface no. | r | d | nd | νd |
|---|---|---|---|---|
| Object plane | ∞ | ∞ | | |
| 1 | 34.414 | 0.60 | 2.00069 | 25.46 |
| 2 | 8.335 | 2.79 | | |
| 3 | ∞ | 8.20 | 1.84666 | 23.78 |
| 4 | ∞ | 0.20 | | |
| 5* | 18.909 | 2.69 | 1.67790 | 55.34 |
| 6* | −12.048 | Variable | | |
| 7* | −15.198 | 0.48 | 1.83481 | 42.71 |
| 8* | 23.675 | 0.31 | | |
| 9 | −1230.529 | 1.38 | 1.92286 | 20.88 |
| 10 | −10.449 | 0.49 | 1.88300 | 40.76 |
| 11 | 65.116 | Variable | | |
| 12 (Stop) | ∞ | Variable | | |
| 13* | 7.235 | 3.10 | 1.51633 | 64.14 |
| 14* | −16.188 | 0.10 | | |
| 15 | 11.655 | 3.18 | 1.49700 | 81.54 |
| 16 | −7.238 | 0.50 | 1.58144 | 40.75 |
| 17 | −16.610 | 0.10 | | |
| 18 | 15.002 | 2.00 | 1.76182 | 26.52 |
| 19 | −7.169 | 0.48 | 2.00069 | 25.46 |
| 20 | 4.400 | Variable | | |
| 21 | −88.231 | 1.75 | 1.51633 | 64.14 |
| 22 | −9.746 | Variable | | |
| 23 | ∞ | 0.50 | 1.51633 | 64.14 |
| 24 | ∞ | 0.50 | | |
| 25 | ∞ | 0.50 | 1.51633 | 64.14 |
| 26 | ∞ | 0.37 | | |
| Image plane | ∞ | | | |

-continued

Unit mm

Aspherical surface data

5th surface

K = 2.598
A4 = −9.55137e−05, A6 = −8.44263e−07, A8 = 2.97645e−08,
A10 = −9.71553e−10

6th surface

K = 0.306
A4 = 9.36195e−05, A6 = −7.48511e−07, A8 = 5.34226e−08,
A10 = −1.13638e−09

7th surface

K = 5.341
A4 = −4.72102e−04, A6 = 4.10116e−05, A8 = −5.18872e−07,
A10 = −2.95827e−08

8th surface

K = −81.332
A4 = −7.36594e−05, A6 = −3.65771e−06, A8 = 2.00444e−06,
A10 = −1.22556e−07

13th surface

K = −0.648
A4 = −4.89727e−05, A6 = 5.25452e−06, A8 = 4.40791e−07

14th surface

K = 0.366
A4 = 4.80353e−04, A6 = 7.90419e−07, A8 = 6.83897e−07

Zoom data

| | Wide angle | Inter mediate | Telephoto |
|---|---|---|---|
| Image height | 3.84 | 3.84 | 3.84 |
| Focal length | 5.07 | 11.70 | 23.87 |
| Fno. | 3.59 | 4.96 | 5.26 |
| Angle of field 2ω | 80.01 | 34.65 | 17.88 |
| BF | 4.13 | 3.63 | 3.73 |
| Lens total length | 53.06 | 53.06 | 53.06 |
| d6 | 1.03 | 6.38 | 8.86 |
| d11 | 8.83 | 3.48 | 1.00 |
| d12 | 7.93 | 4.91 | 0.20 |
| d20 | 2.79 | 6.31 | 10.92 |
| d22 | 2.60 | 2.10 | 2.20 |

Group focal length

| f1 = 15.22 | f2 = −9.75 | f3 = 9.98 | f4 = 21.06 |
|---|---|---|---|

EXAMPLE 3

Unit mm

Surface data

| Surface no. | r | d | nd | νd |
|---|---|---|---|---|
| Object plane | ∞ | ∞ | | |
| 1 | 47.480 | 0.60 | 2.00069 | 25.46 |
| 2 | 8.779 | 2.48 | | |
| 3 | ∞ | 8.20 | 1.84666 | 23.78 |
| 4 | ∞ | 0.20 | | |
| 5* | 17.953 | 2.76 | 1.67790 | 55.34 |
| 6* | −11.730 | Variable | | |
| 7* | −14.130 | 0.48 | 1.83481 | 42.71 |
| 8* | 26.644 | 0.24 | | |
| 9 | 178.449 | 1.48 | 1.92286 | 20.88 |
| 10 | −10.556 | 0.49 | 1.88300 | 40.76 |
| 11 | 34.173 | Variable | | |
| 12 | ∞ | Variable | | |

-continued

Unit mm

| | | | | |
|---|---|---|---|---|
| (Stop) | | | | |
| 13* | 6.305 | 3.10 | 1.51633 | 64.14 |
| 14* | −16.369 | 0.10 | | |
| 15 | 14.446 | 2.90 | 1.49700 | 81.54 |
| 16 | −6.961 | 0.50 | 1.78590 | 44.20 |
| 17 | −12.019 | 0.17 | | |
| 18 | 15.752 | 2.20 | 1.76182 | 26.52 |
| 19 | −5.348 | 0.48 | 2.00069 | 25.46 |
| 20 | 4.400 | Variable | | |
| 21 | −23.420 | 1.58 | 1.51633 | 64.14 |
| 22 | −8.710 | Variable | | |
| 23 | ∞ | 0.50 | 1.51633 | 64.14 |
| 24 | ∞ | 0.50 | | |
| 25 | ∞ | 0.50 | 1.51633 | 64.14 |
| 26 | ∞ | 0.37 | | |
| Image plane | ∞ | | | |

Aspherical surface data

5th surface

K = 1.463
A4 = −6.37250e−05, A6 = −1.25277e−06, A8 = 3.52325e−08,
A10 = −7.78871e−10

6th surface

K = 0.062
A4 = 1.20940e−04, A6 = −1.46550e−06, A8 = 5.86427e−08,
A10 = −9.98852e−10

7th surface

K = 1.583
A4 = −4.03934e−04, A6 = 2.46240e−05, A8 = −9.91290e−08,
A10 = −3.24687e−08

8th surface

K = −58.000
A4 = −3.35730e−04, A6 = 1.53012e−05, A8 = 9.58581e−07,
A10 = −9.01726e−08

13th surface

K = 0.632
A4 = −7.21213e−04, A6 = −4.47065e−06, A8 = 5.58784e−07,
A10 = −4.21653e−08

14th surface

K = −8.781
A4 = 2.61180e−04, A6 = 1.07343e−05, A8 = 7.54335e−07,
A10 = 9.00000e−09

Zoom data

| | Wide angle | Inter mediate | Telephoto |
|---|---|---|---|
| Image height | 3.84 | 3.84 | 3.84 |
| Focal length | 5.07 | 15.30 | 29.22 |
| Fno. | 3.69 | 5.60 | 5.70 |
| Angle of field 2ω | 80.13 | 26.87 | 14.72 |
| BF | 4.25 | 3.63 | 3.73 |
| Lens total length | 54.12 | 54.12 | 54.12 |
| d6 | 1.06 | 7.65 | 9.54 |
| d11 | 9.51 | 2.92 | 1.03 |
| d12 | 8.54 | 4.67 | 0.20 |
| d20 | 2.79 | 7.29 | 11.66 |
| d22 | 2.72 | 2.10 | 2.20 |

Group focal length

| f1 = 14.63 | f2 = −9.06 | f3 = 9.74 | f4 = 25.91 |
|---|---|---|---|

EXAMPLE 4

Unit mm

Surface data

| Surface no. | r | d | nd | vd |
|---|---|---|---|---|
| Object plane | ∞ | ∞ | | |
| 1 | 23.265 | 0.60 | 2.00069 | 25.46 |
| 2 | 7.334 | 3.85 | | |
| 3 | ∞ | 8.65 | 1.84666 | 23.78 |
| 4 | ∞ | 0.20 | | |
| 5* | 29.359 | 3.30 | 1.67790 | 55.34 |
| 6* | −10.534 | Variable | | |
| 7* | −12.163 | 0.48 | 1.83481 | 42.71 |
| 8* | 38.152 | 0.16 | | |
| 9 | 71.455 | 1.45 | 1.92286 | 20.88 |
| 10 | −12.037 | 0.49 | 1.88300 | 40.76 |
| 11 | 39.225 | Variable | | |
| 12 (Stop) | ∞ | Variable | | |
| 13* | 7.818 | 3.04 | 1.52542 | 55.78 |
| 14* | −14.294 | 0.10 | | |
| 15 | 26.683 | 2.90 | 1.49700 | 81.54 |
| 16 | −6.359 | 0.50 | 1.65844 | 50.88 |
| 17 | −9.946 | 0.10 | | |
| 18 | 8.346 | 2.00 | 1.49700 | 81.54 |
| 19 | −22.947 | 0.48 | 2.00069 | 25.46 |
| 20 | 4.400 | Variable | | |
| 21 | −57.291 | 1.80 | 1.84666 | 23.78 |
| 22 | −11.803 | Variable | | |
| 23 | ∞ | 0.50 | 1.51633 | 64.14 |
| 24 | ∞ | 0.50 | | |
| 25 | ∞ | 0.50 | 1.51633 | 64.14 |
| 26 | ∞ | 0.37 | | |
| Image plane | ∞ | | | |

Aspherical surface data

5th surface

K = 0.000
A4 = −5.88336e−05, A6 = 1.52215e−06, A8 = −1.20350e−08

6th surface

K = 0.204
A4 = 9.91349e−05, A6 = 1.39733e−06, A8 = 4.39213e−09,
A10 = −4.01287e−11

7th surface

K = 0.000
A4 = 3.13817e−05, A6 = 2.04146e−08

8th surface

K = 0.000
A4 = −1.85162e−04, A6 = 1.00049e−06

13th surface

K = 0.000
A4 = −4.31729e−04, A6 = −3.90485e−06

14th surface

K = 0.000
A4 = 3.91453e−04, A6 = −3.66052e−06

Zoom data

| | Wide angle | Inter mediate | Telephoto |
|---|---|---|---|
| Image height | 3.84 | 3.84 | 3.84 |
| Focal length | 4.35 | 9.96 | 20.46 |
| Fno. | 3.66 | 5.13 | 5.36 |
| Angle of field 2ω | 88.00 | 40.21 | 21.01 |
| BF | 4.70 | 3.63 | 3.63 |
| Lens total length | 55.96 | 55.96 | 55.96 |
| d6 | 1.24 | 6.45 | 8.51 |
| d11 | 8.27 | 3.06 | 1.00 |
| d12 | 8.95 | 5.77 | 0.20 |
| d20 | 2.70 | 6.96 | 12.53 |
| d22 | 3.17 | 2.10 | 2.10 |

Group focal length

| f1 = 14.08 | f2 = −10.11 | f3 = 10.63 | f4 = 17.25 |

EXAMPLE 5

Unit mm

Surface data

| Surface no. | r | d | nd | vd |
|---|---|---|---|---|
| Object plane | ∞ | ∞ | | |
| 1 | 22.828 | 0.60 | 2.00069 | 25.46 |
| 2 | 7.053 | 3.55 | | |
| 3 | ∞ | 8.00 | 1.84666 | 23.78 |
| 4 | ∞ | 0.20 | | |
| 5* | 26.834 | 3.30 | 1.67790 | 55.34 |
| 6* | −10.609 | Variable | | |
| 7* | −12.510 | 0.48 | 1.83481 | 42.71 |
| 8* | 23.582 | 0.30 | | |
| 9 | 18.124 | 1.41 | 1.92286 | 20.88 |
| 10 | −24.393 | 0.49 | 1.88300 | 40.76 |
| 11 | 18.115 | Variable | | |
| 12 | 12.797 | 0.82 | 1.86400 | 40.58 |
| 13 | 13.339 | 0.50 | | |
| 14 (Stop) | ∞ | Variable | | |
| 15* | 7.910 | 3.10 | 1.52542 (plastic) | 55.78 |
| 16* | −17.311 | 0.10 | | |
| 17 | 24.101 | 2.90 | 1.49700 | 81.54 |
| 18 | −6.224 | 0.50 | 1.67003 | 47.23 |
| 19 | −9.959 | 0.30 | | |
| 20 | 7.916 | 2.00 | 1.49700 | 81.54 |
| 21 | −30.034 | 0.48 | 2.00069 | 25.46 |
| 22 | 4.478 | Variable | | |
| 23 | −26.362 | 1.80 | 1.84666 | 23.78 |
| 24 | −9.974 | Variable | | |
| 25 | ∞ | 0.50 | 1.51633 | 64.14 |
| 26 | ∞ | 0.50 | | |
| 27 | ∞ | 0.50 | 1.51633 | 64.14 |
| 28 | ∞ | 0.38 | | |
| Image plane | ∞ | | | |

Aspherical surface data

5th surface

K = 0.000
A4 = −4.91695e−05, A6 = 1.64604e−06, A8 = −1.57695e−08

6th surface

K = 0.324
A4 = 1.02111e−04, A6 = 1.75139e−06, A8 = −5.13795e−09,
A10 = 5.58263e−11

7th surface

K = 0.000
A4 = −9.50335e−05, A6 = 7.06034e−06

8th surface

K = 0.000
A4 = −2.96460e−04, A6 = 9.71749e−06

15th surface

K = 0.000
A4 = −3.39331e−04, A6 = −4.21019e−06

-continued

Unit mm

16th surface

K = 0.000
A4 = 4.34359e−04, A6 = −5.10616e−06

Zoom data

|  | Wide angle | Inter mediate | Telephoto |
| --- | --- | --- | --- |
| Image height | 3.84 | 3.84 | 3.84 |
| Focal length | 4.46 | 10.56 | 21.10 |
| Fno. | 3.50 | 4.63 | 6.00 |
| Angle of field 2ω | 88.50 | 38.69 | 21.10 |
| BF | 4.41 | 3.64 | 3.64 |
| Lens total length | 56.16 | 56.16 | 56.16 |
| d6 | 1.42 | 7.59 | 8.70 |
| d11 | 7.67 | 1.50 | 0.40 |
| d14 | 9.13 | 6.48 | 0.30 |
| d22 | 2.70 | 6.11 | 12.29 |
| d24 | 2.88 | 2.10 | 2.10 |

Group focal length f1 = 14.79  f2 = −9.90  f3 = 213.76  f4 = 10.50  f5 = 18.04

EXAMPLE 6

Unit mm

Surface data

| Surface no. | r | d | nd | νd |
| --- | --- | --- | --- | --- |
| Object plane | ∞ | ∞ | | |
| 1 | 23.420 | 0.60 | 2.00069 | 25.46 |
| 2 | 7.139 | 3.46 | | |
| 3 | ∞ | 8.00 | 1.84666 | 23.78 |
| 4 | ∞ | 0.20 | | |
| 5* | 26.501 | 3.30 | 1.67790 | 55.34 |
| 6* | −10.594 | Variable | | |
| 7* | −12.081 | 0.48 | 1.80610 | 40.92 |
| 8* | 33.072 | 0.33 | | |
| 9 | 48.022 | 1.29 | 1.92286 | 18.90 |
| 10 | −17.094 | 0.49 | 1.88300 | 40.76 |
| 11 | 30.808 | Variable | | |
| 12 | 22.885 | 0.81 | 1.92286 | 18.90 |
| 13 | 24.638 | 0.50 | | |
| 14 (Stop) | ∞ | Variable | | |
| 15* | 7.817 | 3.10 | 1.52542 (plastic) | 55.78 |
| 16* | −16.414 | 0.10 | | |
| 17 | 24.829 | 2.90 | 1.49700 | 81.54 |
| 18 | −6.445 | 0.50 | 1.67003 | 47.23 |
| 19 | −10.250 | 0.30 | | |
| 20 | 8.129 | 2.00 | 1.49700 | 81.54 |
| 21 | −30.192 | 0.48 | 2.00069 | 25.46 |
| 22 | 4.366 | Variable | | |
| 23 | −44.791 | 1.80 | 1.71736 | 29.52 |
| 24 | −10.005 | Variable | | |
| 25 | ∞ | 0.50 | 1.51633 | 64.14 |
| 26 | ∞ | 0.50 | | |
| 27 | ∞ | 0.50 | 1.51633 | 64.14 |
| 28 | ∞ | 0.39 | | |
| Image plane | ∞ | | | |

Aspherical surface data

5th surface

K = 0.000
A4 = −4.78927e−05, A6 = 1.68625e−06, A8 = −1.54896e−08

-continued

Unit mm

6th surface

K = 0.319
A4 = 1.05793e−04, A6 = 1.78383e−06, A8 = −4.75593e−09,
A10 = 5.90186e−11
7th surface K = 0.000
A4 = −1.26046e−04, A6 = 6.57080e−06
8th surface K = 0.000
A4 = −3.56766e−04, A6 = 8.24963e−06
15th surface K = 0.000
A4 = −3.51724e−04, A6 = −5.43471e−06
16th surface K = 0.000
A4 = 4.38931e−04, A6 = −6.11096e−06

Zoom data (∞)

|  | Wide angle | Inter mediate | Telephoto |
| --- | --- | --- | --- |
| Image height | 3.84 | 3.84 | 3.84 |
| Focal length | 4.46 | 10.82 | 21.10 |
| Fno. | 3.50 | 4.69 | 8.09 |
| Angle of field 2ω | 87.33 | 37.47 | 20.95 |
| BF | 4.35 | 3.64 | 3.64 |
| Lens total length | 55.96 | 55.96 | 55.96 |
| d6 | 1.44 | 7.75 | 8.95 |
| d11 | 7.87 | 1.56 | 0.36 |
| d14 | 8.96 | 6.18 | 0.30 |
| d22 | 2.70 | 6.19 | 12.07 |
| d24 | 2.81 | 2.10 | 2.09 |

Group focal length f1 = 14.78  f2 = −9.93  f3 = 285.03  f4 = 10.61  f5 = 17.58

EXAMPLE 7

Unit mm

Surface data

| Surface no. | r | d | nd | νd |
| --- | --- | --- | --- | --- |
| Object plane | ∞ | ∞ | | |
| 1 | 22.899 | 0.60 | 2.00069 | 25.46 |
| 2 | 7.589 | 3.01 | | |
| 3 | ∞ | 8.00 | 1.84666 | 23.78 |
| 4 | ∞ | 0.20 | | |
| 5* | 21.083 | 2.76 | 1.67790 | 55.34 |
| 6* | −11.996 | Variable | | |
| 7* | −14.449 | 0.48 | 1.83481 | 42.71 |
| 8* | 26.049 | 0.35 | | |
| 9 | −6223.286 | 1.38 | 1.92286 | 20.88 |
| 10 | −10.824 | 0.49 | 1.88300 | 40.76 |
| 11 | 96.344 | Variable | | |
| 12 (Stop) | ∞ | Variable | | |
| 13* | 7.046 | 3.10 | 1.49700 | 81.54 |
| 14* | −17.108 | 0.10 | | |
| 15 | 10.918 | 2.80 | 1.49700 | 81.54 |
| 16 | −9.727 | 0.25 | | |
| 17 | −9.954 | 0.50 | 1.78590 | 44.20 |
| 18 | −21.345 | 0.10 | | |
| 19 | 12.669 | 2.05 | 1.76182 | 26.52 |
| 20 | −7.446 | 0.48 | 2.00069 | 25.46 |

-continued

Unit mm

| | | | | |
|---|---|---|---|---|
| 21 | 4.400 | Variable | | |
| 22 | −9085.208 | 1.84 | 1.51633 | 64.14 |
| 23 | −10.242 | Variable | | |
| 24 | ∞ | 0.50 | 1.51633 | 64.14 |
| 25 | ∞ | 0.50 | | |
| 26 | ∞ | 0.50 | 1.51633 | 64.14 |
| 27 | ∞ | 0.37 | | |
| Image plane | ∞ | | | |

Aspherical surface data

5th surface

K = 0.650
A4 = −7.23509e−05, A6 = 4.83028e−07, A8 = −1.10382e−08,
A10 = −7.12765e−10
6th surface K = 0.516
A4 = 5.96254e−05, A6 = 5.61292e−07, A8 = 6.55934e−09,
A10 = −7.55825e−10
7th surface K = −0.007
A4 = −2.34549e−04, A6 = 1.82817e−05, A8 = −6.15815e−07,
A10 = 1.54272e−09
8th surface K = −21.560
A4 = −2.25555e−04, A6 = 2.18530e−05, A8 = −8.00407e−07,
A10 = −1.78416e−09
13th surface K = −0.329
A4 = −2.24749e−04, A6 = 2.47317e−06, A8 = 2.85706e−07,
A10 = −1.67273e−08
14th surface K = 3.862
A4 = 4.59557e−04, A6 = 3.78736e−06, A8 = 3.55172e−07,
A10 = −1.39226e−08

Zoom data

| | Wide angle | Inter mediate | Telephoto |
|---|---|---|---|
| Image height | 3.84 | 3.84 | 3.84 |
| Focal length | 5.07 | 11.70 | 23.87 |
| Fno. | 3.52 | 4.78 | 4.84 |
| Angle of field 2ω | 80.17 | 34.65 | 17.86 |
| BF | 3.96 | 3.63 | 3.73 |
| Lens total length | 52.74 | 52.74 | 52.74 |
| d6 | 0.61 | 6.43 | 9.02 |
| d11 | 8.71 | 2.89 | 0.29 |
| d12 | 8.19 | 5.23 | 0.42 |
| d21 | 2.79 | 6.08 | 10.79 |
| d23 | 2.43 | 2.10 | 2.20 |

Group focal length

| f1 = 16.13 | f2 = −10.33 | f3 = 10.11 | f4 = 19.86 |
|---|---|---|---|

EXAMPLE 8

Unit mm

Surface data

| Surface no. | r | d | nd | vd |
|---|---|---|---|---|
| Object plane | ∞ | ∞ | | |
| 1 | 32.144 | 0.60 | 2.00069 | 25.46 |
| 2 | 8.211 | 2.83 | | |

-continued

Unit mm

| | | | | |
|---|---|---|---|---|
| 3 | ∞ | 8.20 | 1.84666 | 23.78 |
| 4 | ∞ | 0.20 | | |
| 5* | 19.926 | 2.66 | 1.67790 | 55.34 |
| 6* | −12.034 | Variable | | |
| 7* | −13.618 | 0.48 | 1.83481 | 42.71 |
| 8* | 28.649 | 0.67 | | |
| 9 | 972.267 | 1.40 | 1.92286 | 20.88 |
| 10 | −10.789 | 0.49 | 1.88300 | 40.76 |
| 11 | 75.186 | Variable | | |
| 12 (Stop) | ∞ | Variable | | |
| 13* | 7.206 | 3.10 | 1.51633 | 64.14 |
| 14* | −16.812 | 0.10 | | |
| 15 | 11.024 | 2.80 | 1.49700 | 81.54 |
| 16 | −7.261 | 0.50 | 1.78590 | 44.20 |
| 17 | −11.533 | 0.10 | | |
| 18 | 16.351 | 2.10 | 1.80100 | 34.97 |
| 19 | −6.815 | 0.48 | 2.00330 | 28.27 |
| 20 | 4.383 | Variable | | |
| 21 | −45.324 | 1.66 | 1.51633 | 64.14 |
| 22 | −9.640 | Variable | | |
| 23 | ∞ | 0.50 | 1.51633 | 64.14 |
| 24 | ∞ | 0.50 | | |
| 25 | ∞ | 0.50 | 1.51633 | 64.14 |
| 26 | ∞ | 0.37 | | |
| Image plane | ∞ | | | |

Aspherical surface data

5th surface

K = 1.809
A4 = −7.82680e−05, A6 = −4.83356e−08, A8 = 1.88799e−08,
A10 = −1.01721e−09
6th surface K = −0.021
A4 = 5.50140e−05, A6 = −2.67889e−07, A8 = 3.87895e−08,
A10 = −1.19515e−09
7th surface K = 1.122
A4 = −2.30591e−04, A6 = 1.51962e−05, A8 = 2.20702e−07,
A10 = −3.04578e−08
8th surface K = −21.804
A4 = −3.24330e−04, A6 = 1.24274e−05, A8 = 8.96529e−07,
A10 = −6.84697e−08
13th surface K = −0.167
A4 = −2.10811e−04, A6 = 4.64654e−06, A8 = 3.20200e−07
14th surface K = −0.083
A4 = 5.20986e−04, A6 = 1.92229e−06, A8 = 5.56624e−07

Zoom data

| | Wide angle | Intermediate | Telephoto |
|---|---|---|---|
| Image height | 3.84 | 3.84 | 3.84 |
| Focal length | 5.07 | 11.70 | 23.87 |
| Fno. | 3.48 | 4.75 | 4.89 |
| Angle of field 2ω | 80.04 | 34.65 | 17.90 |
| BF | 4.38 | 3.63 | 3.73 |
| Lens total length | 52.71 | 52.71 | 52.71 |
| d6 | 1.02 | 6.65 | 9.02 |
| d11 | 8.10 | 2.47 | 0.10 |
| d12 | 8.05 | 5.13 | 0.20 |
| d20 | 2.79 | 6.46 | 11.29 |
| d22 | 2.85 | 2.10 | 2.20 |

Group focal length

| f1 = 15.79 | f2 = −10.07 | f3 = 10.08 | f4 = 23.34 |
|---|---|---|---|

EXAMPLE 9

Unit mm

Surface data

| Surface no. | r | d | nd | vd |
|---|---|---|---|---|
| Object plane | ∞ | ∞ | | |
| 1 | 23.103 | 0.60 | 2.00069 | 25.46 |
| 2 | 7.285 | 3.14 | | |
| 3 | ∞ | 8.20 | 1.84666 | 23.78 |
| 4 | ∞ | 0.20 | | |
| 5* | 25.024 | 2.79 | 1.67790 | 55.34 |
| 6* | −10.920 | Variable | | |
| 7* | −11.963 | 0.48 | 1.83481 | 42.71 |
| 8* | 91.460 | 0.27 | | |
| 9 | −56.289 | 1.44 | 1.92286 | 20.88 |
| 10 | −8.809 | 0.49 | 1.88300 | 40.76 |
| 11 | 96.949 | Variable | | |
| 12 (Stop) | ∞ | Variable | | |
| 13* | 6.308 | 3.10 | 1.51633 | 64.14 |
| 14* | −24.594 | 0.10 | | |
| 15 | 14.834 | 2.80 | 1.49700 | 81.54 |
| 16 | −6.028 | 0.50 | 1.78590 | 44.20 |
| 17 | −11.885 | 0.10 | | |
| 18 | 12.456 | 2.05 | 1.76182 | 26.52 |
| 19 | −7.727 | 0.48 | 2.00069 | 25.46 |
| 20 | 3.962 | 0.60 | | |
| 21 | 5.509 | 1.14 | 1.62004 | 36.26 |
| 22 | 10.651 | Variable | | |
| 23 | −16.253 | 1.31 | 1.51633 | 64.14 |
| 24 | −9.085 | Variable | | |
| 25 | ∞ | 0.50 | 1.51633 | 64.14 |
| 26 | ∞ | 0.50 | | |
| 27 | ∞ | 0.50 | 1.51633 | 64.14 |
| 28 | ∞ | 0.37 | | |
| Image plane | ∞ | | | |

Aspherical surface data

5th surface

K = 1.433
A4 = −7.13124e−05, A6 = 1.89271e−07, A8 = 3.31269e−08,
A10 = −1.10821e−09

6th surface

K = −0.157
A4 = 2.66448e−05, A6 = −7.73483e−08, A8 = 4.36295e−08,
A10 = −1.13984e−09

7th surface

K = −1.031
A4 = −1.68166e−04, A6 = 2.08512e−05, A8 = −9.33647e−07,
A10 = −5.68618e−09

8th surface

K = −1.000
A4 = −2.54673e−04, A6 = 1.98194e−05, A8 = −3.58936e−07,
A10 = −4.39942e−08

13th surface

K = −0.404
A4 = −1.67728e−04, A6 = 7.05980e−06, A8 = −2.44270e−07,
A10 = 1.15735e−08

14th surface

K = 22.944
A4 = 4.53360e−04, A6 = 9.35103e−06, A8 = −3.89252e−07,
A10 = 2.28561e−08

Zoom data

| | Wide angle | Intermediate | Telephoto |
|---|---|---|---|
| Image height | 3.84 | 3.84 | 3.84 |
| Focal length | 5.07 | 11.70 | 23.87 |
| Fno. | 3.57 | 4.63 | 5.30 |
| Angle of field 2ω | 79.83 | 34.64 | 17.93 |
| BF | 3.96 | 3.63 | 3.73 |
| Lens total length | 54.72 | 54.72 | 54.72 |
| d6 | 1.25 | 7.44 | 9.66 |
| d11 | 9.04 | 2.84 | 0.63 |
| d12 | 7.90 | 5.36 | 0.33 |
| d22 | 2.79 | 5.66 | 10.59 |
| d24 | 2.43 | 2.10 | 2.20 |

Group focal length

| f1 = 15.50 | f2 = −9.86 | f3 = 10.12 | f4 = 37.55 |
|---|---|---|---|

EXAMPLE 10

Unit mm

Surface data

| Surface no. | r | d | nd | vd |
|---|---|---|---|---|
| Object plane | ∞ | ∞ | | |
| 1 | 25.535 | 0.60 | 2.00069 | 25.46 |
| 2 | 7.949 | 2.91 | | |
| 3 | ∞ | 8.20 | 1.84666 | 23.78 |
| 4 | ∞ | 0.20 | | |
| 5* | 20.837 | 2.66 | 1.67790 | 55.34 |
| 6* | −11.817 | Variable | | |
| 7* | −12.967 | 0.48 | 1.83481 | 42.71 |
| 8* | 31.999 | 0.28 | | |
| 9 | 380.141 | 1.45 | 1.92286 | 20.88 |
| 10 | −10.697 | 0.49 | 1.88300 | 40.76 |
| 11 | 62.330 | Variable | | |
| 12 (Stop) | ∞ | Variable | | |
| 13* | 7.097 | 3.10 | 1.49700 | 81.54 |
| 14* | −17.564 | 0.10 | | |
| 15 | 12.573 | 0.50 | 1.78590 | 44.20 |
| 16 | 8.702 | 2.80 | 1.49700 | 81.54 |
| 17 | −15.558 | 0.28 | | |
| 18 | 11.530 | 2.00 | 1.76182 | 26.52 |
| 19 | −9.107 | 0.48 | 2.00069 | 25.46 |
| 20 | 4.400 | Variable | | |
| 21 | −53.517 | 1.66 | 1.51633 | 64.14 |
| 22 | −9.932 | Variable | | |
| 23 | ∞ | 0.50 | 1.51633 | 64.14 |
| 24 | ∞ | 0.50 | | |
| 25 | ∞ | 0.50 | 1.51633 | 64.14 |
| 26 | ∞ | 0.37 | | |
| Image plane | ∞ | | | |

Aspherical surface data

5th surface

K = 2.647
A4 = −8.16298e−05, A6 = −2.04040e−07, A8 = 2.26571e−08,
A10 = −1.13361e−09

6th surface

K = −0.114
A4 = 4.85518e−05, A6 = −4.17413e−07, A8 = 4.52479e−08,
A10 = −1.36138e−09

7th surface

K = 0.380
A4 = −1.34104e−04, A6 = 1.44029e−05, A8 = −2.34216e−07,
A10 = −6.62574e−09

8th surface

K = −7.713
A4 = −3.02131e−04, A6 = 1.62333e−05, A8 = −6.81665e−08,
A10 = −2.00000e−08

-continued

Unit mm

13th surface

K = −0.380
A4 = −2.34895e−04, A6 = 4.17991e−06, A8 = 2.92056e−07,
A10 = −8.84243e−10
14th surface K = 2.063
A4 = 5.34754e−04, A6 = 1.22465e−06, A8 = 5.29461e−07,
A10 = −1.09611e−09

Zoom data(∞)

| | Wide angle | Intermediate | Telephoto |
|---|---|---|---|
| Image height | 3.84 | 3.84 | 3.84 |
| Focal length | 5.07 | 12.70 | 23.87 |
| Fno. | 3.58 | 5.16 | 5.15 |
| Angle of field 2ω | 80.21 | 32.09 | 17.89 |
| BF | 4.63 | 3.63 | 3.73 |
| Lens total length | 52.86 | 52.86 | 52.86 |
| d6 | 0.55 | 6.43 | 8.46 |
| d11 | 8.53 | 2.65 | 0.62 |
| d12 | 8.16 | 4.72 | 0.20 |
| d20 | 2.79 | 7.23 | 11.65 |
| d22 | 3.10 | 2.10 | 2.20 |

Group focal length

| f1 = 15.52 | f2 = −9.97 | f3 = 10.32 | f4 = 23.32 |
|---|---|---|---|

EXAMPLE 11

Unit mm

Surface data

| Surface no. | r | d | nd | vd |
|---|---|---|---|---|
| Object plane | ∞ | ∞ | | |
| 1 | 48.577 | 0.70 | 2.00069 | 25.46 |
| 2 | 10.107 | 2.63 | | |
| 3 | ∞ | 8.20 | 1.84666 | 23.78 |
| 4 | ∞ | 0.20 | | |
| 5* | 17.629 | 2.70 | 1.69350 | 53.21 |
| 6* | −12.700 | −0.50 | | |
| 7 | ∞ | Variable | | |
| 8* | −12.600 | 0.70 | 1.74320 | 49.34 |
| 9* | 25.775 | 0.66 | | |
| 10 | −31.996 | 1.77 | 1.92286 | 20.88 |
| 11 | −8.701 | 0.51 | 1.88300 | 40.76 |
| 12 | 3895.339 | Variable | | |
| 13 (Stop) | ∞ | Variable | | |
| 14* | 6.818 | 2.96 | 1.49650 | 81.61 |
| 15* | −10.365 | 0.20 | | |
| 16 | 14.000 | 3.12 | 1.49700 | 81.54 |
| 17 | −12.304 | 0.51 | 1.58144 | 40.75 |
| 18 | 165.043 | 0.59 | | |
| 19 | 35.016 | 0.50 | 1.90366 | 31.32 |
| 20 | 4.196 | 1.99 | 1.48749 | 70.23 |
| 21 | 5.597 | Variable | | |
| 22* | 15.787 | 2.14 | 1.53071 | 55.60 |
| 23* | −26.494 | Variable | | |
| 24 | ∞ | 0.50 | 1.51633 | 64.14 |
| 25 | ∞ | 0.50 | | |
| 26 | ∞ | 0.50 | 1.51633 | 64.14 |
| 27 | ∞ | 0.37 | | |
| Image plane | ∞ | | | |

-continued

Unit mm

Aspherical surface data

5th surface

K = 0.000
A4 = 2.32602e−06, A6 = −2.07410e−06, A8 = 5.13596e−08,
A10 = −2.01584e−09
6th surface K = 0.000
A4 = 1.43481e−04, A6 = −2.32589e−06, A8 = 5.78628e−08,
A10 = −1.86857e−09
8th surface K = 0.000
A4 = 2.67289e−04, A6 = −1.98193e−05, A8 = 1.04623e−06,
A10 = −3.57176e−08
9th surface K = 0.000
A4 = −1.55209e−05, A6 = −2.85525e−06, A8 = 3.17794e−10,
A10 = −3.12800e−08
14th surface K = 0.000
A4 = −5.89240e−04, A6 = 5.70150e−07, A8 = −2.53460e−07,
A10 = −3.95298e−10
15th surface K = 0.000
A4 = 3.80044e−04, A6 = −4.63412e−07, A8 = −1.04600e−07
22nd surface K = 0.000
A4 = 9.79349e−05, A6 = 1.18000e−05, A8 = −3.62585e−06,
A10 = 1.18273e−07
23rd surface K = 0.000
A4 = 2.58960e−04, A6 = −4.95846e−06, A8 = −3.22466e−06,
A10 = 1.14024e−07

Zoom data

| | Wide angle | Intermediate | Telephoto |
|---|---|---|---|
| Image height | 3.84 | 3.84 | 3.84 |
| Focal length | 5.14 | 10.89 | 24.48 |
| Fno. | 4.00 | 5.23 | 6.00 |
| Angle of field 2ω | 82.83 | 37.00 | 17.23 |
| BF | 4.40 | 4.91 | 5.15 |
| Lens total length | 54.86 | 54.86 | 54.86 |
| d7 | 1.05 | 5.58 | 8.61 |
| d12 | 8.36 | 3.83 | 0.80 |
| d13 | 8.95 | 5.98 | 0.80 |
| d21 | 2.51 | 4.99 | 9.93 |
| d23 | 2.89 | 3.38 | 3.62 |

Group focal length

| f1 = 14.27 | f2 = −8.73 | f3 = 10.77 | f4 = 18.97 |
|---|---|---|---|

EXAMPLE 12

Unit mm

Surface data

| Surface no. | r | d | nd | vd |
|---|---|---|---|---|
| Object plane | ∞ | ∞ | | |
| 1 | 42.373 | 0.70 | 2.00069 | 25.46 |
| 2 | 10.100 | 2.70 | | |

-continued

Unit mm

| | | | | |
|---|---|---|---|---|
| 3 | ∞ | 8.20 | 1.84666 | 23.78 |
| 4 | ∞ | 0.20 | | |
| 5* | 16.111 | 2.70 | 1.67790 | 55.34 |
| 6* | −12.760 | −0.50 | | |
| 7 (Flare stop) | ∞ | Variable | | |
| 8* | −11.018 | 0.70 | 1.82080 | 42.71 |
| 9* | 17.781 | 0.56 | | |
| 10 | −586.373 | 1.92 | 1.92286 | 20.88 |
| 11 | −9.788 | 0.51 | 1.88300 | 40.76 |
| 12 | 1453.722 | Variable | | |
| 13 (Stop) | ∞ | Variable | | |
| 14* | 6.812 | 2.93 | 1.49700 | 81.54 |
| 15* | −10.462 | 0.20 | | |
| 16 | 12.605 | 3.10 | 1.49700 | 81.54 |
| 17 | −9.490 | 0.51 | 1.57501 | 41.50 |
| 18 | 14.908 | 0.59 | | |
| 19 | 15.291 | 0.50 | 1.90366 | 31.32 |
| 20 | 4.200 | 2.02 | 1.48749 | 70.23 |
| 21 | 5.698 | Variable | | |
| 22* | 13.577 | 2.14 | 1.53071 | 55.60 |
| 23 | −31.289 | Variable | | |
| 24 | ∞ | 0.50 | 1.51633 | 64.14 |
| 25 | ∞ | 0.50 | | |
| 26 | ∞ | 0.50 | 1.51633 | 64.14 |
| 27 | ∞ | 0.37 | | |
| Image plane | ∞ | | | |

Aspherical surface data

5th surface

K = 0.000
A4 = −4.04877e−05, A6 = 1.17594e−06, A8 = −4.20151e−08,
A10 = −4.00000e−11

6th surface

K = 0.000
A4 = 1.15115e−04, A6 = 1.18439e−06, A8 = −4.55462e−08,
A10 = 1.18997e−10

8th surface

K = 0.000
A4 = 1.58891e−04, A6 = −1.91633e−06, A8 = 6.27648e−07,
A10 = −3.41665e−08

9th surface

K = 0.000
A4 = −1.90101e−04, A6 = 2.59346e−06, A8 = 1.21485e−06,
A10 = −8.98299e−08

-continued

Unit mm

14th surface

K = 0.000
A4 = −5.27234e−04, A6 = −4.08459e−06, A8 = 9.62597e−08,
A10 = −4.65881e−09

15th surface

K = 0.000
A4 = 3.80829e−04, A6 = −3.07648e−06, A8 = 1.09869e−07

22nd surface

K = 0.000
A4 = 2.20237e−05, A6 = 1.52942e−06, A8 = −9.35280e−08

Zoom data

| | Wide angle | Intermediate | Telephoto |
|---|---|---|---|
| Image height | 3.84 | 3.84 | 3.84 |
| Focal length | 5.14 | 10.96 | 24.51 |
| Fno. | 4.00 | 4.98 | 6.00 |
| Angle of field 2ω | 82.46 | 36.51 | 17.16 |
| BF | 4.63 | 5.22 | 5.11 |
| Lens total length | 54.87 | 54.87 | 54.87 |
| d7 | 1.12 | 5.81 | 8.48 |
| d12 | 8.16 | 3.47 | 0.80 |
| d13 | 8.77 | 6.15 | 0.80 |
| d21 | 2.52 | 4.54 | 10.02 |
| d23 | 3.10 | 3.70 | 3.57 |

Group focal length

| f1 = 13.74 | f2 = −8.37 | f3 = 10.89 | f4 = 18.14 |

FIGS. 11A, 11B, and 11C to FIGS. 20A, 20B, and 20C, FIGS. 26A, 26B, and 26C, and FIGS. 28A, 28B, and 28C are aberration diagrams of the zoom lenses according to the first to tenth, eleventh, and twelfth embodiments in the state in which the zoom lenses are focused on an object point at infinity. These aberration diagrams show spherical aberration (SA), astigmatism (AS), distortion (DT), and chromatic aberration of magnification (CC) respectively at the wide angle end in FIGS. 1A, 2A, 3A, 4A, 5A, 6A, 7A, 8A, 9A, 10A, 26A, and 28A, in an intermediate focal length state in FIGS. 1B, 2B, 3B, 4B, 5B, 6B, 7B, 8B, 9B, 10B, 26B, and 28B, and at the telephoto end in FIGS. 10, 2C, 3C, 4C, 5C, 6C, 7C, 8C, 9C, 10C, 26C, and 28C. The sign "ω" in the diagrams represents half angle of view.

Further, values of conditional expressions (1)-(10) in each embodiment are shown below:

| | Example 1 | Example 2 | Example 3 |
|---|---|---|---|
| (1A), (1) $(R_{2F} + R_{2B})/(R_{2F} − R_{2B})$ | 0.003 | −0.175 | 0.092 |
| (2) $N_{n1} − N_{p1}$ | 0.23887 | 0.23887 | 0.23887 |
| (3) $\nu_{n1}$ | 25.46 | 25.46 | 25.46 |
| (4) $N_{n1}$ | 2.00069 | 2.00069 | 2.00069 |
| (5) $\nu_{p2} − \nu_{n2}$ | 37.34 | 40.79 | 37.34 |
| (6) $(R_{nmF} + R_{nmB})/(R_{nmF} − R_{nmB})$ | −4.44 | −2.54 | −3.75 |
| (7) $(R_{13} + R_{23})/(R_{13} + R_{23})$ | −4.44 | −2.54 | −3.75 |
| (8) $\beta_{GT}/\beta_{GW}$ | 2.24 | 2.2 | 2.31 |
| (9) $D_g/D_{all}$ | 0.17 | 0.177 | 0.173 |
| (10) $f_t/f_w$ | 4.71 | 4.71 | 5.76 |

| | Example 4 | Example 5 | Example 6 |
|---|---|---|---|
| (1A), (1) $(R_{2F} + R_{2B})/(R_{2F} − R_{2B})$ | 0.457 | 0.415 | 0.416 |
| (2) $N_{n1} − N_{p1}$ | 0.50369 | 0.50369 | 0.50369 |
| (3) $\nu_{n1}$ | 25.46 | 25.46 | 25.46 |
| (4) $N_{n1}$ | 2.00069 | 2.00069 | 2.00069 |
| (5) $\nu_{p2} − \nu_{n2}$ | 30.66 | 34.31 | 34.31 |
| (6) $(R_{nmF} + R_{nmB})/(R_{nmF} − R_{nmB})$ | −4.55 | −4.33 | −4.39 |

-continued

|  | | | |
|---|---|---|---|
| (7) $(R_{13} + R_{23})/(R_{13} + R_{23})$ | −4.55 | −4.33 | −4.39 |
| (8) $\beta_{GT}/\beta_{GW}$ | 2.23 | 2.44 | 2.35 |
| (9) $D_g/D_{all}$ | 0.162 | 0.166 | 0.167 |
| (10) $f_t/f_w$ | 4.71 | 4.73 | 4.73 |

|  | Example 7 | Example 8 | Example 9 |
|---|---|---|---|
| (1A), (1) $(R_{2F} + R_{2B})/(R_{2F} − R_{2B})$ | — | −0.023 | 0.110 |
| (2) $N_{n1} − N_{p1}$ | 0.23887 | 0.20230 | — |
| (3) $\nu_{n1}$ | 25.46 | 28.27 | — |
| (4) $N_{n1}$ | 2.00069 | 2.00330 | — |
| (5) $\nu_{p2} − \nu_{n2}$ | 37.34 | 37.34 | 37.34 |
| (6) $(R_{nmF} + R_{nmB})/(R_{nmF} − R_{nmB})$ | −2.75 | −4.40 | −3.06 |
| (7) $(R_{13} + R_{23})/(R_{13} + R_{23})$ | −2.75 | −4.40 | −3.06 |
| (8) $\beta_{GT}/\beta_{GW}$ | 2.23 | 2.24 | 2.27 |
| (9) $D_g/D_{all}$ | 0.177 | 0.173 | 0.197 |
| (10) $f_t/f_w$ | 4.71 | 4.71 | 4.71 |

|  | Example 10 | Example 11 | Example 12 |
|---|---|---|---|
| (1A), (1) $(R_{2F} + R_{2B})/(R_{2F} − R_{2B})$ | −0.106 | −1.1853 | −11.94 |
| (2) $N_{n1} − N_{p1}$ | 0.23887 | — | — |
| (3) $\nu_{n1}$ | 25.46 | — | — |
| (4) $N_{n1}$ | 2.00069 | — | — |
| (5) $\nu_{p2} − \nu_{n2}$ | 37.34 | — | — |
| (6) $(R_{nmF} + R_{nmB})/(R_{nmF} − R_{nmB})$ | — | — | — |
| (7) $(R_{13} + R_{23})/(R_{13} + R_{23})$ | — | — | — |
| (8) $\beta_{GT}/\beta_{GW}$ | 2.18 | 2.114 | 1.985 |
| (9) $D_g/D_{all}$ | 0.174 | 0.178767 | 0.17832 |
| (10) $f_t/f_w$ | 4.71 | 4.7645 | 4.7675 |

|  | Example 1 | Example 2 | Example 3 | Example 4 | Example 5 | Example 6 |
|---|---|---|---|---|---|---|
| Residual amount of distortion | −3.00% | −3.00% | −3.00% | −5.00% | −5.00% | −5.00% |
| Angle of field 2ω | 77.63 | 77.62 | 77.60 | 86.97 | 85.84 | 85.31 |
| Image height | 3.689 | 3.689 | 3.681 | 3.763 | 3.733 | 3.773 |

|  | Example 7 | Example 8 | Example 9 | Example 10 | Example 11 | Example 12 |
|---|---|---|---|---|---|---|
| Residual amount of distortion | −3.00% | −3.00% | −3.00% | −3.00% | −3.00% | −3.00% |
| Angle of field 2ω | 77.64 | 77.64 | 77.70 | 77.63 | 77.43 | 77.584 |
| Image height | 3.685 | 3.689 | 3.700 | 3.683 | 3.566 | 3.582 |

(Correction of Distortion)

Incidentally, when the zoom lens system of the present invention is used, a digital correction of distortion of an image is carried out electrically. A basic concept for the digital correction of the distortion of an image will be described below.

Figure 21:
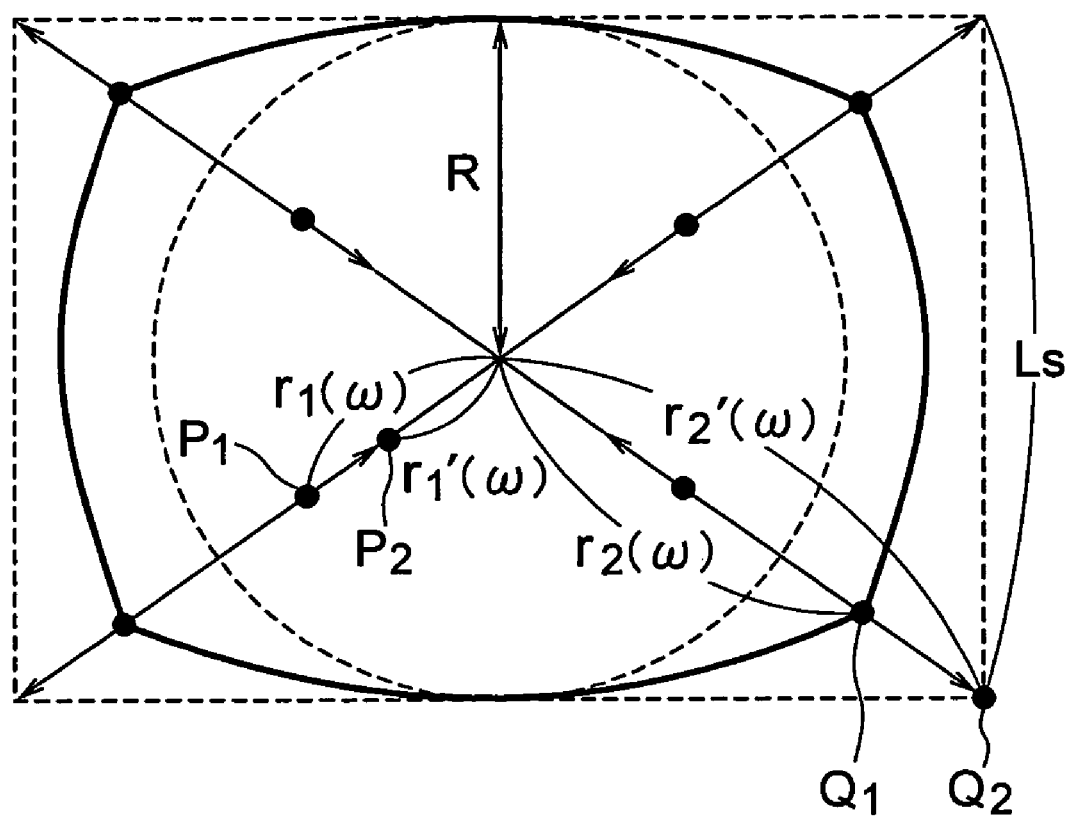
FIG. 21 is a diagram illustrating correction of distortion.

For example, as shown in FIG. 21, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r (ω) other than the radius R is moved in a substantial direction of radiation, and the correction is carried out by moving on a concentric circle such that the radius becomes r'(ω).

For example, in FIG. 21, a point $P_1$ on a circumference of an arbitrary radius $r_1$ (ω) positioned at an inner side of a circle of radius R is moved to a point $P_2$ on a circumference of a radius $r_1$' (ω) which is to be corrected, directed toward a center of the circle. Moreover, a point $Q_1$ on a circumference of an arbitrary radius $r_2$ (ω) positioned at an outer side of the circle of radius R is moved to a point $Q_2$ on a circumference of a radius $r_2$' (ω) which is to be corrected, directed toward a direction away from the center of the circle.

Here, r'(ω) can be expressed as follows.

$$r'(\omega) = \alpha \cdot f \cdot \tan \omega (0 \leq \alpha \leq 1)$$

where, ω is a half angle of field of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r (ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r' (ω)–r (ω), an arrangement may be made such that a relationship between r (ω), in other words, half angle of field and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y / \tan \omega$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $$f > y / \tan \omega.$$

In other words, when the focal length f of the imaging system, and the image height y are let to be fixed, a value of ω becomes large.

(Digital Camera)

Further, the present invention could be applied to an electrical image pick up apparatus, especially a digital camera, video camera etc. in which the object image is formed by the above-mentioned zoom lens, then the object image is light-received such as CCD etc. Such embodiment will be described below.

Figure 22:
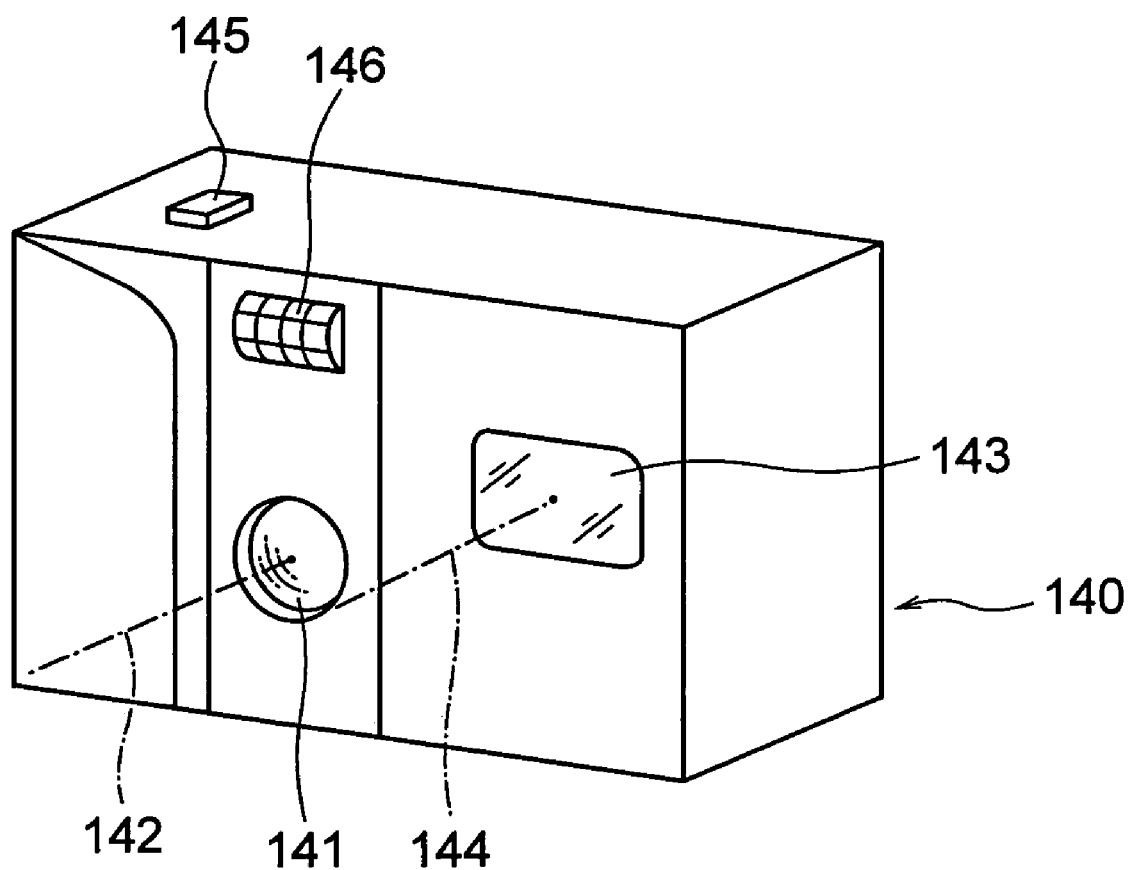
FIG. 22 is a front perspective view showing an outer appearance of a digital camera equipped with a zoom lens with bent optical path according to the present invention.
Figure 23:
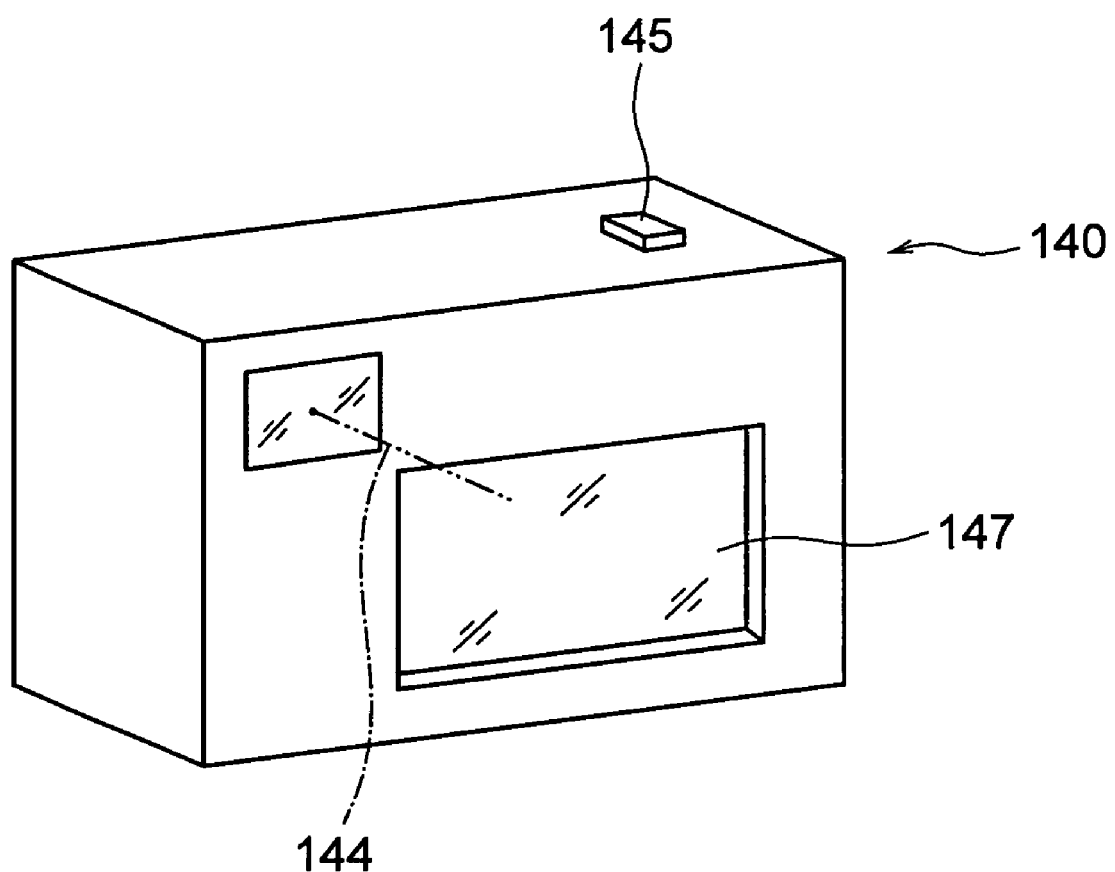
FIG. 23 is a rear perspective view of the digital camera.
Figure 24:
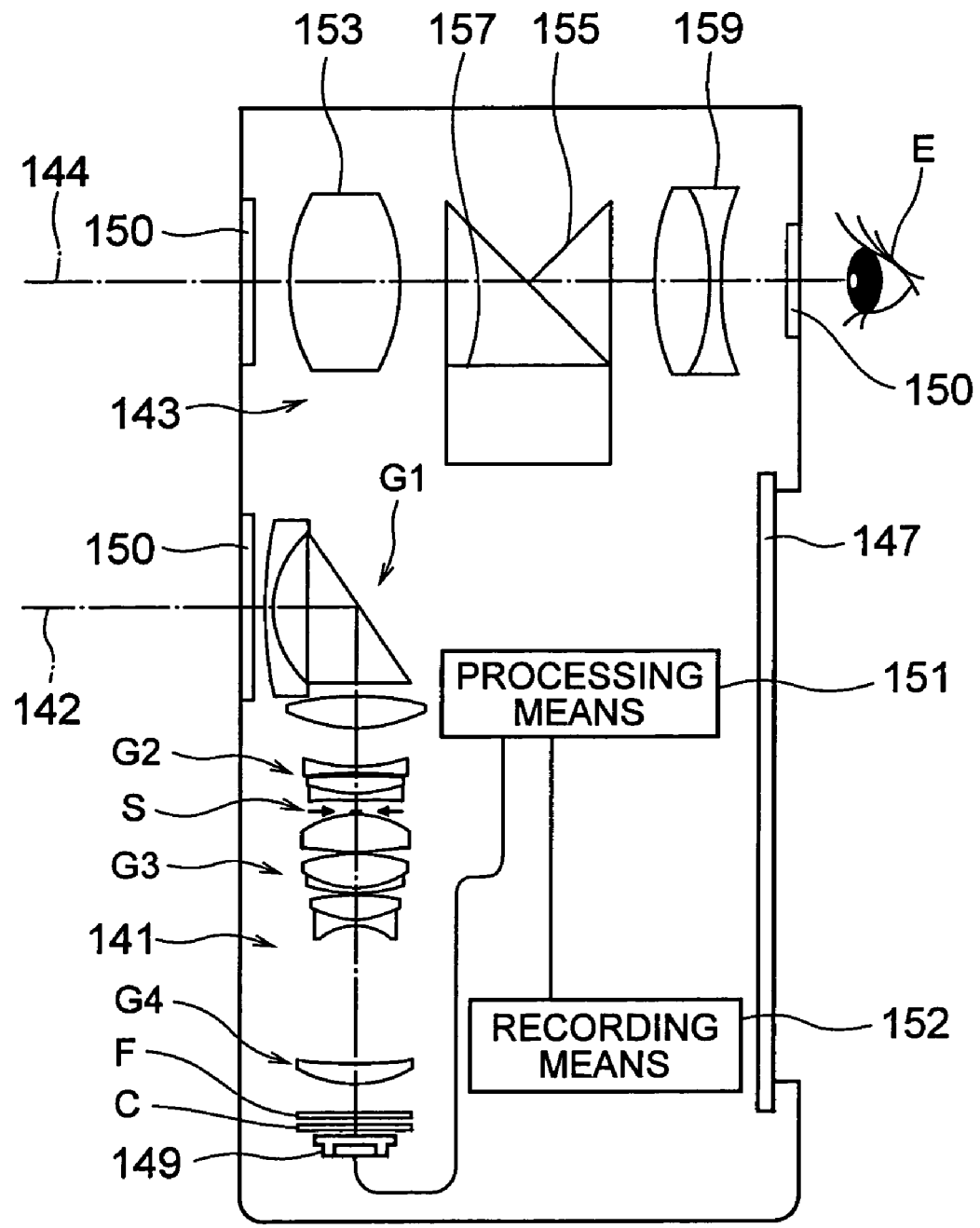
FIG. 24 is a cross sectional view of the digital camera.

FIG. 22 to FIG. 24 are conceptual diagrams of a structure of a digital camera according to the present invention in which a zoom lens system described above is incorporated in a taking optical system 141. FIG. 22 is a front perspective view showing an appearance of a digital camera 140, FIG. 23 is a rear perspective view of the same, and FIG. 24 is a schematic cross-sectional view showing a structure of the digital camera 140. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., when the shutter button 145 disposed on an upper portion of the digital camera 140 is pressed, in synchronization with the pressing of the shutter button 145, a photograph is taken by the taking optical system 141 such as the optical path reflecting zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has a high zoom ratio of 5 magnifications. Since the zoom lens has a high optical performance, it is possible to realize the inexpensive digital camera in which the depth is extremely thin.

Further, the example shown in FIG. 24, a plane parallel plate is disposed as the cover member 150. However, a lens having a power could be used. Furthermore, the cover member 150 could be omitted.

(Internal Circuit Structure)

Figure 25:
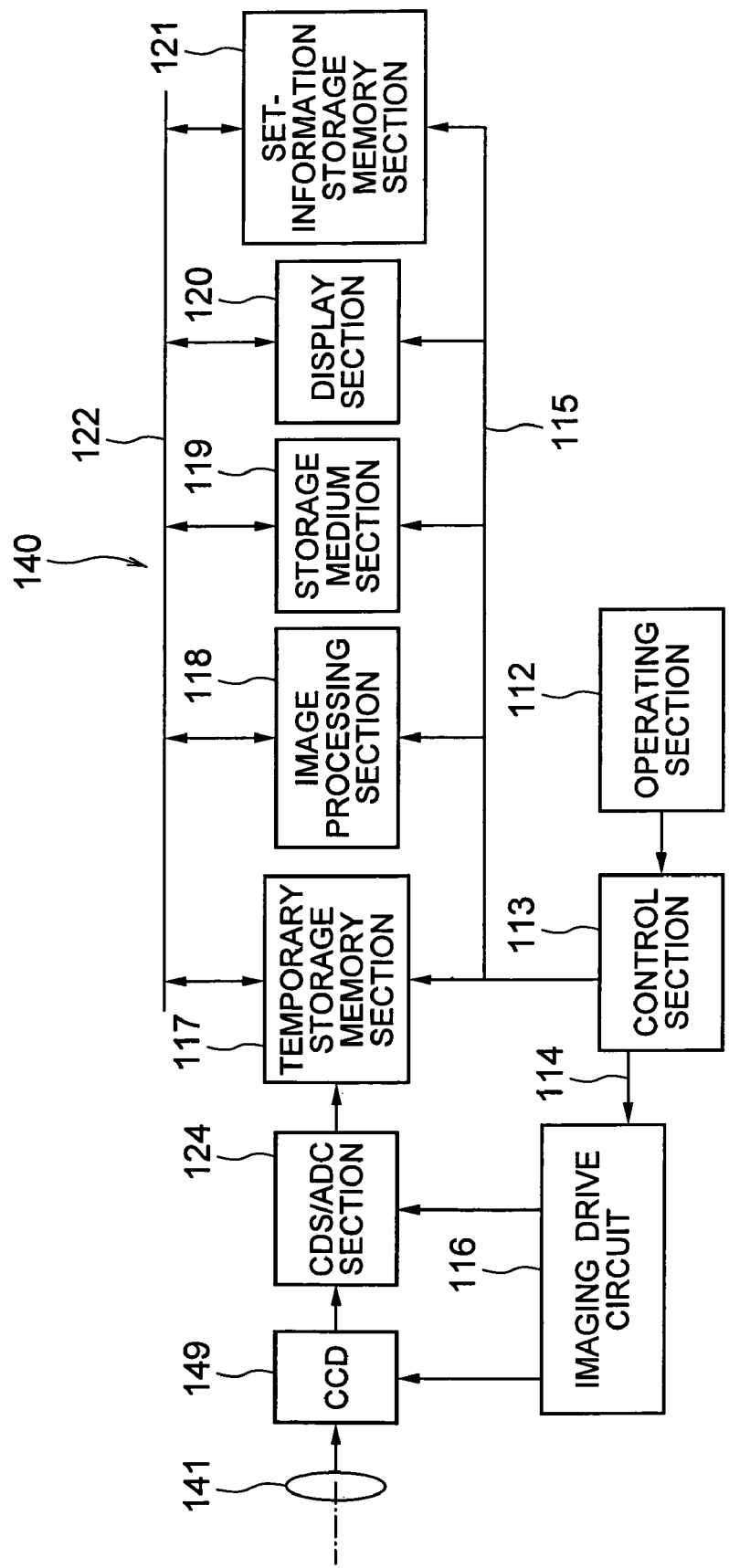
FIG. 25 is a block diagram of an internal circuit of a principal portion of the digital camera.

FIG. 25 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 25, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described in the foregoing, the image pickup apparatus according to the present invention is useful when slimming of the apparatus it to be achieved while the apparatus has a high zoom ratio.

The image pickup apparatus according to the present invention is advantageous in that there can be provided an image pickup apparatus equipped with a zoom lens including a reflecting member with which reduction of aberration can easily be achieved while the zoom lens has an adequate angle of view and an adequate zoom ratio.

What is claimed is:
1. An image pickup apparatus comprising:
   a zoom lens including a reflecting member having a reflecting surface that bends an optical path; and
   an image pick element that is disposed on the image side of the zoom lens, has an image pickup surface, and converts an image formed on the image pickup surface by the zoom lens into an electrical signal, wherein the zoom lens comprises an optical path reflecting lens group that includes the reflecting member and has a positive refracting power, a movable negative lens group that is disposed in the optical path on the image side of the optical path reflecting lens group, has a negative refracting power, and moves during zooming, a movable positive lens group that is disposed in the optical path on the image side of the movable negative lens group, has a positive refracting power, and moves during zooming, and an aperture stop that is disposed in the optical path between the movable negative lens group and the movable positive lens group, the optical path reflecting lens group is a lens group that is disposed closest to the object side in the zoom lens;

during zooming from the wide angle end to the telephoto end, the distance between the optical path reflecting lens group and the image pickup surface is constant, the movable negative lens group moves in such a way that it is located farther from the optical path reflecting lens group and closer to the image pickup surface at the telephoto end than at the wide angle end, and the movable positive lens group moves in such a way that it is located closer to the optical path reflecting lens group and farther from the image pickup surface at the telephoto end than at the wide angle end, and the movable positive lens group comprises at least five lenses including a plurality of positive lenses and a plurality of negative lenses.

2. The image pickup apparatus according to claim 1, wherein the number of reflecting surfaces in the zoom lens is one.

3. The image pickup apparatus according to claim 2, wherein the reflecting member in the optical path reflecting lens group comprises a prism having an internal reflecting surface.

4. The image pickup apparatus according to claim 3, wherein during zooming from the wide angle end to the telephoto end, the distance between the aperture stop and the optical path reflecting optical group and the distance between the aperture stop and the image pickup surface are constant.

5. The image pickup apparatus according to claim 4, wherein the movable negative lens group is a lens group located immediately in front of and on the object side of the aperture stop, and the movable positive lens group is a lens group located immediately in rear of and on the image side of the aperture stop.

6. The image pickup apparatus according to claim 4, wherein the zoom lens comprises a second positive lens group that is disposed between the movable negative lens group and the movable positive lens group and consists of one lens component having a positive refracting power, and the distance between the second positive lens group and the aperture stop is constant during zooming from the wide angle end to the telephoto end.

7. The image pickup apparatus according to claim 1, wherein the zoom lens comprises a lens group closest to the image side that is disposed between the movable positive lens group and the image pickup surface and located closest to the image pickup surface side in the zoom lens.

8. The image pickup apparatus according to claim 7, wherein the lens group closest to the image side has a positive refracting power, and the zoom lens is a four-group zoom lens.

9. The image pickup apparatus according to claim 7, the zoom lens comprises a second positive lens group that is disposed between the movable negative lens group and the movable positive lens group and has a positive refracting power, the lens group closest to the image side has a positive refracting power, and the zoom lens is a five-group zoom lens.

10. The image pickup apparatus according to claim 7, wherein the lens group closest to the image side consists of one positive lens component having a positive refracting power.

11. The image pickup apparatus according to claim 1, wherein the movable positive lens group comprises at least three positive lenses and at least two negative lenses.

12. The image pickup apparatus according to claim 11, wherein the movable positive lens group comprises a plurality of cemented lenses each of which includes a positive lens and a negative lens.

13. The image pickup apparatus according to claim 12, wherein the movable positive lens group comprises in order from the object side to the image pickup surface side on the optical axis, a first lens component, a second lens component, and a third lens component, the total number of lens components in the movable positive lens group is three, the first lens component has a positive refracting power, the second lens component has a positive refracting power, the third lens component is a meniscus lens component having an object side surface convex toward the object side and an image side surface concave toward the image side, and a plurality of lens components including the meniscus lens component among the first, second, and third lens components are cemented lens components including a positive lens and a negative lens.

14. The image pickup apparatus according to claim 13, wherein the first lens component in the movable positive lens group has an object side surface convex toward the object side, and the second lens component has an object side surface convex toward the object side.

15. The image pickup apparatus according to claim 14, wherein the second lens component in the movable positive lens group has a shape that satisfies the following conditional expression (1A):

$$-30 < (R_{2F} + R_{2B})/(R_{2F} - R_{2B}) < 0.9 \quad (1A),$$

where $R_{2F}$ is a paraxial radius of curvature of the object side surface of the second lens component in the movable positive lens group, and $R_{2B}$ is the paraxial radius of curvature of an image side surface of the second lens component in the movable positive lens group.

16. The image pickup apparatus according to claim 14, wherein the second lens component in the movable positive lens group has an image side surface concave toward the image side.

17. The image pickup apparatus according to claim 13, wherein the first lens component in the movable positive lens group has an object side surface convex toward the object side, and the second lens component has an object side surface convex toward the object side and an image side surface convex toward the image side.

18. The image pickup apparatus according to claim 17, wherein the second lens component in the movable positive lens group is a cemented lens component made up of a biconvex lens and a negative meniscus lens and has a shape that satisfies the following conditional expression (1):

$$-0.9 < (R_{2F} + R_{2B})/(R_{2F} - R_{2B}) < 0.9 \quad (1),$$

where $R_{2F}$ is a paraxial radius of curvature of the object side surface of the second lens component in the movable positive lens group, and $R_{2B}$ is a paraxial radius of curvature of the image side surface of the second lens component in the movable positive lens group.

19. The image pickup apparatus according to claim 17, wherein, in the movable positive lens group, the first lens component is a single aspheric lens having a biconvex shape, the second lens component is a cemented lens component including a positive lens and a negative lens, and the third lens component is a cemented lens component consisting of a biconvex positive lens and a biconcave negative lens arranged in order from the object side to the image side in the optical path.

20. The image pickup apparatus according to claim 11, wherein the movable positive lens group comprises a biconcave lens disposed closest to the image side and a biconvex lens disposed second closest to the image side, and satisfies the following conditional expression (2):

$$0.1 < N_{n1} - N_{p1} < 0.7 \qquad (2),$$

where $N_{n1}$ is a refractive index of the biconcave lens located closest to the image side in the movable positive lens group for the d-line, and $N_{p1}$ is a refractive index of the biconvex lens located second closest to the image side in the movable positive lens group for the d-line.

21. The image pickup apparatus according to claim 20, wherein the biconcave lens in the movable positive lens group satisfies the following conditional expressions (3) and (4):

$$15 < \nu_{n1} < 35 \qquad (3)$$

$$1.8 < N_{n1} < 2.5 \qquad (4),$$

where $\nu_{n1}$ is an Abbe number of the biconcave lens located closest to the image side in the movable positive lens group, and $N_{n1}$ is the refractive index of the biconcave lens located closest to the image side in the movable positive lens group for the d-line.

22. The image pickup apparatus according to claim 20, wherein the biconcave lens and the biconvex lens in the movable positive lens group are cemented to each other.

23. The image pickup apparatus according to claim 11, wherein the movable positive lens group comprises a biconvex lens and a negative meniscus lens arranged adjacent to each other on the object side of the lens located second closest to the image side in the movable positive lens group, and the negative meniscus lens has a concave surface facing the adjacent biconvex lens.

24. The image pickup apparatus according to claim 23, wherein the biconvex lens and the negative meniscus lens disposed on the object side of the lens located second closest to the image side in the movable positive lens group satisfy the following conditional expression (5):

$$25 < \nu_{p2} - \nu_{n2} < 70 \qquad (5),$$

where $\nu_{p2}$ is an Abbe number of the biconvex lens in the movable positive lens group, and $\nu_{n2}$ is an Abbe number of the negative meniscus lens in the movable positive lens group.

25. The image pickup apparatus according to claim 23, wherein the negative meniscus les in the movable positive lens group is disposed on the image side of the adjacent biconvex lens, and the negative meniscus lens has a shape that satisfies the following conditional expression (6):

$$-0.8 < (R_{nmF} + R_{nmB})/(R_{nmF} - R_{nmB}) < -1.0 \qquad (6),$$

where $R_{nmF}$ is a paraxial radius of curvature of the object side surface of the negative meniscus lens in the movable positive lens group, and $R_{nmB}$ is a paraxial radius of curvature of the image side surface of the negative meniscus lens in the movable positive lens group.

26. The image pickup apparatus according to claim 11, wherein the movable positive lens group comprises, in order from the object side to the image side, a first lens having a positive refracting power, a second lens having a positive refracting power, a third lens having a negative refracting power, a fourth lens having a positive refracting power, and a fifth lens having a negative refracting power, and the total number of lenses in the movable positive lens group is five.

27. The image pickup apparatus according to claim 26, wherein the second lens and the third lens in the movable positive lens group are cemented to each other.

28. The image pickup apparatus according to claim 26, wherein the third lens in the movable positive lens has a meniscus shape that satisfies the following conditional expression (7):

$$-8.0 < (R_{13} + R_{23})/(R_{13} + R_{23}) < -1.0 \qquad (7),$$

where $R_{13}$ is a paraxial radius of curvature of the object side surface of the third lens, and $R_{23}$ is a paraxial radius of curvature of the image side surface of the third lens.

29. The image pickup apparatus according to claim 1, wherein the movable positive lens group includes a positive plastic lens.

30. The image pickup apparatus according to claim 1, wherein during zooming from the wide angle end to the telephoto end, the movable positive lens group moves in such a way that the following conditional expression (8) is satisfied:

$$1.3 < \beta_{GT}/\beta_{GW} < 3.5 \qquad (8),$$

where $\beta_{Gw}$ is a lateral magnification of the positive lens group at the wide angle end, and $\beta_{GT}$ is a lateral magnification of the positive lens group at the telephoto end.

31. The image pickup apparatus according to claim 1, wherein the movable positive lens group satisfies the following conditional expression (9):

$$0.13 < D_g/D_{all} < 0.24 \qquad (9),$$

where $D_g$ is a thickness of the movable positive lens group on the optical axis, and $D_{all}$ is an optical path length from the object side surface of the lens located closest to the object side in the zoom lens to the image pickup surface of the image pickup element along the optical axis.

32. The image pickup apparatus according to claim 1, wherein the zoom lens satisfies the following conditional expression (10):

$$3.0 < f_t/f_W < 10 \qquad (10),$$

where $f_w$ is the focal length of the entire zoom lens system at the wide angle end, and $f_t$ is the focal length of the entire zoom lens system at the telephoto end.

33. The image pickup apparatus according to claim 1, further comprising a processing circuit that transforms a signal representing an image formed on the image pickup surface and containing distortion attributed to the zoom lens into a signal that has been corrected in terms of distortion.

34. The image pickup apparatus according to claim 1, further comprising a processing circuit that transforms a signal representing an image formed on the image pickup surface and containing chromatic aberration of magnification attributed to the zoom lens into a signal that has been corrected in terms of chromatic aberration of magnification.

35. The image pickup apparatus according to claim 1, wherein the movable positive lens group comprises a cemented doublet lens component, and the cemented doublet lens component comprises, in order from the object side to the image side, a negative meniscus lens that is convex toward the object side and a positive meniscus lens that is concave toward the image side.

\* \* \* \* \*